United States Patent
Jeong

(10) Patent No.: US 8,306,369 B2
(45) Date of Patent: Nov. 6, 2012

(54) OPTICAL HYBRID CIRCUIT, OPTICAL RECEIVER, AND OPTICAL RECEIVING METHOD

(75) Inventor: Seok Hwan Jeong, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 139 days.

(21) Appl. No.: 12/971,138

(22) Filed: Dec. 17, 2010

(65) Prior Publication Data
US 2011/0158574 A1 Jun. 30, 2011

(30) Foreign Application Priority Data

Dec. 25, 2009 (JP) ................................. 2009-295354

(51) Int. Cl.
*G02F 1/035* (2006.01)
*H04J 14/02* (2006.01)

(52) U.S. Cl. ......... 385/2; 385/1; 385/3; 385/14; 385/15; 385/27; 385/28; 385/31; 385/32; 385/39; 385/41; 385/42; 385/43; 385/47; 385/48; 385/51; 398/82; 398/79; 398/43; 398/68

(58) Field of Classification Search .................. 385/1–3, 385/14–15, 27–28, 31–32, 39, 41–43, 47–48, 385/51; 398/82, 79, 43, 68
See application file for complete search history.

(56) References Cited

U.S. PATENT DOCUMENTS

| | | | |
|---|---|---|---|
| 7,035,543 B1 * | 4/2006 | Hoshida et al. ................. 398/79 |
| 7,343,104 B2 * | 3/2008 | Doerr et al. .................... 398/212 |
| 7,403,670 B1 * | 7/2008 | Doerr ................................. 385/1 |
| 7,583,903 B2 * | 9/2009 | Cuenot et al. .................. 398/188 |
| 7,603,007 B2 * | 10/2009 | Terahara et al. ................. 385/24 |
| 7,649,678 B2 * | 1/2010 | Hasegawa et al. ............. 359/325 |
| 7,715,720 B2 * | 5/2010 | Shpantzer et al. ............... 398/82 |
| 2002/0131105 A1 * | 9/2002 | Herrity .......................... 359/124 |
| 2009/0074407 A1 * | 3/2009 | Hornbuckle et al. ............ 398/43 |
| 2010/0166427 A1 * | 7/2010 | Jeong .............................. 398/82 |
| 2011/0129236 A1 * | 6/2011 | Jeong ............................ 398/212 |
| 2011/0229074 A1 * | 9/2011 | Jeong .............................. 385/28 |

FOREIGN PATENT DOCUMENTS

JP 2008-177759 A1 7/2008

* cited by examiner

*Primary Examiner* — Brian M. Healy
*Assistant Examiner* — Guy Anderson
(74) *Attorney, Agent, or Firm* — Kratz, Quintos & Hanson, LLP

(57) ABSTRACT

An optical hybrid circuit includes a multimode interference coupler; a first 2:2 optical coupler; a second 2:2 optical coupler; a third 2:2 optical coupler; and a phase controlling region. The first 2:2 optical coupler, the second 2:2 optical coupler, and the third 2:2 optical coupler are coupled to one of the pair of first output channels, the pair of second output channels, the pair of third output channels, and the pair of fourth output channels of the multimode interference coupler. The phase controlling region is provided in one or both of each pair of at least two pairs of output channels from among three pairs of output channels to which the first 2:2 optical coupler, the second 2:2 optical coupler, and the third 2:2 optical coupler are coupled, respectively.

19 Claims, 23 Drawing Sheets

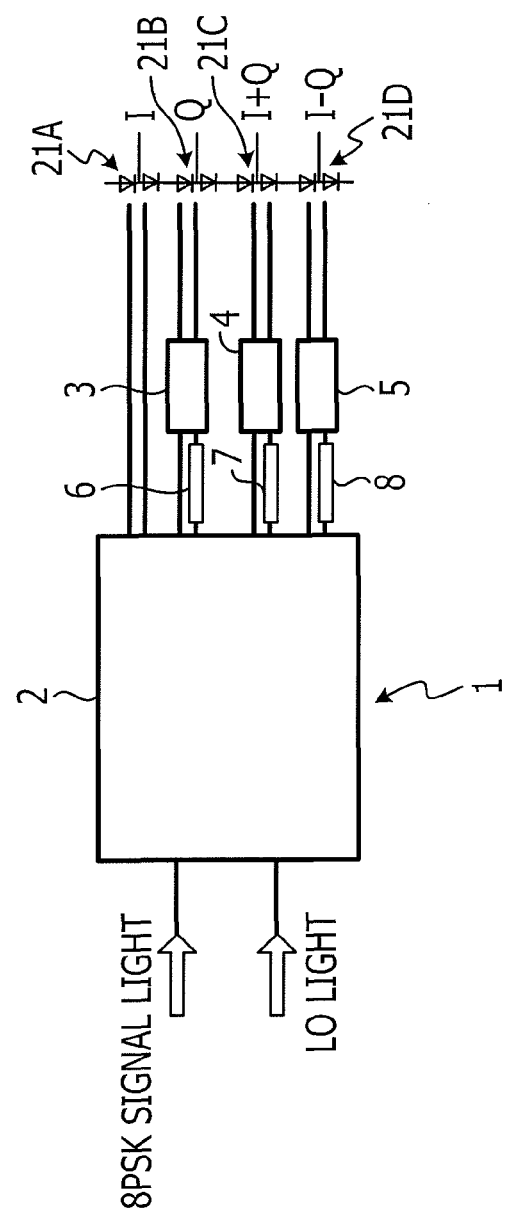
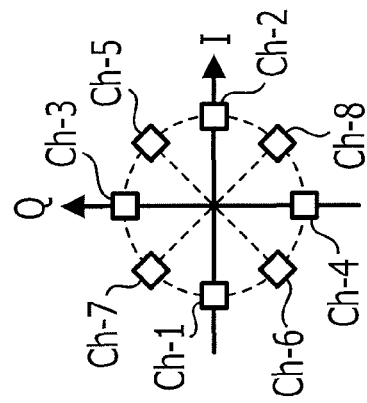
FIG. 1A
FIG. 1B

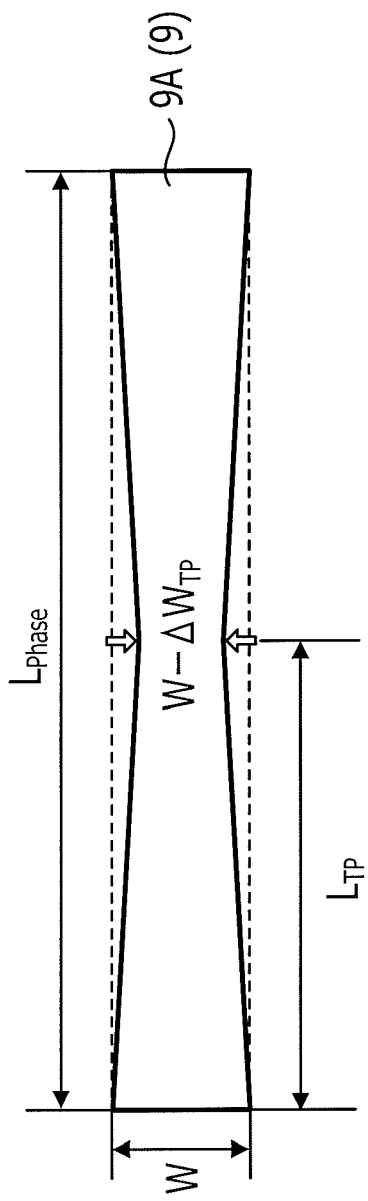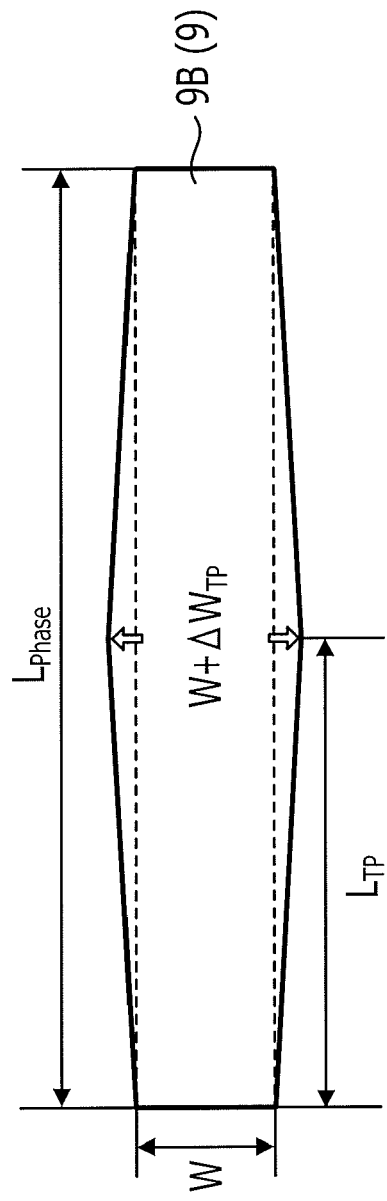
FIG. 5A
FIG. 5B

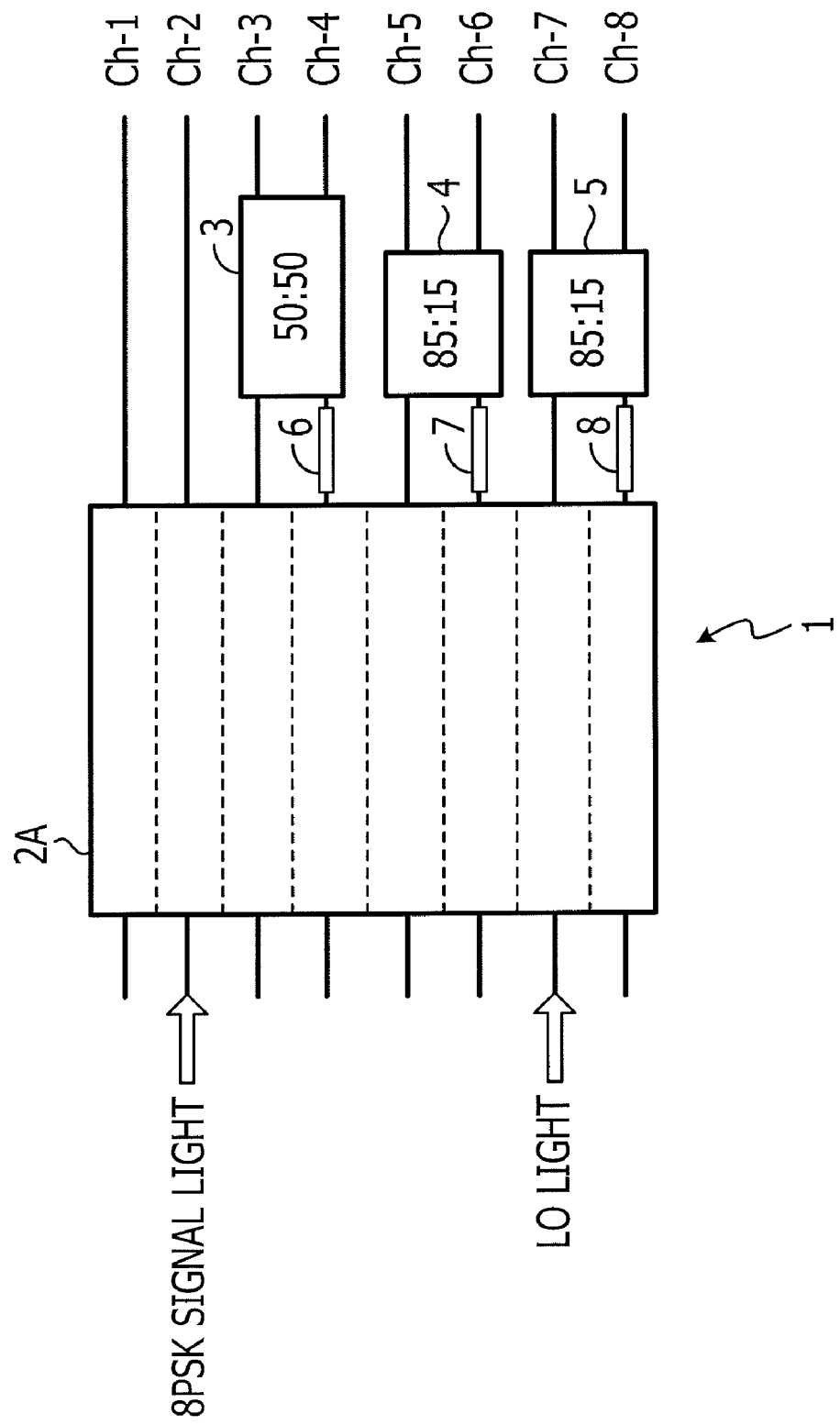

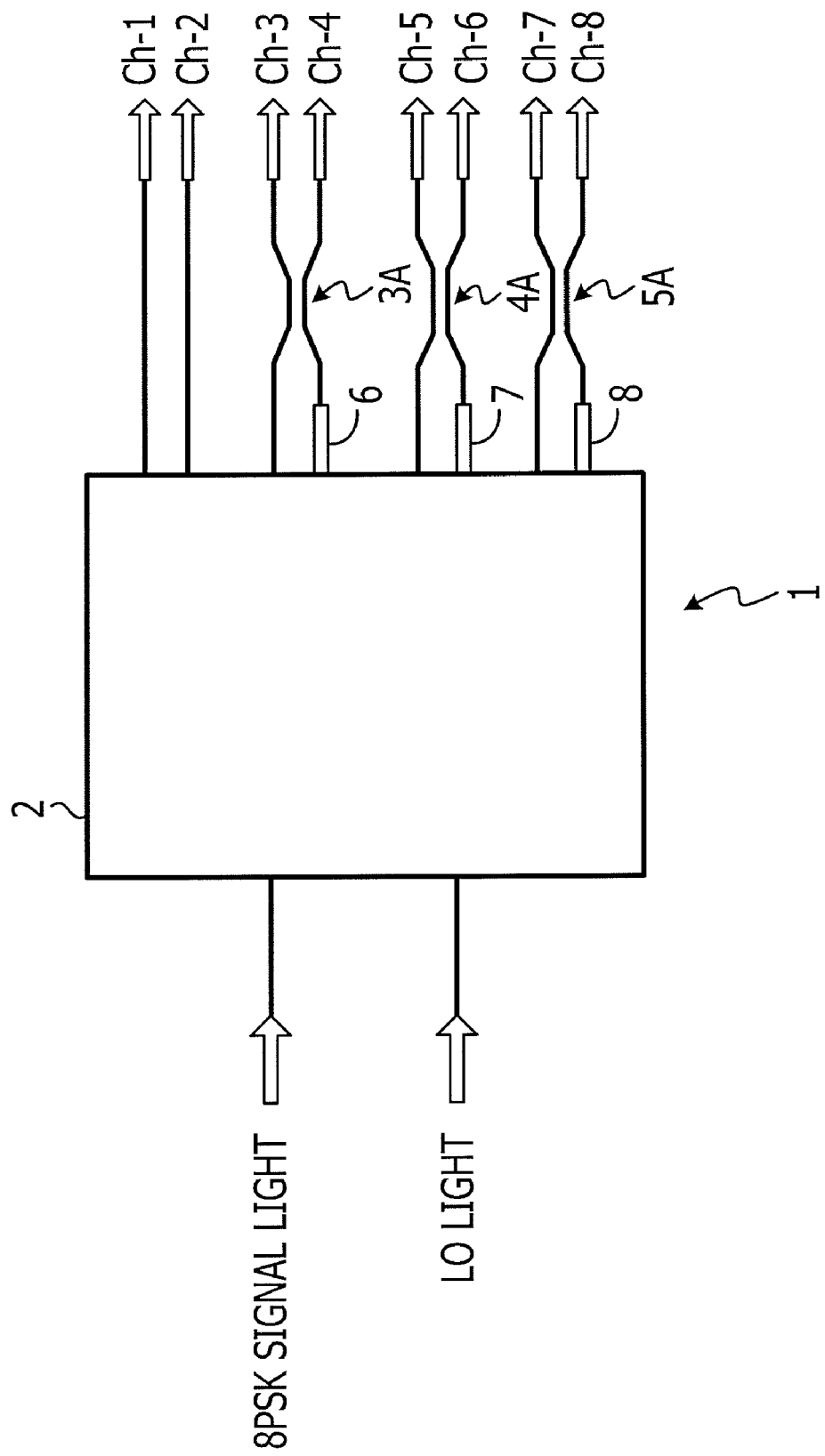

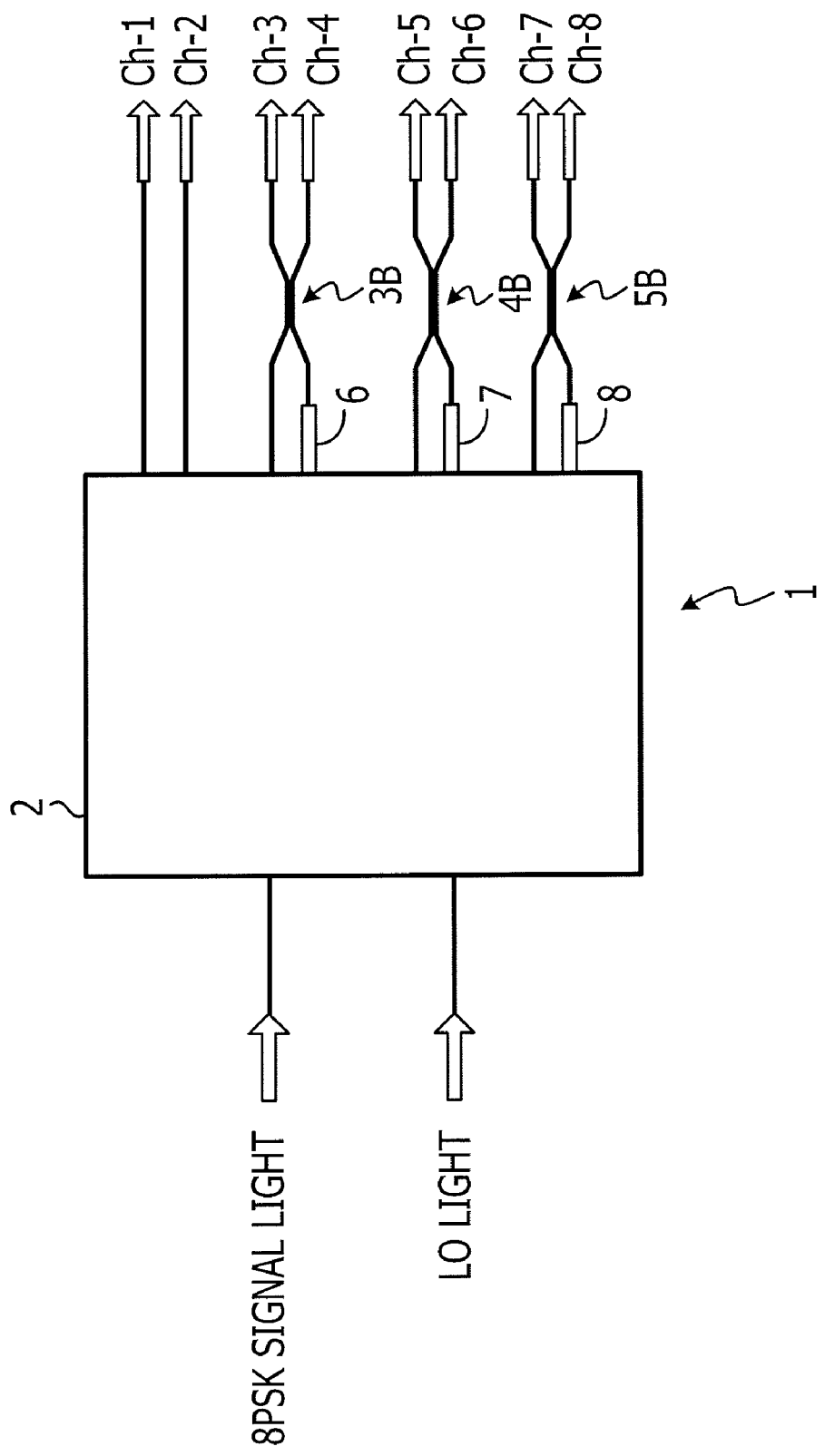

OPTICAL HYBRID CIRCUIT, OPTICAL RECEIVER, AND OPTICAL RECEIVING METHOD

CROSS-REFERENCE TO RELATED APPLICATIONS

This application is based upon and claims the benefit of priority from the prior Japanese Patent Application No. 2009-295354 filed on Dec. 25, 2009, the entire contents of which are incorporated herein by reference.

FIELD

The embodiments relate to an optical hybrid circuit, an optical receiver, an optical transceiver, and an optical receiving method.

BACKGROUND

In recent years, in order to increase the transmission capacity of an optical transmission system, an optical transmission system that has a high bit rate ranging to 100 Gbit/s has been researched and developed.

As an optical modulation method considered most promising for transmitting an optical signal that has such a high bit rate, a multilevel phase modulation method is being actively researched.

For example, a quadrature phase shift keying (QPSK) method or a differential quadrature phase shift keying (DQPSK) method is cited. Using such a method, a signal that has two bits can be transmitted. Accordingly, compared with a binary phase shift keying (BPSK) method or a differential binary phase shift keying (DBPSK) method, the transmission capacity of an optical transmission system can be doubled, or the bit rate thereof for obtaining the same transmission capacity can be decreased by half.

Recently, as a modulation method that can further increase the transmission capacity of an optical transmission system, an eight phase shift keying (8PSK) method or a differential eight phase shift keying (D8PSK) method has been researched and developed. Using such a method, a signal that has three bits can be transmitted. Accordingly, compared with the BPSK method or the DBPSK method, the transmission capacity of an optical transmission system can be tripled, or the bit rate thereof for obtaining the same transmission capacity can be reduced to ⅓.

A coherent optical receiver that includes a 45-degree hybrid is necessary for demodulating signal light modulated by such an 8PSK system or a D8PSK system as just described. Here, the 45-degree hybrid exhibits output forms that have different branching ratios depending upon the phase modulation states of 8PSK signal light or D8PSK signal light, respectively, and is the most important component of the coherent optical receiver.

For example, as illustrated in FIG. 21, as the 45-degree hybrid, there is a 45-degree hybrid that includes two 1:4 couplers (6 dB couplers) 100 and 101 and four 2:2 couplers (3 dB couplers) 102 to 105.

In addition, in FIG. 21, "I" indicates an in-phase relationship (namely, a phase relationship located on an I axis (0-degree axis)) in a phase relationship diagram. In addition, in FIG. 21, "Q" indicates a quadrature relationship (namely, a phase relationship displaced by 90 degrees with respect to the I axis [a phase relationship located on a Q axis (90-degree axis)]) in the phase relationship diagram. In addition, in FIG. 21, "I+Q" indicates a 45-degree relationship (namely, a phase relationship displaced by 45 degrees with respect to the I axis) in the phase relationship diagram. In addition, in FIG. 21, "I−Q" indicates a 135-degree relationship (namely, a phase relationship displaced by 135 degrees with respect to the I axis) in the phase relationship diagram.

In the 45-degree hybrid as illustrated in FIG. 21, 8PSK signal light is input to the input channel of one 1:4 coupler 100; and LO light is input to the input channel of the other 1:4 coupler 101.

In addition, a pair of optical signals (indicated by "I" in FIG. 21) that indicate an in-phase relationship (In-phase) is output from output channels positioned on the first from individual sides (upper sides in FIG. 21) of the two 1:4 couplers 100 and 101.

In addition, a pair of optical signals (indicated by "Q" in FIG. 21) that indicate the quadrature phase (Quadrature) is output from output channels positioned on the second from the individual sides (the upper sides in FIG. 21) of the two 1:4 couplers 100 and 101.

In addition, a pair of optical signals (indicated by "I+Q" in FIG. 21) that indicate the 45-degree phase relationship is output from output channels positioned on the third from the individual sides (the upper sides in FIG. 21) of the two 1:4 couplers 100 and 101.

In addition, a pair of optical signals (indicated by "I−Q" in FIG. 21) that indicate the 135-degree phase relationship is output from output channels positioned on the fourth from the individual sides (the upper sides in FIG. 21) of the two 1:4 couplers 100 and 101.

SUMMARY

According to aspects of embodiments, an optical hybrid circuit includes a multimode interference coupler; a first 2:2 optical coupler; a second 2:2 optical coupler; a third 2:2 optical coupler; and a phase controlling region, wherein the multimode interference coupler includes a pair of input channels provided at symmetrical positions with respect to a center position in a widthwise direction, a pair of first output channels that are adjacent to each other configured to output a pair of first optical signals that have an in-phase relationship with each other, a pair of second output channels that are adjacent to each other configured to output a pair of second optical signals that have an in-phase relationship with each other, a pair of third output channels that are adjacent to each other configured to output a pair of third optical signals that have an in-phase relationship with each other, and a pair of fourth output channels that are adjacent to each other configured to output a pair of fourth optical signals that have an in-phase relationship with each other, and converts an 8-phase shift modulation signal light or a differential 8-phase shift modulation signal light into the pair of first optical signals that have an in-phase relationship with each other, the pair of second optical signals that have an in-phase relationship with each other, the pair of third optical signals that have an in-phase relationship with each other, and the pair of fourth optical signals that have an in-phase relationship with each other, wherein the first 2:2 optical coupler is coupled to one of the pair of first output channels, the pair of second output channels, the pair of third output channels, and the pair of fourth output channels, includes two channels on an input side thereof and two channels on an output side thereof, and converts one of the pair of first optical signals, the pair of second optical signals, the pair of third optical signals, and the pair of fourth optical signals into a pair of fifth optical signals that have a quadrature phase relationship, wherein the second 2:2 optical coupler is coupled to one pair of output channels, which is one of the pair of first output channels, the pair of second output channels, the pair of third output channels, and the pair of fourth output channels and other than the pair of output channels to which the first 2:2 optical coupler is coupled, includes two channels on an input side thereof and two channels on an output side thereof, and converts one pair of optical signals, which is the pair of first optical signals, the pair of second optical signals, the pair of third optical signals, and the pair of fourth optical signals and output from other pair of output channels than the pair of output channels to which the first 2:2 optical coupler is coupled, into a pair of sixth optical signals that have a 45-degree phase relationship, wherein the third 2:2 MMI coupler is coupled to one pair of output channels, which is one of the pair of first output channels, the pair of second output channels, the pair of third output channels, and the pair of fourth output channels and other than the pairs of output channels to which the first 2:2 optical coupler and the second 2:2 optical coupler are coupled, includes two channels on an input side thereof and two channels on an output side thereof, and converts one pair of optical signals, which is one of the pair of first optical signals, the pair of second optical signals, the pair of third optical signals, and the pair of fourth optical signals and output from other pair of output channels than the pairs of output channels to which the first 2:2 optical coupler and the second 2:2 optical coupler are coupled, into a pair of seventh optical signals that have a 135-degree phase relationship, and wherein the phase controlling region is provided in at least one of each pair of at least two pairs of output channels from among three pairs of output channels to which the first 2:2 optical coupler, the second 2:2 optical coupler, and the third 2:2 optical coupler are coupled, respectively.

The object and advantages of the invention will be realized and attained by means of the elements and combinations, which are more particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a pattern diagram illustrating a configuration of an optical hybrid circuit according to a first embodiment;

FIG. 1B is a phase relationship diagram illustrating a phase relationship of light output from each of channels of the optical hybrid circuit illustrated in FIG. 1A;

FIGS. 5A and 5B are schematic planar diagrams illustrating configurations of a phase shifter included in the optical hybrid circuit according to the first embodiment;

FIG. 14 is a pattern diagram illustrating a configuration of an optical hybrid circuit according to a modification to the first embodiment;

FIG. 15 is a pattern diagram illustrating a configuration of an optical hybrid circuit according to another modification to the first embodiment;

FIG. 16 is a pattern diagram illustrating a configuration of an optical hybrid circuit according to another modification to the first embodiment;

DESCRIPTION OF EMBODIMENTS

Figure 21:
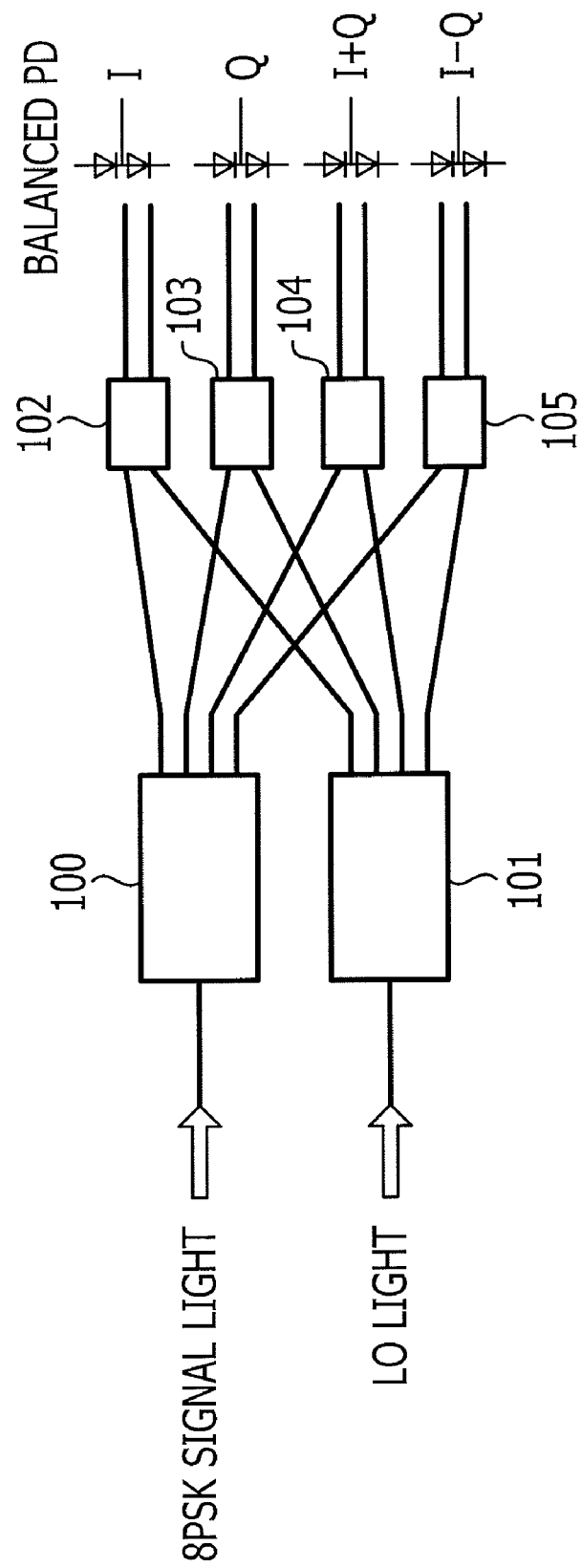
FIG. 21 is a pattern diagram illustrating a subject of a 45-degree hybrid of the related art.

In a 45-degree hybrid illustrated in FIG. 21, a pair of optical signals that have an in-phase relationship with each other are output from two output channels, which are spatially spaced away from each other. In a similar manner, a pair of optical signals that have a quadrature phase relationship are also output from two output channels which are spatially spaced away from each other. In addition, a pair of optical signals that have a 45-degree phase relationship are also output from two output channels which are spatially spaced away from each other. A pair of optical signals that have a 135-degree phase relationship are also output from two output channels, which are spatially spaced away from each other.

Accordingly, since the 45-degree hybrid illustrated in FIG. 21 includes some regions, in which optical waveguides intersect with one another, between 1:4 optical couplers 100 and 101 and 2:2 optical couplers 102 to 105, the 45-degree hybrid has a disadvantage in that excessive loss occurs in the intersecting region.

Therefore, it is desired to prevent the region in which optical waveguides intersect with one another from being formed in the 45-degree hybrid.

Figure 22:
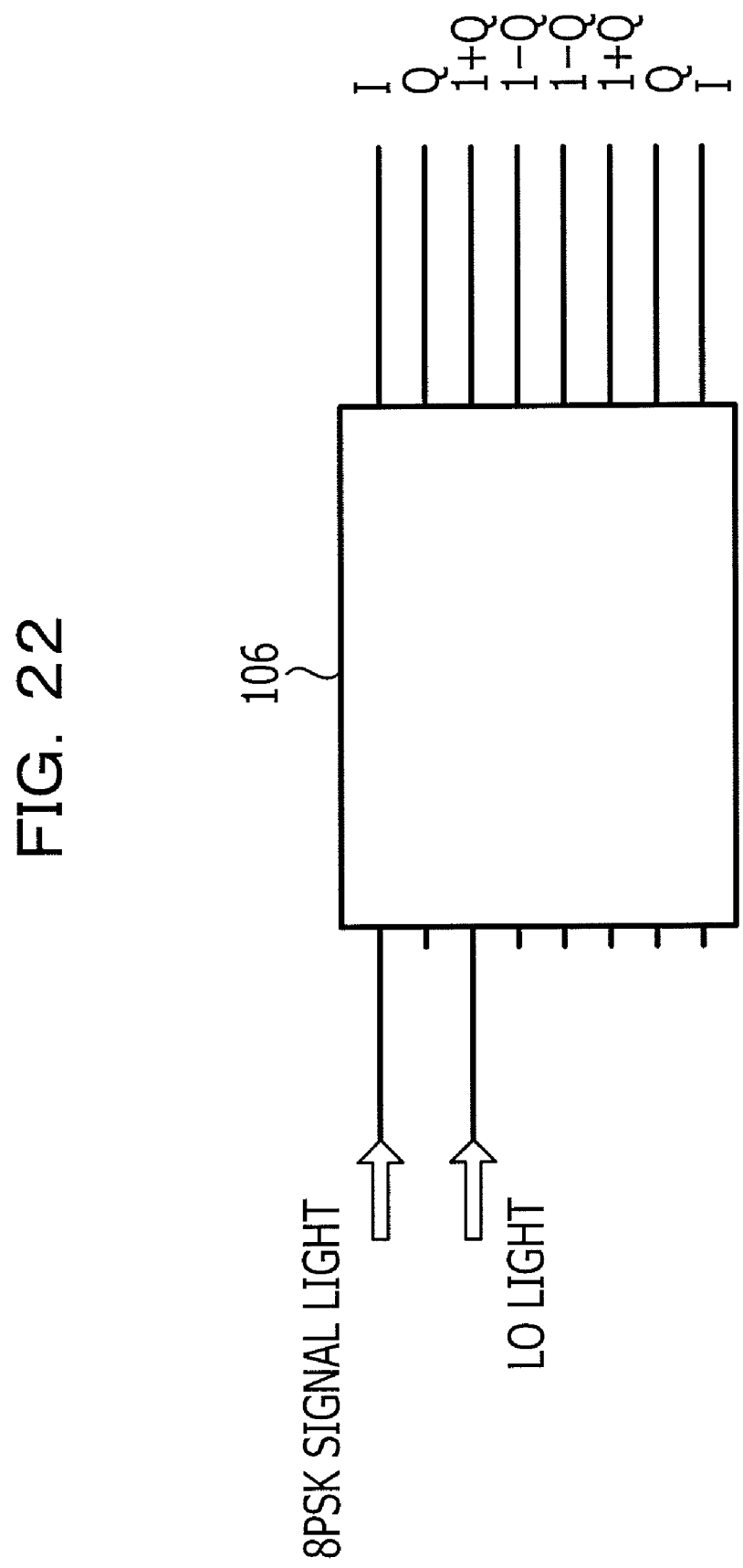
FIG. 22 is a pattern diagram illustrating a configuration of the 45-degree hybrid that uses an 8:8 MMI coupler.

In this case, it may be considered that, for example, as illustrated in FIG. 22, the 45-degree hybrid includes one 8:8 multimode interference (MMI) coupler 106.

In addition, in FIG. 22, "I" indicates an in-phase relationship (namely, a phase relationship located on an I axis (0-degree axis)) in a phase relationship diagram. In addition, in FIG. 22, "Q" indicates a quadrature relationship (namely, a phase relationship displaced by 90 degrees with respect to the I axis [a phase relationship located on a Q axis (90-degree axis)]) in the phase relationship diagram. In addition, in FIG. 22, "I+Q" indicates a 45-degree relationship (namely, a phase relationship displaced by 45 degrees with respect to the I axis) in the phase relationship diagram. In addition, in FIG. 22, "I−Q" indicates a 135-degree relationship (namely, a phase relationship displaced by 135 degrees with respect to the I axis) in the phase relationship diagram.

Here, in order to obtain a 45-degree hybrid operation using an 8:8 MMI coupler 106, two channels at asymmetrical positions may be selected from among eight channels on the input side of the 8:8 MMI coupler 106 as input channels for inputting 8PSK signal light and LO light. Accordingly, since a relationship of phases different from one another by 45 degrees is obtained by mode interference action in the MMI region of the 8:8 MMI coupler 106, the 8:8 MMI coupler 106 can be used as a 45-degree hybrid.

In the 45-degree hybrid as illustrated in FIG. 22, a pair of optical signals (indicated by "I" in FIG. 22) that indicate the in-phase relationship is output from output channels positioned on the first and the eighth from one side (upper side in FIG. 22) of the eight output channels of the 45-degree hybrid.

In addition, a pair of optical signals (indicated by "Q" in FIG. 22) that indicate the quadrature phase relationship is output from output channels positioned on the second and the seventh from the one side (the upper side in FIG. 22) of the eight output channels.

In addition, a pair of optical signals (indicated by "I+Q" in FIG. 22) that indicate the 45-degree phase relationship is output from output channels positioned on the third and the sixth from the one side (the upper side in FIG. 22) of the eight output channels.

In addition, a pair of optical signals (indicated by "I−Q" in FIG. 22) that indicate the 135-degree phase relationship is output from output channels positioned on the fourth and the fifth from the one side (the upper side in FIG. 22) of the eight output channels.

Figure 23:
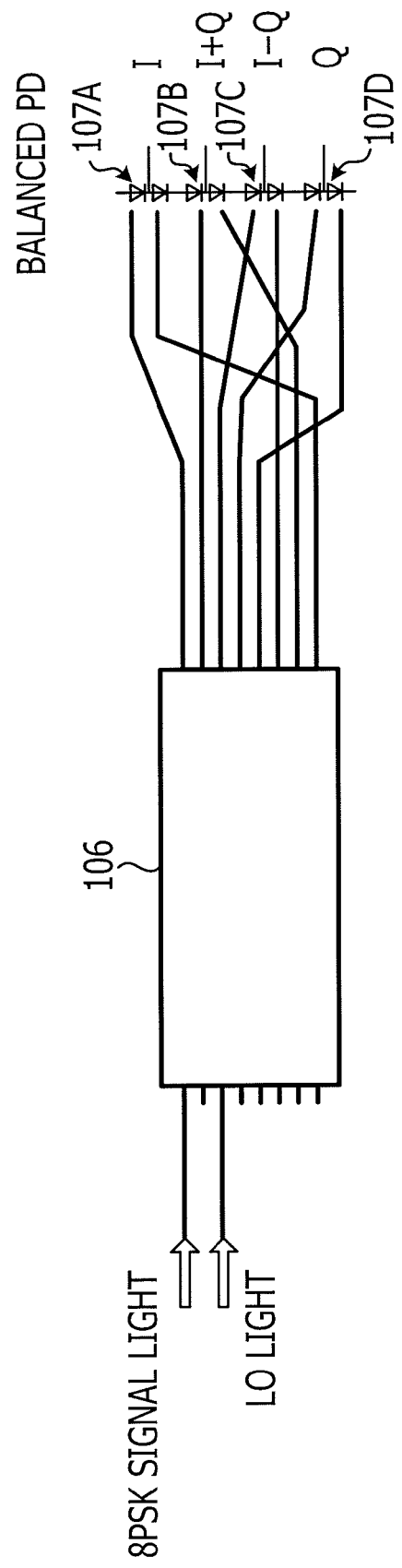
FIG. 23 is a pattern diagram illustrating a subject of the 45-degree hybrid illustrated in FIG. 22.

Therefore, the 45-degree hybrid as illustrated in FIG. 22, when individual output channels and balanced photodiodes (BPDs) are coupled to one another for photoelectric conversion as illustrated in FIG. 23, optical waveguides used for coupling the output channels and the balanced photodiodes to one another intersect with one another. Therefore, the 45-degree hybrid described above, in reference to FIG. 23, has a disadvantage in that excessive loss occurs in the intersecting region.

In particular, optical signals output from the 45-degree hybrid are typically detected by BPDs, as illustrated in FIG. 23, in order to carry out photoelectric conversion.

In the case of the 45-degree hybrid, as described above in reference to FIG. 23, it is necessary to couple two output channels from which a pair of optical signals that have the in-phase relationship with each other are output to a BPD 107A, and couple two output channels from which a pair of optical signals that have the quadrature phase relationship are output to a BPD 107B, couple two output channels from which a pair of optical signals that have the 45-degree phase relationship are output to a BPD 107C, and couple two output channels from which a pair of optical signals that have the 135-degree phase relationship are output to a BPD 107D.

However, in the 45-degree hybrid, as described above in reference to FIG. 23, a pair of optical signals that have the in-phase relationship with each other are output from two output channels which are spatially spaced away from each other. In the same manner, a pair of optical signals that have the quadrature phase relationship are also output from two output channels which are spatially spaced away from each other. In addition, a pair of optical signals that have the 45-degree phase relationship are also output from two output channels which are spatially spaced away from each other. A pair of optical signals that have the 135-degree phase relationship are also output from two output channels which are spatially spaced away from each other.

Therefore, as illustrated in FIG. 23, optical waveguides which couple the output channels of the 8:8 MMI coupler 106 and the BPDs 107A to 107D to one another inevitably intersect with one another. Accordingly, the 45-degree hybrid illustrated in FIG. 23 has a disadvantage in that excessive loss occurs in the intersecting region of the optical waveguides, which gives rise to reduction of the reception efficiency.

Accordingly, it is desirable to realize an optical hybrid circuit, an optical receiver, and an optical receiving method, in which excessive loss can be suppressed by preventing the intersecting region of the optical waveguides from occurring.

An optical hybrid circuit, an optical receiver, an optical transceiver, and an optical receiving method according to the present embodiments will be described in reference to figures described hereinafter.

First, an optical hybrid circuit according to a first embodiment will be described in reference to FIGS. 1 to 13.

The optical hybrid circuit according to the present embodiment is a 45-degree hybrid circuit (also referred to as "45-degree hybrid" hereinafter) used for distinguishing (modulating) phase modulation information of an 8-phase shift modulation (8PSK) signal in an optical transmission system (optical communication system).

In the present embodiment, as illustrated in FIG. 1A, the optical hybrid circuit 1 includes a multimode interference (MMI) coupler 2 at a preceding stage and three optical couplers 3 to 5 at a succeeding stage, which are coupled in cascade coupling. The optical hybrid circuit 1 includes an optical semiconductor device that includes the MMI coupler 2 and the three optical couplers 3 to 5, and has a semiconductor optical waveguide structure that can be monolithically integrated.

In addition, in FIG. 1A, "I" indicates an in-phase relationship (namely, a phase relationship located on an I axis (0-degree axis)) in a phase relationship diagram. In addition, "Q" indicates a quadrature relationship (namely, a phase relationship displaced by 90 degrees with respect to the I axis [a phase relationship located on a Q axis (90-degree axis)]) in the phase relationship diagram. In addition, "I+Q" indicates a 45-degree relationship (namely, a phase relationship displaced by 45 degrees with respect to the I axis in the phase relationship diagram). In addition, "I−Q" indicates a 135-degree relationship (namely, a phase relationship displaced by 135 degrees with respect to the I axis) in the phase relationship diagram. In addition, FIG. 1B is a phase relationship diagram, and illustrates a phase relationship of light output in response to a relative phase difference between 8PSK signal light and LO light.

Here, the MMI coupler 2 at the preceding stage is a 2:8 MMI coupler that includes two channels on the input side thereof, and eight channels on the output side thereof.

Specifically, the MMI coupler 2 is a 2:8 MMI coupler that is based on paired interference (PI). That is, the MMI coupler 2 is a 2:8 MMI coupler in which the centers of the two input channels are positioned at ⅓ and ⅔ from the upper side of the width of the input end, respectively, the positions of the eight output channels are also associated with the positions of the input channels, and a higher-order mode of the (3s−1)th order (s is a natural number greater than or equal to 1) is not excited in the MMI region. Therefore, the device length can be reduced.

Here, the present optical hybrid circuit 1 uses mode interference action by the MMI coupler.

Typically, interference action between modes of an MMI coupler relies upon the refractive index, excited mode number, interference mechanism or the like of the MMI coupler, and the amplitude relationship and the phase relationship of output signals of the MMI coupler vary depending upon the interference action between the modes.

For example, in a case of an 8:8 MMI coupler illustrated in FIG. 22, by suitably selecting two input channels, a 45-degree hybrid operation is obtained.

Here, the 8:8 MMI coupler is based on general interference (GI). That is, the 8:8 MMI coupler is an 8:8 MMI coupler in which the centers of the eight input channels thereof are positioned in a region other than the positions of ⅓, ½, and ⅔ of the MMI width within a range within which the center symmetric property of the MMI waveguide is not lost, and all modes according to the MMI width are excited.

In this case, the minimum propagation length $z^{GI}$ for obtaining an P equal branching characteristic (P is an integer greater than or equal to 1) is given by the following expression:

$$z^{GI} = (3 * L_\pi)/P \tag{1}$$

Here, $L_\pi$ is a beat length, and indicates a length corresponding to a propagation constant difference between a zero-order mode and a first-order mode that is π.

Accordingly, in the case of the 8:8 MMI coupler, as illustrated in FIG. 22, the minimum propagation length $z^{GI}$ for branching into eight equal branches is $(3*L_\pi)/8$.

On the other hand, for example, in a case of the 2:8 MMI coupler based on PI, as illustrated in FIG. 1A, the minimum propagation length $z^{PI}$ for obtaining a P equal branching characteristic is given by the following expression, and has a value equal to ⅓ that of $z^{GI}$:

$$z^{PI} = L_\pi/P = (1/3) * z^{GI} \tag{2}$$

That is, according to the expression (1) and the expression (2), mentioned above, when the MMI width $W_M$ is equal, the 2:8 MMI coupler has a MMI length equal to ⅓ that of the 8:8 MMI coupler.

Accordingly, however, as illustrated in FIGS. 1 and 22, however, the output channel positions are different depending upon the interference mechanism; and even if the MMI width $W_M$ is equal, the minimum distance (Gap) between the input/output channels (that is, the distance between the output channels) is not equal. In any MMI coupler, the MMI width $W_M$ may be reduced in order to reduce the MMI length; and hence, the minimum distance between the input/output channels decreases. It is to be noted that the minimum distance between the input/output channels normally is a parameter restricted by a fabrication technique.

Since the minimum distance between the input/output channels of the MMI coupler based on PI is smaller than that of the MMI coupler based on GI, the MMI width $W_{M2:8}$ based on PI may be increased in order to fix the minimum distance between the input/output channels.

Accordingly, $z^{PI}$ where the minimum distance between the input/output channels is fixed is represented by the following expression:

$$z^{PI} = (3/4) * z^{GI} \tag{3}$$

That is, if the minimum distance between the input/output channels is fixed, the shortening effect by PI decreases to ¾ time. The MMI coupler based on PI constantly has, nevertheless, an interaction length (propagation length: MMI length) shorter than that of the MMI coupler based on GI, which is effective for forming a compact device (light branching and coupling device).

Figure 2B:
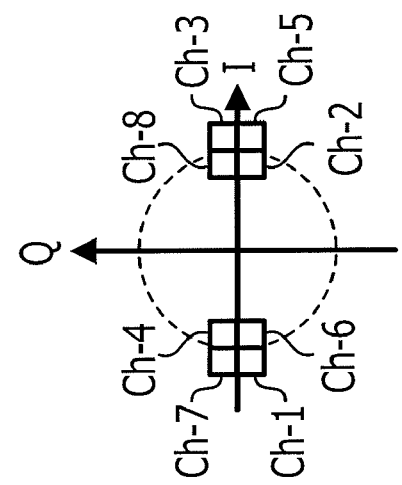
FIG. 2B is a phase relationship diagram illustrating a phase relationship of light output from each of the channels of the 2:8 MMI coupler illustrated in FIG. 2A.
Figure 2A:
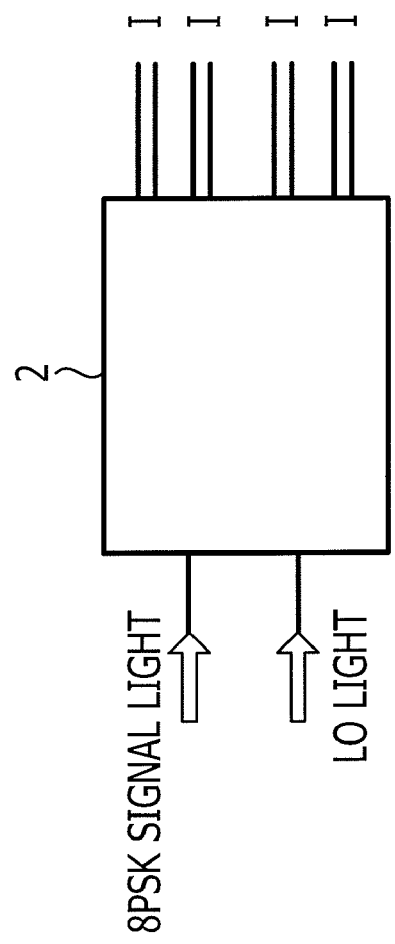
FIG. 2A is a pattern diagram illustrating action by a 2:8 MMI coupler that is included in the optical hybrid circuit according to the first embodiment.

As illustrated in FIGS. 2A and 2B, when the 8PSK signal light and the LO light are input to the 2:8 MMI coupler 2, four pairs of optical signals, each pair of which have an in-phase relationship with each other, are output. That is, a pair of first optical signals that have an in-phase relationship (I) with each other are output from two output channels of the eight output channels of the 2:8 MMI coupler 2, which are positioned on the first and the second from the upper side, as illustrated in FIG. 2A. In addition, a pair of second optical signals that have an in-phase relationship (I) with each other are output from two output channels of the eight output channels of the 2:8 MMI coupler 2, which are positioned on the third and the fourth from the upper side, as illustrated in FIG. 2A. In addition, a pair of third optical signals that have an in-phase relationship (I) with each other are output from two output channels of the eight output channels of the 2:8 MMI coupler 2, which are positioned on the fifth and the sixth from the upper side, as illustrated in FIG. 2A. In addition, a pair of fourth optical signals that have an in-phase relationship (I) with each other are output from two output channels of the eight output channels of the 2:8 MMI coupler 2, which are positioned on the seventh and the eighth from the upper side, as illustrated in FIG. 2A.

That is, in the case of the 2:8 MMI coupler 2, when what relationship the phase of the LO light (L) has relatively with reference to the phase of the 8PSK signal light (S) is illustrated, the following relationship (referred to as "first relationship", hereinafter) is obtained. Here, it is illustrated that S−L and S+L have a phase relationship displaced by 180 degrees from each other.

Ch-1→S+L
Ch-2→S−L
Ch-3→S−L
Ch-4→S+L
Ch-5→S+L
Ch-6→S−L
Ch-7→S−L
Ch-8→S+L

Therefore, only when the relative phase difference $\Delta\psi$ between the 8PSK signal light and the LO light is 0 or $\pi$ (I component), the relative phase difference $\Delta\psi$ can be distinguished. On the other hand, when the relative phase difference $\Delta\psi$ between the 8PSK signal light and the LO light is $(-\pi/2)$ or $(+\pi/2)$ (Q component), $(-3*\pi/4)$ or $(+\pi/4)$ (I+Q component), or $(+3*\pi/4)$ or $(-\pi/4)$ (I−Q component), the relative phase difference $\Delta\psi$ is impossible to distinguish.

Accordingly, as illustrated in the phase relationship diagram in FIG. 2B, while the 2:8 MMI coupler 2 functions as a 180-degree hybrid, the 2:8 MMI coupler 2 does not function as a 45-degree hybrid. For example, when the 2:8 MMI coupler 2 that has a center symmetrical structure as a 2:8 MMI coupler based on PI is used, it is impossible in principle to cause the 2:8 MMI coupler 2 to operate as a 45-degree hybrid.

On the other hand, in order to obtain a 45-degree hybrid operation, the following relationship (referred to hereinafter as "second relationship") may be satisfied between the 8PSK signal light (S) and the LO light (L) in the eight output channels:

Ch-1→S+L
Ch-2→S−L
Ch-3→S+j*L
Ch-4→S−j*L
Ch-5→S−(1+j)*L
Ch-6→S+(1+j)*L
Ch-7→S+(1−j)*L
Ch-8→S−(1−j)*L

Here, it is illustrated that S−L and S+L have a phase relationship displaced by 180 degrees from each other. In addition, it is illustrated that S+j*L and S−j*L have a phase relationship displaced by 90 degrees with respect to S+L and S−L. In addition, it is illustrated that S−(1+j)*L and S+(1+j)*L have a phase relationship displaced by 45 degrees with respect to S+L and S−L. In addition, it is illustrated that S+(1−j)*L and S−(1−j)*L have a phase relationship displaced by 135 degrees with respect to S+L and S−L.

Figure 3B:
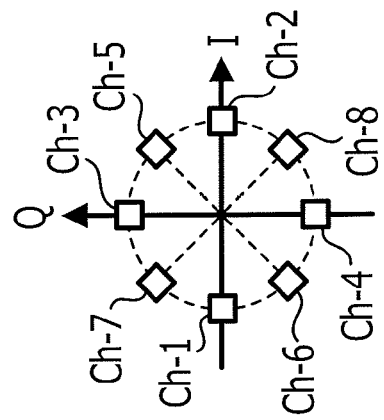
FIG. 3B is a phase relationship diagram illustrating a phase relationship of light output from each of the channels of the 2:8 MMI coupler and the three 2:2 MMI couplers illustrated in FIG. 3A.
Figure 3A:
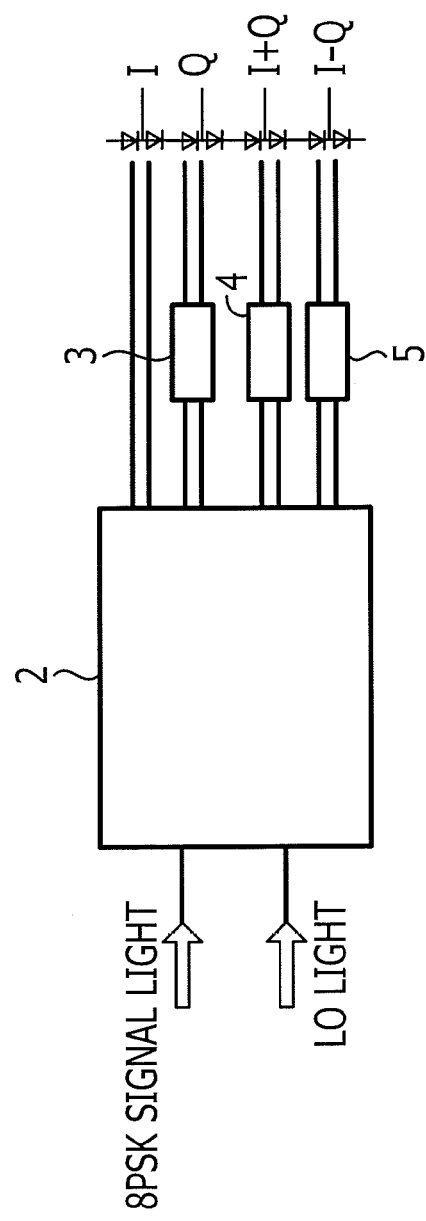
FIG. 3A is a pattern diagram illustrating operation by the 2:8 MMI coupler and three 2:2 MMI couplers that are included in the optical hybrid circuit according to the first embodiment.

Accordingly, in the present embodiment, as illustrated in FIG. 3A, three 2:2 optical couplers 3 to 5 are provided as optical couplers at the succeeding stage. That is, the 2:2 optical couplers 3 to 5 are coupled to three pairs of output channels from among the four pairs of output channels of the 2:8 MMI coupler 2, respectively.

Here, a 2:2 optical coupler (first 2:2 optical coupler) 3 is coupled to two channels (namely, a pair of second output channels that are adjacent to each other) positioned on the third and the fourth from the top of the output side of the 2:8 MMI coupler 2. In addition, a 2:2 optical coupler (second 2:2 optical coupler) 4 is coupled to two channels (namely, a pair of third output channels that are adjacent to each other) positioned on the fifth and the sixth from the top of the output side of the 2:8 MMI coupler 2. In addition, a 2:2 optical coupler (third 2:2 optical coupler) 5 is coupled to two channels (namely, a pair of fourth output channels that are adjacent to each other) positioned on the seventh and the eighth from the top of the output side of the 2:8 MMI coupler 2.

Here, the 2:2 optical coupler 3 is a 2:2 optical coupler that includes two channels on the input side thereof and two channels on the output side thereof, and has a branching ratio of 50:50.

The 2:2 optical coupler 4 is a 2:2 optical coupler that includes two channels on the input side thereof and two channels on the output side thereof, and has a branching ratio of 85:15.

The 2:2 optical coupler 5 is a 2:2 optical coupler that includes two channels on the input side thereof and two channels on the output side thereof, and has a branching ratio of 85:15.

In the present embodiment, the three 2:2 optical couplers 3 to 5 are 2:2 MMI couplers. In addition, the 2:2 MMI couplers 3 to 5 may be 2:2 MMI couplers based on PI, or 2:2 MMI couplers based on GI.

In order to have such a structural arrangement, the present optical hybrid circuit 1 includes two channels on the input side thereof and eight channels on the output side thereof.

The 8PSK signal light is input to one channel on the input side of the optical hybrid circuit 1 (namely, one channel on the input side of the 2:8 MMI coupler 2). In other words, the one channel on the input side of the optical hybrid circuit 1 is an input channel for inputting the 8PSK signal light. In addition, the local oscillator (LO) light is input to the other channel on the input side of the optical hybrid circuit 1 (namely, the other channel on the input side of the 2:8 MMI coupler 2). In other words, the other channel on the input side of the optical hybrid circuit 1 is an input channel for inputting the LO light.

In addition, as illustrated in FIGS. 2A and 2B, the 2:8 MMI coupler 2 converts the 8PSK signal light into a pair of first optical signals that have an in-phase (In-phase) relationship with each other, a pair of second optical signals that have an in-phase relationship with each other, a pair of third optical signals that have an in-phase relationship with each other, and a pair of fourth optical signals that have an in-phase relationship with each other. That is, the 8PSK signal light is converted into the pair of first optical signals that include no quadrature phase component (Q component) and only in-phase components (I components), the pair of second optical signals that include no quadrature phase component and only in-phase components, the pair of third optical signals that include no quadrature phase component and only in-phase components, and the pair of fourth optical signals that include no quadrature phase component and only in-phase components.

In addition, a pair of optical signals that have an in-phase relationship with each other (namely, a pair of optical signals that include only in-phase components), is a pair of optical signals that have a phase relationship displaced by 180 degrees from each other. That is, the pair of optical signals that have an in-phase relationship with each other is located on the I axis (0-degree axis) in the phase relationship diagram.

In addition, in FIG. 2A, "I" indicates an in-phase relationship (namely, a phase relationship located on an I axis (0-degree axis)) in the phase relationship diagram. In addition, FIG. 2B is a phase relationship diagram, and illustrates a phase relationship of lights output in response to a relative phase difference between the 8PSK signal light and the LO light.

Here, the pair of first optical signals is output from two channels (namely, a pair of first output channels that are adjacent to each other) positioned on the first and the second from the top of the output side of the 2:8 MMI coupler 2 (namely, two channels positioned on the first and the second from the top of the output side of the optical hybrid circuit 1). In addition, the pair of first optical signals output from the pair of first output channels is the pair of first optical signals that have an in-phase relationship with each other. Using the pair of first optical signals output from the pair of first output channels, it can be distinguished that the relative phase difference $\Delta\psi$ between the 8PSK signal light and the LO light is 0 or $\pi$. Therefore, the pair of first optical signals that have an in-phase relationship with each other is a pair of optical signals that can distinguish the in-phase component (I component) of the 8PSK signal light.

In addition, the pair of second optical signals is output from two channels (namely, a pair of second output channels that are adjacent to each other) positioned on the third and the fourth from the top of the output side of the 2:8 MMI coupler 2, and input to two channels positioned on the first and the second from the top of the input side of the 2:2 MMI coupler 3.

In addition, the pair of third optical signals is output from two channels (namely, a pair of third output channels that are adjacent to each other) positioned on the fifth and the sixth from the top of the output side of the 2:8 MMI coupler 2, and input to two channels positioned on the first and the second from the top of the input side of the 2:2 MMI coupler 4.

In addition, the pair of fourth optical signals is output from two channels (namely, a pair of fourth output channels that are adjacent to each other) positioned on the seventh and the eighth from the top of the output side of the 2:8 MMI coupler 2, and input to two channels positioned on the first and the second from the top of the input side of the 2:2 MMI coupler 5.

Next, as illustrated in FIGS. 3A and 3B, the 2:2 MMI coupler 3 converts the pair of second optical signals into a pair of fifth optical signals that have a quadrature phase relationship with the pair of first optical signals. That is, the pair of second optical signals that include only in-phase components (I components) is converted into the pair of fifth optical signals that include only quadrature phase components (Q components). In addition, the pair of fifth optical signals is output from two channels positioned on the first and the second from the top of the output side of the 2:2 MMI coupler 3 (namely, two channels positioned on the third and the fourth from the top of the output side of the optical hybrid circuit 1).

In addition, a pair of optical signals that have a quadrature phase relationship is a pair of optical signals the phases of which are advanced by 90 degrees (or a pair of optical signals the phases of which are delayed by 90 degrees) with respect to a pair of optical signals that have an in-phase relationship. That is, the pair of optical signals that have the quadrature phase relationship is located on the Q axis (90-degree axis) that is perpendicular to the I axis, in the phase relationship diagram. In addition, using the pair of fifth optical signals that have the quadrature phase relationship, it can be distinguished that the relative phase difference $\Delta\psi$ between the 8PSK signal light and the LO light is $(-\pi/2)$ or $(+\pi/2)$. Therefore, the pair of fifth optical signals that have the quadrature relationship is a pair of optical signals that can distinguish the quadrature phase component (Q component) of the 8PSK signal light.

In addition, the 2:2 MMI coupler 4 converts the pair of third optical signals into a pair of sixth optical signals that have a 45-degree phase relationship with the pair of first optical signals. That is, the pair of third optical signals that include only in-phase components is converted into the pair of sixth optical signals that include only 45-degree phase components. In addition, the pair of sixth optical signals is output from two channels positioned on the first and the second from the top of the output side of the 2:2 MMI coupler 4 (namely, two channels positioned on the fifth and the sixth from the top of the output side of the optical hybrid circuit 1).

In addition, a pair of optical signals that have the 45-degree phase relationship is a pair of optical signals the phases of which are advanced by 45 degrees with respect to a pair of optical signals that have an in-phase relationship. That is, the pair of optical signals that have the 45-degree phase relationship is located on a 45-degree axis the phase of which is displaced by 45 degrees with respect to the phase of the I axis, in the phase relationship diagram. In addition, using the pair of sixth optical signals that have the 45-degree phase relationship, it can be distinguished that the relative phase difference $\Delta\psi$ between the 8PSK signal light and the LO light is $(-3*\pi/4)$ or $(+\pi/4)$. Therefore, the pair of sixth optical signals that have the 45-degree relationship is a pair of optical signals that can distinguish the 45-degree phase component (I+Q component) of the 8PSK signal light.

In addition, the 2:2 MMI coupler 5 converts the pair of fourth optical signals into a pair of seventh optical signals that have a 135-degree phase relationship with the pair of first optical signals. That is, the pair of fourth optical signals that include only in-phase components are converted into the pair of seventh optical signals that include only 135-degree phase components. In addition, the pair of seventh optical signals is output from two channels positioned on the first and the second from the top of the output side of the 2:2 MMI coupler 5 (namely, two channels positioned on the seventh and the eighth from the top of the output side of the optical hybrid circuit 1).

In addition, a pair of optical signals that have the 135-degree phase relationship is a pair of optical signals the phases of which are advanced by 135 degrees (or a pair of optical signals the phases of which are delayed by 45 degrees) with respect to a pair of optical signals that have an in-phase relationship. That is, the pair of optical signals that have the 135-degree phase relationship is located on a 135-degree axis the phase of which is displaced by 135 degrees with respect to the phase of the I axis, in the phase relationship diagram. In addition, using the pair of seventh optical signals that have the 135-degree phase relationship, it can be distinguished that the relative phase difference $\Delta\psi$ between the 8PSK signal light and the LO light is $(+3*\pi/4)$ or $(-\pi/4)$. Therefore, the pair of seventh optical signals that have the 135-degree relationship is a pair of optical signals that can distinguish the 135-degree phase component (I−Q component) of the 8PSK signal light.

In this case, the output intensity ratios of the beams of signal light individually output from the eight output channels of the optical hybrid circuit 1 differ depending upon the phase (0, π, –π/2, +π/2, +π/4, –3*π/4, +3*π/4, or –π/4) of the 8PSK signal light.

Therefore, using the pair of first optical signals output from the two channels positioned on the first and the second from the top of the output side of the optical hybrid circuit 1, the I component (Δψ=0, π) can be distinguished. In addition, using the pair of second optical signals output from the two channels positioned on the third and the fourth from the top of the output side of the optical hybrid circuit 1, the Q component (Δψ=–π/2, +π/2) can be distinguished. In addition, using the pair of third optical signals output from the two channels positioned on the fifth and the sixth from the top of the output side of the optical hybrid circuit 1, the I+Q component (Δψ=–3*π/4, +π/4) can be distinguished. In addition, using the pair of fourth optical signals output from the two channels positioned on the seventh and the eighth from the top of the output side of the optical hybrid circuit 1, the I–Q component (Δψ=+3*π/4, –π/4) can be distinguished.

In other words, in the present optical hybrid circuit 1, as illustrated in FIGS. 3A and 3B, the pair of first optical signals (I) that have the in-phase relationship, the pair of fifth optical signals (Q) that have the quadrature phase relationship, the pair of sixth optical signals (I+Q) that have the 45-degree phase relationship, and the pair of seventh optical signals (I–Q) that have the 135-degree phase relationship are output.

In addition, in FIG. 3A, "I" indicates an in-phase relationship (namely, a phase relationship located on an I axis (0-degree axis) in a phase relationship diagram). In addition, "Q" indicates a quadrature relationship (namely, a phase relationship displaced by 90 degrees with respect to the I axis [a phase relationship located on a Q axis (90-degree axis)] in the phase relationship diagram). In addition, "I+Q" indicates a 45-degree relationship (namely, a phase relationship displaced by 45 degrees with respect to the I axis) in the phase relationship diagram. In addition, "I–Q" indicates a 135-degree relationship (namely, a phase relationship displaced by 135 degrees with respect to the I axis) in the phase relationship diagram. In addition, FIG. 3B is a phase relationship diagram, and illustrates a phase relationship of light output in response to a relative phase difference between the 8PSK signal light and the LO light.

In this way, as illustrated in FIG. 3A, when the 2:2 MMI couplers 3 to 5 are provided at the succeeding stage of the 2:8 MMI coupler 2, components into which the signal light is combined with the LO light, which are output from the 2:8 MMI coupler 2 and satisfy the first relationship mentioned above, are input to the 2:2 MMI couplers 3 to 5 and output through interference action. Accordingly, components individually output from the eight output channels of the optical hybrid circuit 1 satisfy the second relationship discussed above, and the optical hybrid circuit 1 functions as a 45-degree hybrid.

In this regard, however, the precondition of the 45-degree hybrid operation is that the outputs of the 2:8 MMI coupler 2 satisfy the first relationship discussed above; and phase matching is established between the output signals individually output from the four pairs of output channels of the 2:8 MMI coupler 2 and the 2:2 MMI couplers 3 to 5.

Typically, while the 2:8 MMI coupler 2 based on PI has a characteristic that light branches in equal amplitudes, the 2:8 MMI coupler 2 has no characteristic that lights branch in equal phases. A relative phase difference between output channels of each pair of the four pairs of output channels when light branches into eight equal branches greatly differs depending on the positions of input channels.

As illustrated in FIG. 3A, when the 2:2 MMI couplers 3 to 5 are coupled to the three pairs of output channels of the 2:8 MMI coupler 2, respectively, relative phase differences between output channels of the three pairs of output channels of the 2:8 MMI coupler 2 may have phase matching with the 2:2 MMI couplers 3 to 5, respectively. If the phase matching condition is not satisfied, the characteristic is greatly deteriorated; and hence, the optical hybrid circuit 1 does not function as a 45-degree hybrid.

Figure 4:
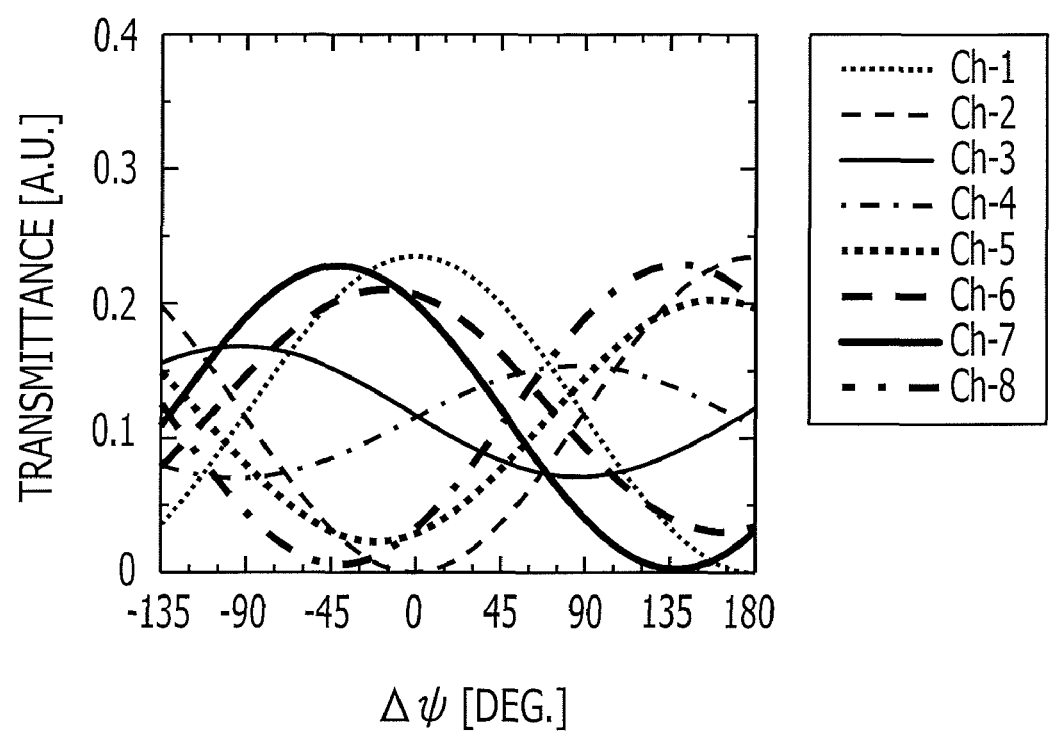
FIG. 4 is a diagram illustrating a subject of the optical hybrid circuit that has such a configuration as illustrated in FIG. 3A and illustrating a relative output intensity (Transmittance) of the 45-degree hybrid with respect to $\Delta\psi$.

Here, FIG. 4 illustrates in units of channels a transmission characteristic (output intensity ratio: relative output intensity: transmittance) with respect to the relative phase difference Δψ between 8PSK signal light and LO light when the 8PSK signal light and the LO light are input in the configuration illustrated in FIG. 3A. In addition, in FIG. 4, a.u. on the vertical axis means an arbitrary unit.

As illustrated in FIG. 4, on the basis of a relationship of branching ratios of the output channels, it turns out that, other than an I component (Δψ=0, π), a Q component (Δψ=–π/2, +π/2), an (I+Q) component (Δψ=–3*π/4, +π/4), and an (I–Q) component (Δψ=+3*π/4, –π/4) are impossible to distinguish. This is because a relative phase difference between output channels of each pair of the three pairs of output channels of the 2:8 MMI coupler 2 does not have phase matching with each of the 2:2 MMI couplers 3 to 5. Therefore, in order for the optical hybrid circuit 1 to function as a 45-degree hybrid, it may be necessary to satisfy the phase matching condition.

Accordingly, in the present embodiment, as illustrated in FIG. 1A, phase controlling regions 6 to 8, which can control phases so as to prevent deterioration of characteristics, are provided between the 2:8 MMI coupler 2 and the individual 2:2 MMI couplers 3 to 5. In addition, the phase controlling region 6 provided between the 2:8 MMI coupler 2 and the first 2:2 MMI coupler 3 is called a first phase controlling region. In addition, the phase controlling region 7 provided between the 2:8 MMI coupler 2 and the second 2:2 MMI coupler 4 is called a second phase controlling region. In addition, the phase controlling region 8 provided between the 2:8 MMI coupler 2 and the third 2:2 MMI coupler 5 is called a third phase controlling region.

Here, the following Table 1 illustrates phase matching conditions of the phase controlling regions 6 to 8 in the optical hybrid circuit 1 as illustrated in FIG. 1.

Here, θ indicates a phase variation amount (rotation angle notation). In addition, $\theta_A - \theta_B$ [A and B are output channel numbers (output port numbers) of the 2:8 MMI coupler] indicates a relative phase difference between two beams of light that are output from a pair of output channels of the 2:8 MMI coupler 2 and the phases of which are controlled by one of the phase controlling regions 6 to 8 (namely, the two beams of light (a pair of optical signals) input to one of the 2:2 MMI couplers 3 to 5).

TABLE 1

| Phase Matching Object | Phase Controlling Region | Phase Matching Condition |
|---|---|---|
| Q component | $\theta_3-\theta_4$ | +3 * π/8 |
| (I + Q) component | $\theta_5-\theta_6$ | +5 * π/8 |
| (I – Q) component | $\theta_7-\theta_8$ | +7 * π/8 |

As illustrated in Table 1, when the 2:2 MMI couplers 3 to 5 are provided at the succeeding stage of the 2:8 MMI coupler 2, phase matching may be established regardless of branching ratios.

Specifically, the phase of light (a pair of second optical signals) output from one (or both) of the third and fourth output channels of the 2:8 MMI coupler 2 may be controlled in the phase controlling region 6 so that the phase difference $\theta_3-\theta_4$ of two beams of light input to two channels on the input side of the 2:2 MMI coupler 3 becomes $(+3*\pi/8)$. Accordingly, the Q component $(\Delta\psi=-\pi/2, +\pi/2)$ can be distinguished.

In addition, the phase of light (a pair of third optical signals) output from one (or both) of the fifth and sixth output channels of the 2:8 MMI coupler 2 may be controlled in the phase controlling region 7 so that the phase difference $\theta_5-\theta_6$ of two beams of light input to two channels on the input side of the 2:2 MMI coupler 4 becomes $(+5*\pi/8)$. Accordingly, the (I+Q) component $(\Delta\psi=-3*\pi/4, +\pi/4)$ can be distinguished.

In addition, the phase of light (a pair of fourth optical signals) output from one (or both) of the seventh and eighth output channels of the 2:8 MMI coupler 2 may be controlled in the phase controlling region 8 so that the phase difference $\theta_7-\theta_8$ of two beams of light input to two channels on the input side of the 2:2 MMI coupler 5 becomes $(+7*\pi/8)$. Accordingly, the (I−Q) component $(\Delta\psi=+3*\pi/4, -\pi/4)$ can be distinguished.

More particularly, a phase matching amount may be increased to a maximum value so as to distinguish the (I−Q) component $(\Delta\psi=+3*\pi/4, -\pi/4)$. In other words, if the phase controlling region 8 is not provided for controlling the phase of light (a pair of fourth optical signals) output from one (or both) of the seventh and eighth output channels of the 2:8 MMI coupler 2, the level of characteristic degradation becomes greatest.

In the present embodiment, a phase shifter 9 (9A, 9B) is provided in each of the phase controlling regions 6 to 8. In addition, the phase shifter 9 (9A, 9B) provided in the first phase controlling region 6 is called a first phase shifter. In addition, the phase shifter 9 (9A, 9B) provided in the second phase controlling region 7 is called a second phase shifter. In addition, the phase shifter 9 (9A, 9B) provided in the third phase controlling region 8 is called a third phase shifter.

Here, FIGS. 5A and 5B illustrate the structures of the phase shifters 9 (9A, 9B) used in the phase controlling regions 6 to 8.

FIG. 5A illustrates the phase shifter 9A that has a width-decreasing tapered structure in which a waveguide width linearly decreases from the input end toward a middle position in the lengthwise direction, and linearly increases from the middle position in the lengthwise direction toward the output end. This is also called a width-decreasing tapered waveguide type phase shifter. In addition, since the phase shifter 9A is a width tapered waveguide that has a linearly tapered shape, the phase shifter 9A is also called a linearly tapered waveguide.

In a case in which the phase shifter 9A that has such a width-decreasing tapered structure is provided on one of a pair of output channels (optical waveguides), since the propagation constant of the output channel decreases, a phase is relatively delayed. That is, the phase shifter 9A that has the width-decreasing tapered structure has a function for shifting the phase of an optical signal in a direction in which the phase thereof is delayed.

On the other hand, FIG. 5B illustrates the phase shifter 9B that has a width-increasing tapered structure in which a waveguide width linearly increases from the input end toward a middle position in the lengthwise direction, and linearly decreases from the middle position in the lengthwise direction toward the output end. This is also called a width-increasing tapered waveguide type phase shifter. In addition, since the phase shifter 9B is a width tapered waveguide that has a linearly tapered shape, the phase shifter 9B is also called a linearly tapered waveguide.

In a case in which the phase shifter 9B that has such a width-increasing tapered structure is provided on one of a pair of output channels (optical waveguides), since the propagation constant of the output channel increases, a phase is relatively advanced. That is, the phase shifter 9B that has the width-increasing tapered structure has a function for shifting the phase of an optical signal in a direction in which the phase thereof is advanced.

Here, it may be assumed that the waveguide widths of the input ends and output ends of the tapered waveguide type phase shifters 9A and 9B are W. In addition, the waveguide widths W of the input ends and output ends of the tapered waveguide type phase shifters 9A and 9B are the same as waveguide widths of portions other than the tapered waveguide type phase shifters 9A and 9B.

In addition, it may be assumed that differences between the waveguide widths of the input ends or the output ends of the tapered waveguide type phase shifters 9A and 9B and the waveguide widths thereof at the middle positions in the lengthwise directions (namely, the variations of the waveguide widths of the tapered waveguide type phase shifters 9A and 9B, are $\Delta W_{TP}$ ($\Delta W_{TP}>0$)). Therefore, the waveguide widths of the tapered waveguide type phase shifters 9A and 9B at the middle positions in the lengthwise directions are $W-\Delta W_{TP}$ and $W+\Delta W_{TP}$, respectively.

In addition, it may be assumed that the lengths from the input ends or the output ends of the tapered waveguide type phase shifters 9A and 9B to the middle positions in the lengthwise directions (namely, taper lengths) are $L_{TP}$. In addition, the lengths from the input ends of the tapered waveguide type phase shifters 9A and 9B to the output ends thereof (namely, phase shifter lengths) are $L_{Phase}$.

By providing one or both of the phase shifters 9A and 9B that have such configurations in the individual phase controlling regions 6 to 8, the phase matching condition discussed above can be satisfied.

Here, the phase shifter 9 (9A, 9B) that has a width-decreasing tapered structure or a width-increasing tapered structure may be provided by varying in a tapered manner the waveguide width of one of two optical waveguides (a pair of second output channels) formed between the third and fourth output ports of the 2:8 MMI coupler 2 and the two input ports of the 2:2 MMI coupler 3. That is, the phase shifter 9 (9A, 9B) the width of which varies in a tapered manner may be provided in one of a pair of output channels of the 2:8 MMI coupler 2 to which the 2:2 MMI coupler 3 is coupled. In addition, the phase shifter 9A that has a width-decreasing tapered structure may be provided in one of two optical waveguides formed between the third and fourth output ports of the 2:8 MMI coupler 2 and the two input ports of the 2:2 MMI coupler 3, and the phase shifter 9B that has a width-increasing tapered structure may be provided in the other of the two optical waveguides.

In addition, the phase shifter 9 (9A, 9B) that has a width-decreasing tapered structure or a width-increasing tapered structure may be provided by varying in a tapered manner the waveguide width of one of two optical waveguides (a pair of third output channels) formed between the fifth and sixth output ports of the 2:8 MMI coupler 2 and the two input ports of the 2:2 MMI coupler 4. That is, the phase shifter 9 (9A, 9B) the width of which varies in a tapered manner may be provided in one of a pair of output channels of the 2:8 MMI coupler 2 to which the 2:2 MMI coupler 4 is coupled. In addition, the phase shifter 9A that has a width-decreasing tapered structure may be provided in one of two optical waveguides formed between the fifth and sixth output ports of the 2:8 MMI coupler 2 and the two input ports of the 2:2 MMI coupler 4, and the phase shifter 9B that has a width-increasing tapered structure may be provided in the other of the two optical waveguides.

In addition, the phase shifter 9 (9A, 9B) that has a width-decreasing tapered structure or a width-increasing tapered structure may be provided by varying in a tapered manner the waveguide width of one of two optical waveguides (a pair of fourth output channels) formed between the seventh and eighth output ports of the 2:8 MMI coupler 2 and the two input ports of the 2:2 MMI coupler 5. That is, the phase shifter 9 (9A, 9B) the width of which varies in a tapered manner may be provided in one of a pair of output channels of the 2:8 MMI coupler 2 to which the 2:2 MMI coupler 5 is coupled. In addition, the phase shifter 9A that has a width-decreasing tapered structure may be provided in one of two optical waveguides formed between the seventh and eighth output ports of the 2:8 MMI coupler 2 and the two input ports of the 2:2 MMI coupler 5; and the phase shifter 9B that has a width-increasing tapered structure may be provided in the other of the two optical waveguides.

In this regard, however, as illustrated in Table 1, since a phase matching condition differs depending on the output channel of the 2:8 MMI coupler 2, the shapes of the phase shifters 9 (9A, 9B) individually provided in the pair of third output channels, the pair of fourth output channels, and the pair of fifth output channels are different from one another.

Figure 6A:
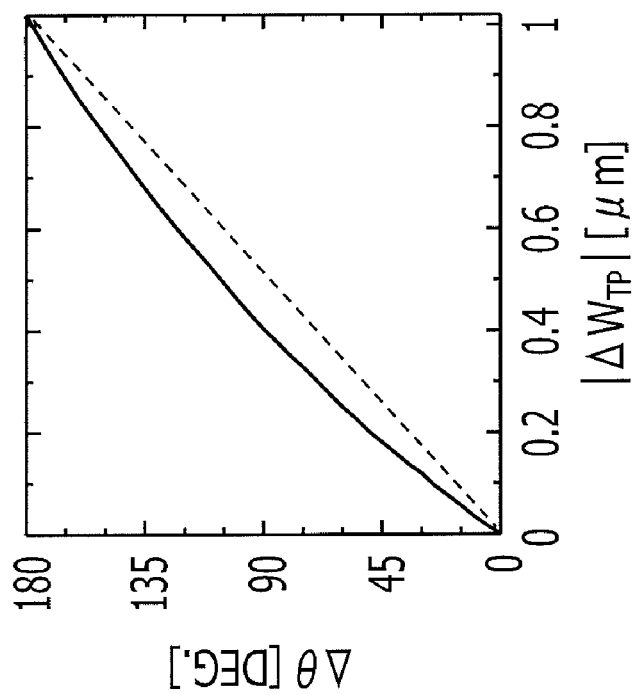
FIG. 6A is a diagram illustrating a relationship between $|\Delta W_{TP}|$ and $\Delta\theta$ where a width-decreasing tapered waveguide type phase shifter is used as the phase shifter included in the optical hybrid circuit according to the first embodiment.
Figure 6B:
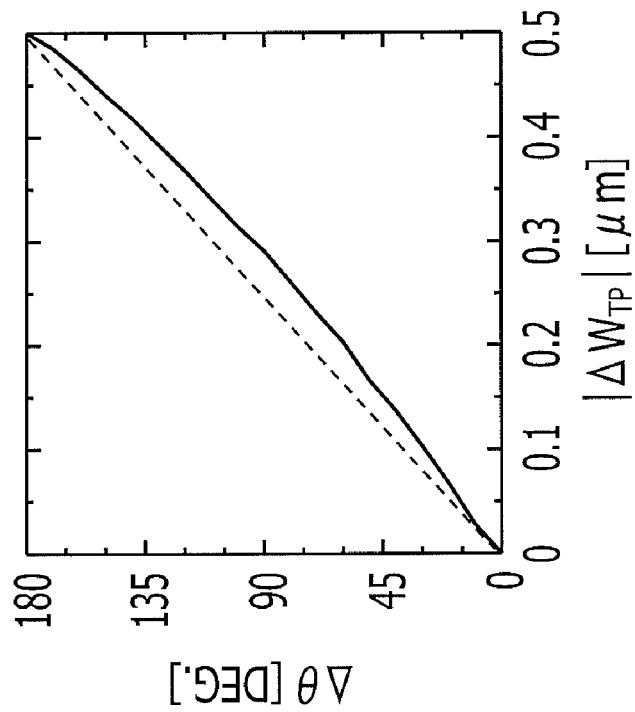
FIG. 6B is a diagram illustrating a relationship between $|\Delta W_{TP}|$ and $\Delta\theta$ where a width-increasing tapered waveguide type phase shifter is used as the phase shifter included in the optical hybrid circuit according to the first embodiment.

Here, FIG. 6A illustrates a phase variation amount $\Delta\theta$ of the width-decreasing tapered waveguide type phase shifter 9A as illustrated in FIG. 5A with respect to $|\Delta W_{TP}|$; and FIG. 6B illustrates a phase variation amount $\Delta\theta$ of the width-increasing tapered waveguide type phase shifter 9B as illustrated in FIG. 5B with respect to $|\Delta W_{TP}|$.

Here, W, $L_{TP}$, and $L_{Phase}$ are set to 2 µm, 50 µm, and 100 µm, respectively. In addition, W, $L_{TP}$, and $L_{Phase}$ are values that are not specifically limited, and may be freely set depending on the situation.

Using the relationships illustrated in FIGS. 6A and 6B, the shapes of the phase shifters 9 (9A, 9B) provided in the individual phase controlling regions 6 to 8 may be determined so as to satisfy the phase matching conditions illustrated in Table 1 discussed above.

Here, the following Table 2 is an example of the setting of the phase shifter (PS) 9 (9A, 9B), which satisfies a phase matching condition.

TABLE 2

| Phase Matching Condition | First Example (width-Decreasing Tapered) | | Second Example (width-Increasing Tapered) | |
|---|---|---|---|---|
| | Upper PS | Lower PS | Upper PS | Lower PS |
| +3 * π/8 | 0 | −3 * π/8 | +3 * π/8 | 0 |
| +5 * π/8 | 0 | −5 * π/8 | +5 * π/8 | 0 |
| +7 * π/8 | 0 | −7 * π/8 | +7 * π/8 | 0 |

First, a first example in Table 2 indicates a case in which the width-decreasing tapered waveguide type phase shifter 9A is used as the phase shifter 9.

In the first example in Table 2, the width-decreasing tapered waveguide type phase shifter 9A is provided in an optical waveguide formed between the fourth (lower side) output port of the 2:8 MMI coupler 2 and the second (lower side) input port of the 2:2 MMI coupler 3. In addition, no width-decreasing tapered waveguide type phase shifter 9A is provided in an optical waveguide formed between the third (upper side) output port of the 2:8 MMI coupler 2 and the first (upper side) input port of the 2:2 MMI coupler 3.

In addition, the width-decreasing tapered waveguide type phase shifter 9A causes the phase of light input to the second input port of the 2:2 MMI coupler 3 to be delayed by 3*π/8 (−3*π/8) with respect to the phase of light input to the first input port of the 2:2 MMI coupler 3. Accordingly, a relative phase difference $\theta_3$-$\theta_4$ between two beams of light individually input to two input channels on the input side of the 2:2 MMI coupler 3 becomes +3*π/8, thereby satisfying the phase matching condition.

In addition, in the first example in Table 2, the width-decreasing tapered waveguide type phase shifter 9A is provided in an optical waveguide formed between the sixth (lower side) output port of the 2:8 MMI coupler 2 and the second (lower side) input port of the 2:2 MMI coupler 4. In addition, no width-decreasing tapered waveguide type phase shifter 9A is provided in an optical waveguide formed between the fifth (upper side) output port of the 2:8 MMI coupler 2 and the first (upper side) input port of the 2:2 MMI coupler 4.

In addition, the width-decreasing tapered waveguide type phase shifter 9A causes the phase of light input to the second input port of the 2:2 MMI coupler 4 to be delayed by 5*π/8 (−5*π/8) with respect to the phase of light input to the first input port of the 2:2 MMI coupler 4. Accordingly, a relative phase difference $\theta_5$-$\theta_6$ between two beams of light individually input to two input channels on the input side of the 2:2 MMI coupler 4 becomes +5*π/8, thereby satisfying the phase matching condition.

In addition, in the first example in Table 2, the width-decreasing tapered waveguide type phase shifter 9A is provided in an optical waveguide formed between the eighth (lower side) output port of the 2:8 MMI coupler 2 and the second (lower side) input port of the 2:2 MMI coupler 5. In addition, no width-decreasing tapered waveguide type phase shifter 9A is provided in an optical waveguide formed between the seventh (upper side) output port of the 2:8 MMI coupler 2 and the first (upper side) input port of the 2:2 MMI coupler 5.

In addition, the width-decreasing tapered waveguide type phase shifter 9A causes the phase of light input to the second input port of the 2:2 MMI coupler 5 to be delayed by 7*π/8 (−7*π/8) with respect to the phase of light input to the first input port of the 2:2 MMI coupler 5. Accordingly, a relative phase difference $\theta_7$-$\theta_8$ between two beams of light individually input to two input channels on the input side of the 2:2 MMI coupler 5 becomes +7*π/8, thereby satisfying the phase matching condition.

Next, a second example in Table 2 indicates a case in which the width-increasing tapered waveguide type phase shifter 9B is used as the phase shifter 9.

In the second example in Table 2, the width-increasing tapered waveguide type phase shifter 9B is provided in an optical waveguide formed between the third (upper side) output port of the 2:8 MMI coupler 2 and the first (upper side) input port of the 2:2 MMI coupler 3. In addition, no width-increasing tapered waveguide type phase shifter 9B is provided in an optical waveguide formed between the fourth (lower side) output port of the 2:8 MMI coupler 2 and the second (lower side) input port of the 2:2 MMI coupler 3.

In addition, the width-increasing tapered waveguide type phase shifter 9B causes the phase of light input to the first input port of the 2:2 MMI coupler 3 to be advanced by 3*π/8 (+3*π/8) with respect to the phase of light input to the second input port of the 2:2 MMI coupler 3. Accordingly, a relative phase difference $\theta_3-\theta_4$ between two beams of light individually input to two input channels on the input side of the 2:2 MMI coupler 3 becomes $+3*\pi/8$, thereby satisfying the phase matching condition.

In addition, in the second example in Table 2, the width-increasing tapered waveguide type phase shifter 9B is provided in an optical waveguide formed between the fifth (upper side) output port of the 2:8 MMI coupler 2 and the first (upper side) input port of the 2:2 MMI coupler 4. In addition, no width-increasing tapered waveguide type phase shifter 9B is provided in an optical waveguide formed between the sixth (lower side) output port of the 2:8 MMI coupler 2 and the second (lower side) input port of the 2:2 MMI coupler 4.

In addition, the width-increasing tapered waveguide type phase shifter 9B causes the phase of light input to the first input port of the 2:2 MMI coupler 4 to be advanced by $5*\pi/8$ ($+5*\pi/8$) with respect to the phase of light input to the second input port of the 2:2 MMI coupler 4. Accordingly, a relative phase difference $\theta_5-\theta_6$ between two beams of light individually input to two input channels on the input side of the 2:2 MMI coupler 4 becomes $+5*\pi/8$, thereby satisfying the phase matching condition.

In addition, in the second example in Table 2, the width-increasing tapered waveguide type phase shifter 9B is provided in an optical waveguide formed between the seventh (upper side) output port of the 2:8 MMI coupler 2 and the first (upper side) input port of the 2:2 MMI coupler 5. In addition, no width-increasing tapered waveguide type phase shifter 9B is provided in an optical waveguide formed between the eighth (lower side) output port of the 2:8 MMI coupler 2 and the second (lower side) input port of the 2:2 MMI coupler 5.

In addition, the width-increasing tapered waveguide type phase shifter 9B causes the phase of light input to the first input port of the 2:2 MMI coupler 5 to be advanced by $7*\pi/8$ ($+7*\pi/8$) with respect to the phase of light input to the second input port of the 2:2 MMI coupler 5. Accordingly, a relative phase difference $\theta_7-\theta_8$ between two beams of light individually input to two input channels on the input side of the 2:2 MMI coupler 5 becomes $+7*\pi/8$, thereby satisfying the phase matching condition.

Accordingly, in the present optical hybrid circuit 1, as illustrated in FIGS. 1A and 1B, the pair of first optical signals (I) that have the in-phase relationship, the pair of fifth optical signals (Q) that have the quadrature phase relationship, the pair of sixth optical signals (I+Q) that have the 45-degree phase relationship, and the pair of seventh optical signals (I−Q) that have the 135-degree phase relationship are output, thereby certainly obtaining the 45-degree hybrid operation. That is, using the present optical hybrid circuit 1, the 8PSK signal light is converted into the pair of first optical signals that include only in-phase components (I components), the pair of fifth optical signals that include only quadrature components (Q components), the pair of sixth optical signals that include only 45-degree phase components (I+Q components), and the pair of seventh optical signals that include only 135-degree phase components (I−Q components).

In this way, in the present embodiment, the 2:2 optical coupler 3 that has a branching ratio of 50:50 is coupled to one pair of four pairs of output channels of the 2:8 MMI coupler 2 based on PI, the 2:2 optical couplers 4 and 5 that have branching ratios of 85:15 are coupled to two pairs of the four pairs of output channels, respectively; and the phase shifters 9 (phase controlling regions 6 to 8) are provided between the 2:8 MMI coupler 2 and the 2:2 optical couplers 3 to 5, thereby setting up an appropriate phase variation amount.

Next, a specific example of the configuration of an optical semiconductor device included in the present optical hybrid circuit will be described in reference to FIGS. 7 to 9.

Figure 7:
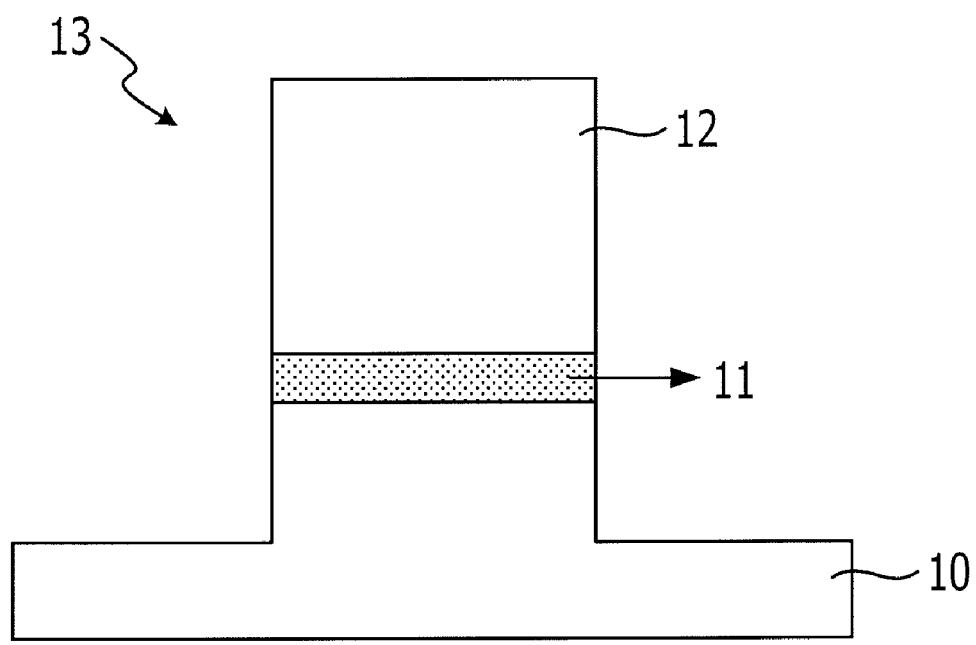
FIG. 7 is a schematic cross-section diagram illustrating a configuration of an optical semiconductor device included in the optical hybrid circuit according to the first embodiment.

As illustrated in FIG. 7, the present optical hybrid circuit 1 is an optical semiconductor device 13 that includes a GaInAsP core layer 11 and an InP cladding layer 12 on an InP substrate 10 and has a high mesa waveguide structure.

Such a high mesa waveguide structure is a high relative refractive index difference waveguide structure the relative refractive index difference Δn of which is high. The use of such a high relative refractive index difference waveguide structure has an advantage in reducing the size of the device. In addition, in the present embodiment, since it is not necessary for the optical waveguides to intersect with one another, excessive loss can be prevented while the device size is reduced using the high mesa waveguide structure.

On the other hand, since the 45-degree hybrid illustrated in FIG. 21 includes some regions, in which optical waveguides intersect with one another, between 1:4 optical couplers 100 and 101 and 2:2 optical couplers 102 to 105, the 45-degree hybrid has a disadvantage in that excessive loss occurs in the intersecting region. In particular, the excessive loss increases with an increase of the relative refractive index difference Δn of the optical waveguide. Therefore, while having an advantage in reducing the device size, the use of a high Δn waveguide structure such as the high mesa waveguide structure has a disadvantage for the excessive loss.

Here, the 2:8 MMI coupler 2 included in the present optical hybrid circuit 1 is designed as follows.

Figure 8:
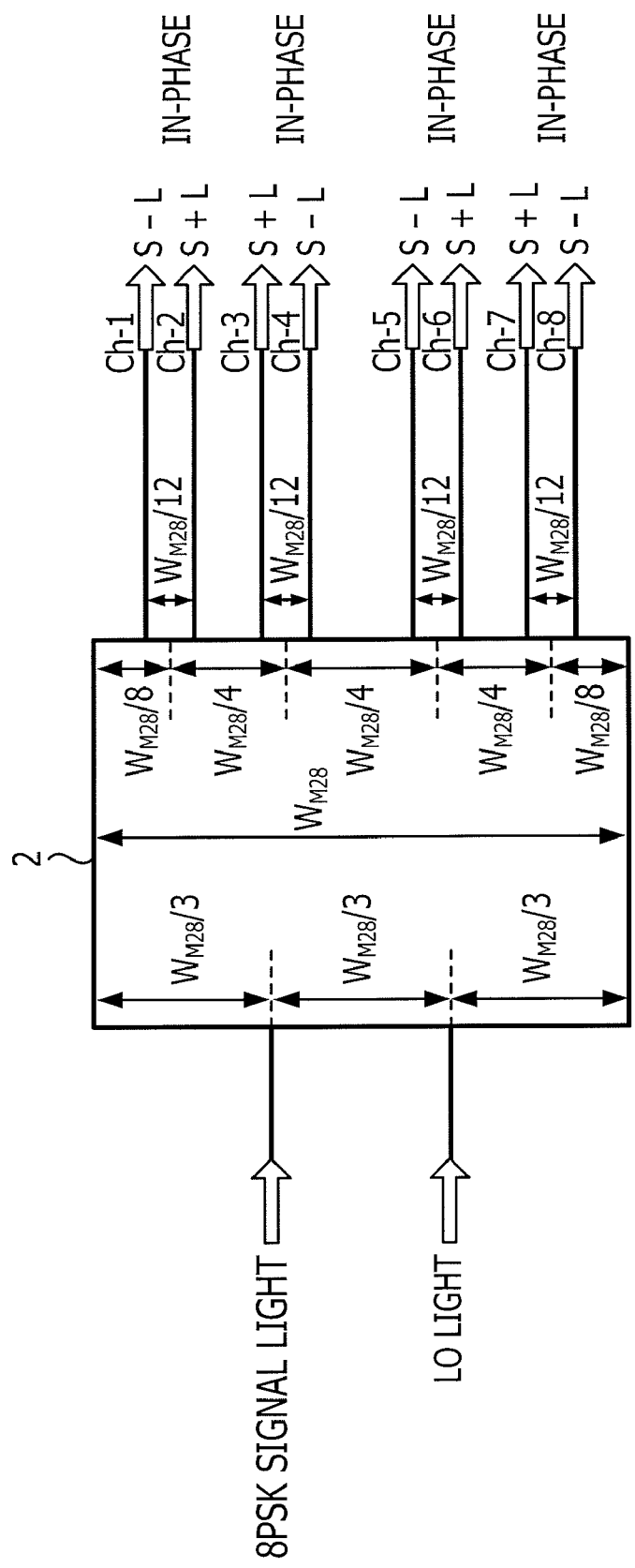
FIG. 8 is a pattern diagram illustrating a specific example of a configuration of a 2:8 MMI coupler included in the optical hybrid circuit according to the first embodiment.

As illustrated in FIG. 8, in the 2:8 MMI coupler 2, on the assumption that the width (MMI width) of the MMI region of the 2:8 MMI coupler 2 is $W_{M28}$, two input channels (input waveguides) are provided so that the centers of the two input channels are positioned at ⅓ and ⅔ from the upper side of the MMI width $W_{M28}$, respectively.

In addition, eight output channels (output waveguides: Ch-1 to Ch-8) are provided as follows. That is, a middle position of the first and second output channels (Ch-1, Ch-2) from above is positioned ⅛ from the upper side of the MMI width $W_{M28}$. In addition, each of a distance between the middle position of the first and second output channels from above and a middle position of the third and fourth output channels (Ch-3, Ch-4) from above, a distance between the middle position of the third and fourth output channels (Ch-3, Ch-4) from above and a middle position of the fifth and sixth output channels (Ch-5, Ch-6) from above, and a distance between the middle position of the fifth and sixth output channels (Ch-5, Ch-6) and a middle position of the seventh and eighth output channels (Ch-7, Ch-8) is set to ¼ the MMI width $W_{M28}$. In addition, the middle position of the seventh and eighth output channels (Ch-7, Ch-8) from above is positioned ⅛ from the lower side of the MMI width $W_{M28}$. In addition, each of a distance (gap) between the first and second output channels, a distance (gap) between the third and fourth output channels, a distance (gap) between the fifth and sixth output channels, and a distance (gap) between the seventh and eighth output channels is set to 1/12 the MMI width $W_{M28}$.

In addition, in FIG. 8, it is illustrated that S−L and S+L have a phase relationship displaced by 180 degrees from each other (namely, a pair of optical signals that have an in-phase relationship with each other) are output.

For example, in the 2:8 MMI coupler 2, the minimum distance between the input/output channels (namely, a distance between the output channels ($W_{M28}/12$)) is set to 3.0 μm, and the waveguide widths (input/output waveguide widths) W of the input channels and output channels are set to, for example, 2.0 μm, thereby satisfying the single mode condition. Consequently, the MMI width $W_{M28}$ becomes 36 μm. In this case, the length $L_{M28}$ of the 2:8 MMI coupler 2 becomes 451 μm.

In addition, the 2:2 MMI coupler 3 (branching ratio of 50:50) is designed as follows.

Figure 9B:
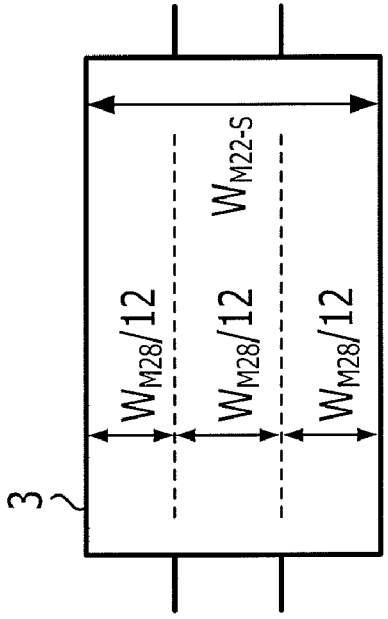
FIGS. 9A and 9B are pattern diagrams illustrating specific examples of a configuration of a first 2:2 MMI coupler included in the optical hybrid circuit according to the first embodiment.

As illustrated in FIG. 9B, when the 2:2 MMI coupler 3 is based on PI, on the basis of the MMI width $W_{M28}$ of the 2:8 MMI coupler 2, two input channels (input waveguides) are provided so that the centers of the two input channels are positioned at $W_{M28}/12$ from the side faces of the MMI region, respectively. In addition, two output channels (output waveguides) are provided so that the centers of two output channels are positioned at $W_{M28}/12$ from the side faces of the MMI region, respectively. Furthermore, each of the distances (gap) of two input/output channels is set to $W_{M28}/12$. Therefore, the width (MMI width) $W_{M22-S}$ of the MMI region of the 2:2 MMI coupler 3 becomes $W_{M28}/4$.

Figure 9A:
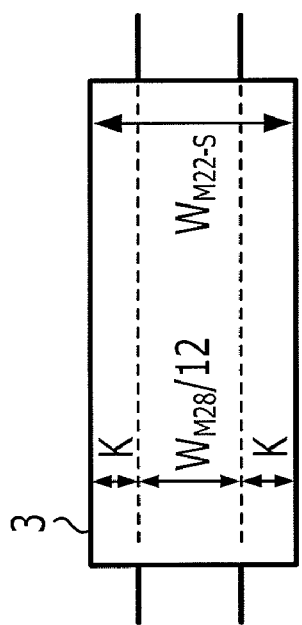

On the other hand, as illustrated in FIG. 9A, when the 2:2 MMI coupler 3 is based on GI, on the basis of the MMI width $W_{M28}$ of the 2:8 MMI coupler 2, two input channels (input waveguides) are provided so that the centers of the two input channels are positioned at positions other than the positions of $W_{M28}/12$ from the side faces of the MMI region, respectively and the center symmetric property is obtained. In other words, the two input channels are provided so that the centers thereof are individually positioned at distances K (arbitrary real number greater than or equal to 0 other than K $=W_{M28}/12$) from the side faces of the MMI region. In addition, the two output channels (output waveguides) are also provided so that the centers thereof are individually positioned at positions other than the positions of $W_{M28}/12$ from the side faces of the MMI region. In other words, the two output channels are provided so that the centers thereof are individually positioned at distances K (arbitrary real number greater than or equal to 0 other than K$=W_{M28}/12$) from the side faces of the MMI region. Furthermore, each of the distances (gap) of two input/output channels is set to $W_{M28}/12$. Therefore, the width (MMI width) $W_{M22-S}$ of the MMI region of the 2:2 MMI coupler 3 becomes $2*K+W_{M28}/12$.

For example, a 2:2 MMI coupler based on GI is used as the 2:2 MMI coupler 3, the minimum distance between the input/output channels, namely, a distance ($W_{M28}/12$) between the two input channels and a distance ($W_{M28}/12$) between the two output channels are set to 3.0 μm, and the waveguide widths (input/output waveguide widths) W of the input channels and output channels are set to, for example, 2.0 μm, thereby satisfying the single mode condition. Consequently, the MMI width $W_{M22-S}$ becomes 5.0 μm. In this case, the length $L_{M22-S}$ of the 2:2 MMI coupler 3 becomes 105 μm.

In addition, the 2:2 MMI couplers 4 and 5 (branching ratios of 85:15) are designed as follows.

Figure 9C:
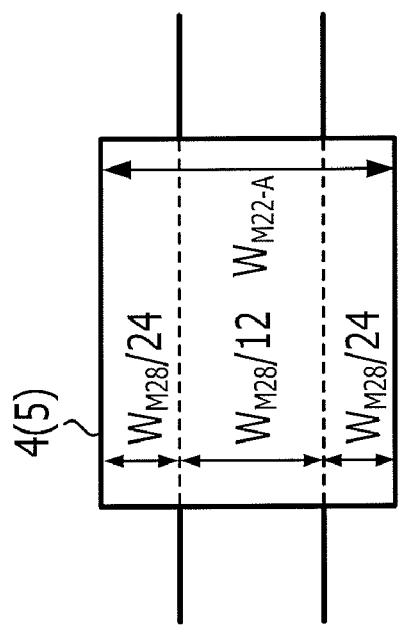
FIG. 9C is a pattern diagram illustrating a specific example of configurations of second and third 2:2 MMI couplers included in the optical hybrid circuit according to the first embodiment.

As illustrated in FIG. 9C, in the 2:2 MMI couplers 4 and 5, on the basis of the MMI width $W_{M28}$ of the 2:8 MMI coupler 2, two input channels (input waveguides) are provided so that the centers of the two input channels are positioned at $W_{M28}/24$ from the side faces of the MMI region, respectively. In addition, two output channels (output waveguides) are provided so that the centers of the two input channels are positioned at $W_{M28}/24$ from the side faces of the MMI region, respectively. Furthermore, each of the distances (gap) of two input/output channels is set to $W_{M28}/12$. Therefore, the widths (MMI widths) $W_{M22-A}$ of the MMI regions of the 2:2 MMI couplers 4 and 5 become $W_{M28}/6$.

For example, in each of the 2:2 MMI couplers 4 and 5, the minimum distance between the input/output channels, namely, a distance ($W_{M28}/12$) between the two input channels and a distance ($W_{M28}/12$) between the two output channels are set to 3.0 μm, and the waveguide widths (input/output waveguide widths) W of the input channels and output channels are set to, for example, 2.0 μm, thereby satisfying the single mode condition. Consequently, the MMI width $W_{M22-A}$ becomes 6.0 μm. In this case, the lengths $L_{M22-A}$ of the 2:2 MMI couplers 4 and 5 become 75 μm.

Furthermore, each phase shifter 9 is set in the following manner in order to establish phase matching between two signal components to be input to each of the 2:2 MMI couplers 3 to 5.

As illustrated in FIG. 5A, the waveguide widths W of portions of each phase shifter 9, which are coupled to the output ports of the 2:8 MMI coupler 2 and the input ports of 2:2 MMI couplers 3 to 5, are set to 2.0 μm. In addition, each of the distances $L_{TP}$ from the output ports of the 2:8 MMI coupler 2 or the input ports of the 2:2 MMI couplers 3 to 5 to the middle positions in the lengthwise direction is set to 25 μm. In other words, the lengths (taper lengths) of both of a width-increasing tapered portion along which the waveguide width linearly increases from the output ports of the 2:8 MMI coupler 2 to the middle position in the lengthwise direction and a width-decreasing tapered portion along which the waveguide width linearly decreases from the middle position in the lengthwise direction to the input ports each of the 2:2 MMI couplers 3 to 5 are set to 25 μm, respectively. In this case, the length $L_{Phase}$ of the phase shifter 9 (9A, 9B) is 50 μm.

Here, as the phase shifter 9 provided in the phase controlling region 6, the width-decreasing tapered waveguide type phase shifter 9A is used that are provided in the optical waveguide formed between the fourth output port of the 2:8 MMI coupler 2 and the second input port of the 2:2 MMI coupler 3. Accordingly, the phase of light input to the second input port of the 2:2 MMI coupler 3 is delayed by $3*\pi/8$ ($-3*\pi/8$) with respect to the phase of light input to the first input port of the 2:2 MMI coupler 3.

Therefore, the variation $\Delta W_{TP}$ of the waveguide width of the phase shifter 9 provided in the phase controlling region 6 is set to 0.4 μm. In this case, the waveguide width $W-\Delta W_{TP}$ at the middle position in the lengthwise direction becomes 1.6 μm.

In addition, as the phase shifter 9 provided in the phase controlling region 7, the width-decreasing tapered waveguide type phase shifter 9A is used that are provided in the optical waveguide formed between the sixth output port of the 2:8 MMI coupler 2 and the second input port of the 2:2 MMI coupler 4. Accordingly, the phase of light input to the second input port of the 2:2 MMI coupler 4 is delayed by $5*\pi/8$ ($-5*\pi/8$) with respect to the phase of light input to the first input port of the 2:2 MMI coupler 4.

Therefore, the variation $\Delta W_{TP}$ of the waveguide width of the phase shifter 9 provided in the phase controlling region 7 is set to 0.6 μm. In this case, the waveguide width $W-\Delta W_{TP}$ at the middle position in the lengthwise direction becomes 1.4 μm.

In addition, as the phase shifter 9 provided in the phase controlling region 8, the width-decreasing tapered waveguide type phase shifter 9A is used that are provided in the optical waveguide formed between the eighth output port of the 2:8 MMI coupler 2 and the second input port of the 2:2 MMI coupler 5. Accordingly, the phase of light input to the second input port of the 2:2 MMI coupler 5 is delayed by $7*\pi/8$ ($-7*\pi/8$) with respect to the phase of light input to the first input port of the 2:2 MMI coupler 5.

Therefore, the variation $\Delta W_{TP}$ of the waveguide width of the phase shifter 9 provided in the phase controlling region 8 is set to 0.75 µm. In this case, the waveguide width W−ΔW$_{TP}$ at the middle position in the lengthwise direction becomes 1.25 µm.

In this case, the device length L$_{Tot2}$ (L$_{M28}$+L$_{Phase}$+L$_{M22-S}$) of the 45-degree hybrid becomes 606 µm.

The optical hybrid circuit 1 configured in this way as the optical semiconductor device 13 is fabricated in the following manner.

First, as illustrated in FIG. 7, an undoped GaInAsP core layer 11 and an undoped InP cladding layer 12 are epitaxially grown in order on an n-type InP substrate 10, for example, using a metal organic chemical vapor deposition (MOVPE) method.

Here, the undoped GaInAsP core layer 11 has a light emission wavelength of about 1.30 µm and a layer thickness of about 0.3 µm. In addition, the undoped InP cladding layer 12 has a layer thickness of about 2.0 µm. It is to be noted that the substrate may be an undoped InP substrate. In addition, the cladding layer may be a p-type doped InP cladding layer.

Next, for example, an SiO$_2$ film is formed on the surface of the wafer for which the epitaxial growth has been carried out in such a manner as described above, for example, using a deposition apparatus; and a waveguide pattern used for forming the optical hybrid circuit is patterned by using a, for example, light exposure process.

Next, using the SiO$_2$ film patterned in this manner as a mask, dry etching is carried out using a method such as, for example, inductively coupled plasma-reactive ion etching (ICP-RIE). Consequently, a high mesa waveguide stripe structure that has a height of, for example, approximately 3 µm is formed.

The present optical hybrid circuit 1 is completed through such a fabrication process as described above.

Figure 10A:
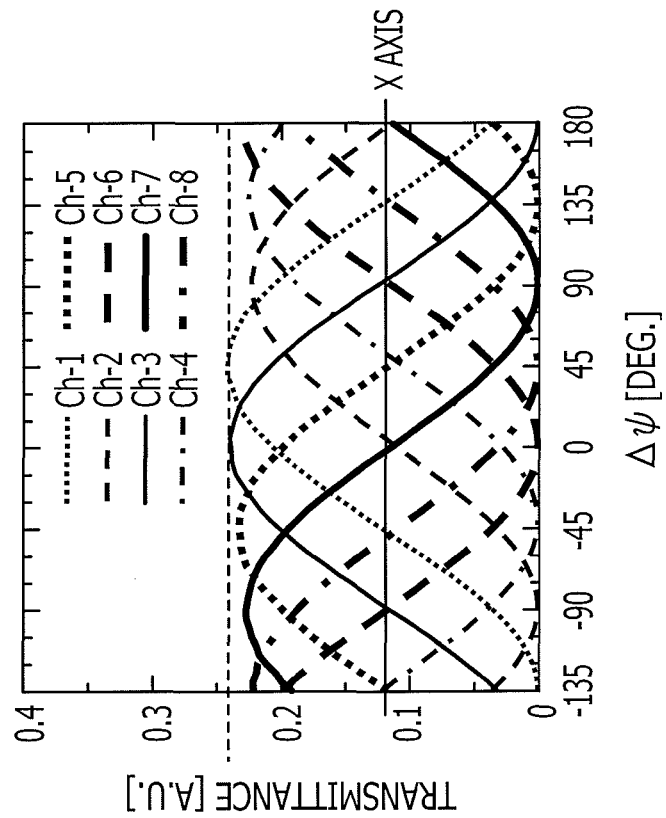
FIG. 10A is a diagram illustrating relative output intensity (Transmittance) with respect to $\Delta\psi$ in an example of a configuration of a 45-degree hybrid according to the first embodiment.

Here, FIG. 10A illustrates a transmission characteristic (relative output intensity: Transmittance) of the present 45-degree hybrid 1 with respect to the relative phase difference Δψ, and FIG. 10B illustrates a transmission characteristic of a 45-degree hybrid (refer to FIG. 22) which uses a 8:8 MMI coupler, with respect to the relative phase difference Δψ.

Figure 10B:
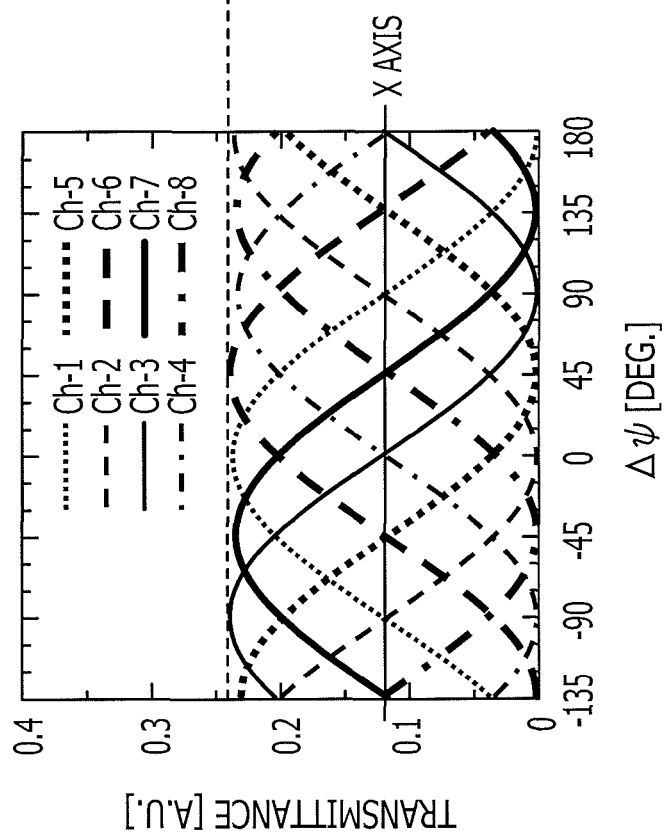
FIG. 10B is a diagram illustrating relative output intensity (Transmittance) of the 45-degree hybrid that uses an 8:8 MMI coupler with respect to $\Delta\psi$.

FIGS. 10A and 10B illustrate the relative intensities of each of the output channels where the relative phase difference Δψ varies continuously. In addition, in each of FIGS. 10A and 10B, a.u. on the vertical axis means an arbitrary unit.

Here, in all cases, the minimum distance (gap) between the input/output waveguides is set to 3.0 µm.

In addition, if the input/output waveguide width W is 2 µm, the MMI width W$_{M88}$ of the 8:8 MMI coupler and the MMI width W$_{M28}$ of the 2:8 MMI coupler 2 are set to 24.0 µm and 36.0 µm, respectively.

In addition, the MMI width W$_{M22-S}$ of the 2:2 MMI coupler 3 (branching ratio of 50:50) and the MMI width W$_{M22-A}$ of each of the 2:2 MMI couplers 4 and 5 (branching ratios of 85:15), which are based on GI, are set to 5.0 µm and 6.0 µm, respectively.

In this case, the length L$_{M88}$ of the 8:8 MMI coupler, the length L$_{M28}$ of the 2:8 MMI coupler 2, the length L$_{M22-S}$ of the 2:2 MMI coupler 3, and the lengths L$_{M22-A}$ of the 2:2 MMI couplers 4 and 5 become 602 µm, 451 µm, 105 µm, and 75 µm, respectively.

In addition, the taper length L$_{TP}$ and the phase shifter length L$_{Phase}$ of each phase shifter 9 (in this case, the width-decreasing tapered waveguide type phase shifter 9A) included in the present 45-degree hybrid 1 are 25 µm and 50 µm, respectively. In addition, the variation ΔW$_{TP}$ of the waveguide width of the phase shifter 9 provided in the phase controlling region 6 is 0.4 µm, and the waveguide width W−ΔW$_{TP}$ thereof at the middle position in the lengthwise direction is 1.6 µm. In addition, the variation ΔW$_{TP}$ of the waveguide width of the phase shifter 9 provided in the phase controlling region 7 is 0.6 µm, and the waveguide width W−ΔW$_{TP}$ thereof at the middle position in the lengthwise direction is 1.4 µm. In addition, the variation ΔW$_{TP}$ of the waveguide width of the phase shifter 9 provided in the phase controlling region 8 is 0.75 µm, and the waveguide width W−ΔW$_{TP}$ thereof at the middle position in the lengthwise direction is 1.25

In this case, the device length L$_{Tot1}$ (=L$_{M88}$) of a 45-degree hybrid that uses an 8:8 MMI coupler and the device length L$_{Tot2}$ (=L$_{M28}$+L$_{Phase}$+L$_{M22-S}$) of the present 45-degree hybrid are 602 µm and 606 µm, respectively.

As illustrated in FIGS. 10A and 10B, in all cases, the relative output intensity with respect to the relative phase difference Δψ varies in a sine wave function.

As illustrated in FIG. 10A, the characteristic of the present 45-degree hybrid 1 is greatly improved compared to the characteristic illustrated in FIG. 4.

In addition, as illustrated in FIGS. 10A and 10B, in the present 45-degree hybrid 1, the variation of transmittance thereof is small and the insertion loss thereof is also small, compared with the 45-degree hybrid that uses an 8:8 MMI coupler.

In addition, as illustrated in FIG. 10B, in the 45-degree hybrid that uses an 8:8 MMI coupler, it turns out that the output intensity variation of the first output channel (Ch-1) and the output intensity variation of the eighth output channel (Ch-8) have an x-axis symmetrical property. In addition, it turns out that the output intensity variation of the second output channel (Ch-2) and the output intensity variation of the seventh output channel (Ch-7) have an x-axis symmetrical property. In addition, it turns out that the output intensity variation of the third output channel (Ch-3) and the output intensity variation of the sixth output channel (Ch-6) have an x-axis symmetrical property. In addition, it turns out that the output intensity variation of the fourth output channel (Ch-4) and the output intensity variation of the fifth output channel (Ch-5) have an x-axis symmetrical property.

In this case, an optical signal output from the third output channel (Ch-3) and an optical signal output from the sixth output channel (Ch-6) have an in-phase relationship (I component) with each other. In addition, optical signals output from the second (Ch-2) and the seventh (Ch-7) output channels have quadrature phase relationships (Q component) with optical signals output from the third and the sixth output channels. In addition, optical signals output from the first (Ch-1) and the eighth (Ch-8) output channels have 45-degree phase relationships (I+Q component) with optical signals output from the third and the sixth output channels. In addition, optical signals output from the fourth (Ch-4) and the fifth (Ch-5) output channels have 135-degree phase relationships (I−Q component) with optical signals output from the third and the sixth output channels.

This signifies that intersection of the optical waveguides that ranges to 24 points is inevitable so that optical signals output from the 45-degree hybrid that uses an 8:8 MMI coupler are input to photodiodes (BPDs) for photoelectric conversion (refer to FIG. 23). Therefore, excessive loss due to the intersection of optical waveguides occurs, and hence the light reception efficiency decreases.

On the other hand, as illustrated in FIG. 10A, in the present 45-degree hybrid, it turns out that the output intensity variation of the first output channel (Ch-1) and the output intensity variation of the second output channel (Ch-2) have an x-axis symmetrical property. In addition, it turns out that the output intensity variation of the third output channel (Ch-3) and the output intensity variation of the fourth output channel (Ch-4) have an x-axis symmetrical property. In addition, it turns out that the output intensity variation of the fifth output channel (Ch-5) and the output intensity variation of the sixth output channel (Ch-6) have an x-axis symmetrical property. In addition, it turns out that the output intensity variation of the seventh output channel (Ch-7) and the output intensity variation of the eighth output channel (Ch-8) have an x-axis symmetrical property.

In this case, an optical signal output from the first output channel (Ch-1) and an optical signal output from the second output channel (Ch-2) have an in-phase relationship (I component) with each other. In addition, optical signals output from the third (Ch-3) and the fourth (Ch-4) output channels have quadrature phase relationships (Q component) with optical signals output from the first and the second output channels. In addition, optical signals output from the fifth (Ch-5) and the sixth (Ch-6) output channels have 45-degree phase relationships (I+Q component) with optical signals output from the first and the second output channels. In addition, optical signals output from the fifth (Ch-7) and the eighth (Ch-8) output channels have 135-degree phase relationships (I−Q component) with optical signals output from the first and the second output channels.

In addition, as illustrated in FIG. 1A, this signifies that the intersection of the optical waveguides is not necessary for optical signals output from the present 45-degree hybrid 1 to be input to photodiodes (BPDs) 21A to 21D for photoelectric conversion. Therefore, excessive loss can be prevented.

Figure 11A:
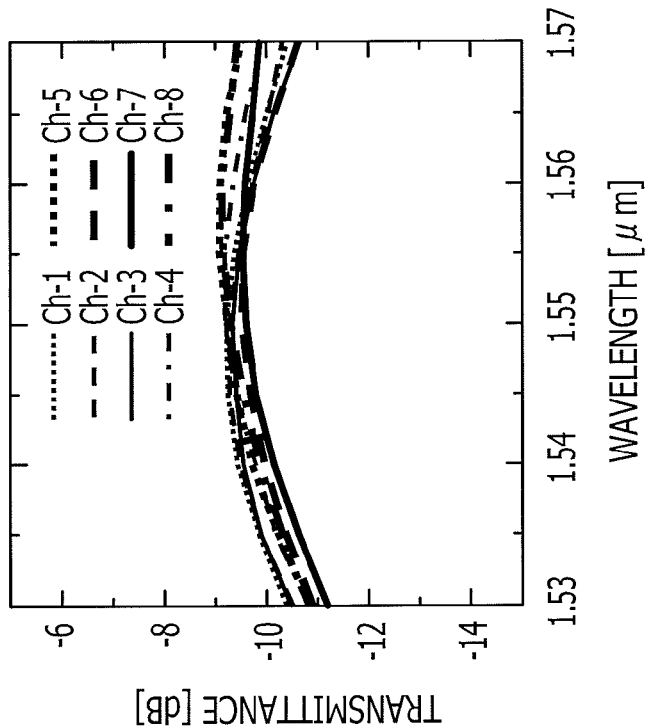
FIG. 11A is a diagram illustrating a wavelength dependence property of transmittance (Transmittance) of light output from eight output channels (Ch-1, Ch-2, Ch-3, Ch-4, Ch-5, Ch-6, Ch-7, and Ch-8) where signal light is input to a first input channel in an example of a configuration of the 45-degree hybrid according to the first embodiment.
Figure 11B:
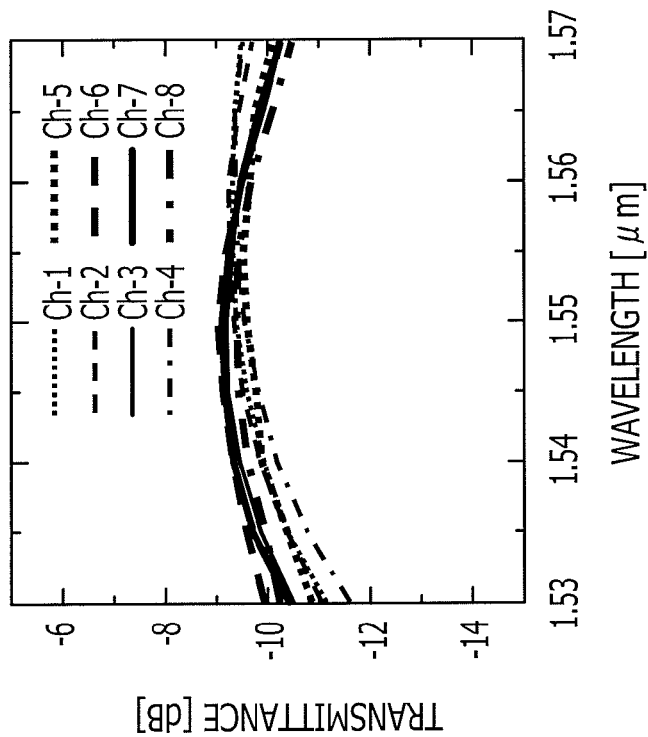
FIG. 11B is a diagram illustrating a wavelength dependence property of transmittance (Transmittance) of light output from eight output channels (Ch-1, Ch-2, Ch-3, Ch-4, Ch-5, Ch-6, Ch-7, and Ch-8) where signal light is input to a second input channel in an example of a configuration of the 45-degree hybrid according to the first embodiment.

Next, FIG. 11A illustrates a wavelength dependence property (transmission wavelength spectra) of transmittance (Transmittance) of light output from eight output channels (Ch-1 to Ch-8) where 8PSK signal light is input to an upper input channel (first input channel) of two input channels in the present 45-degree hybrid. In addition, FIG. 11B illustrates a wavelength dependence property (transmission wavelength spectra) of transmittance (Transmittance) of light output from eight output channels (Ch-1 to Ch-8) where 8PSK signal light is input to a lower input channel (second input channel) of two input channel in the present 45-degree hybrid. In addition, the individual parameters of the 45-degree hybrid are the same as those in FIGS. 10A and 10B described above.

As illustrated in FIGS. 11A and 11B, the present 45-degree hybrid 1 has a low wavelength dependence property over a wavelength range of the C band. In addition, in the present 45-degree hybrid, a loss difference that occurs within the wavelength range of the C band is suppressed to approximately 2.2 dB in the maximum. In addition, even if the position of an input channel of the 8PSK signal light is changed, the shapes of the transmission wavelength spectra are almost the same.

Figure 12A:
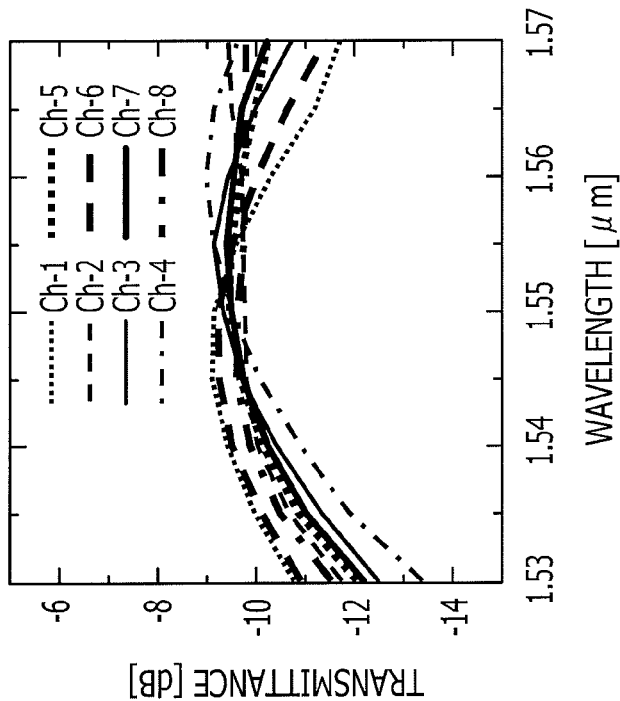
FIG. 12A is a diagram illustrating a wavelength dependence property of transmittance (Transmittance) of light output from eight output channels (Ch-1, Ch-2, Ch-3, Ch-4, Ch-5, Ch-6, Ch-7, and Ch-8) where signal light is input to a first input channel in an example of a configuration of the 45-degree hybrid that uses an 8:8 MMI coupler.
Figure 12B:
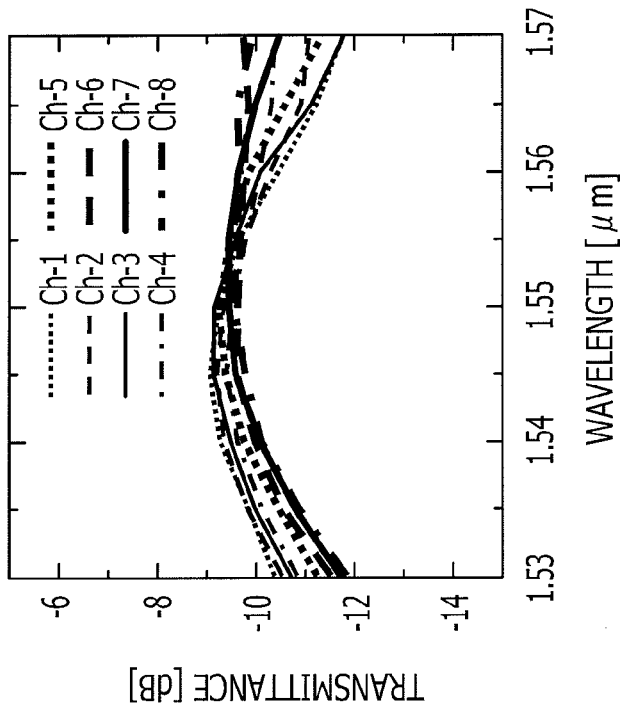
FIG. 12B is a diagram illustrating a wavelength dependence property of transmittance (Transmittance) of light output from eight output channels (Ch-1, Ch-2, Ch-3, Ch-4, Ch-5, Ch-6, Ch-7, and Ch-8) where signal light is input to a third input channel in an example of a configuration of the 45-degree hybrid that uses an 8:8 MMI coupler.

Next, FIG. 12A illustrates a wavelength dependence property (transmission wavelength spectra) of transmittance (Transmittance) of light output from eight output channels (Ch-1 to Ch-8) where 8PSK signal light is input to an input channel of eight input channels, which is positioned on the first from the upper side, in the 45-degree hybrid that uses an 8:8 MMI coupler (refer to FIG. 22). In addition, FIG. 12B illustrates a wavelength dependence property (transmission wavelength spectra) of light output from eight output channels (Ch-1 to Ch-8) where 8PSK signal light is input to an input channel of eight input channels, which is positioned on the third from the upper side, in the 45-degree hybrid that uses an 8:8 MMI coupler (refer to FIG. 22). In addition, the individual parameters of the 45-degree hybrid are substantially the same as those in FIGS. 10A and 10B described above.

As illustrated in FIGS. 12A and 12B, in a case of the 45-degree hybrid that uses an 8:8 MMI coupler, a loss difference that occurs within the wavelength range of the C band is approximately 4.2 dB in the maximum, which is relatively great. In addition, depending on the position of an input channel to which the 8PSK signal light is input, the shapes of the transmission wavelength spectra vary greatly.

Figure 13A:
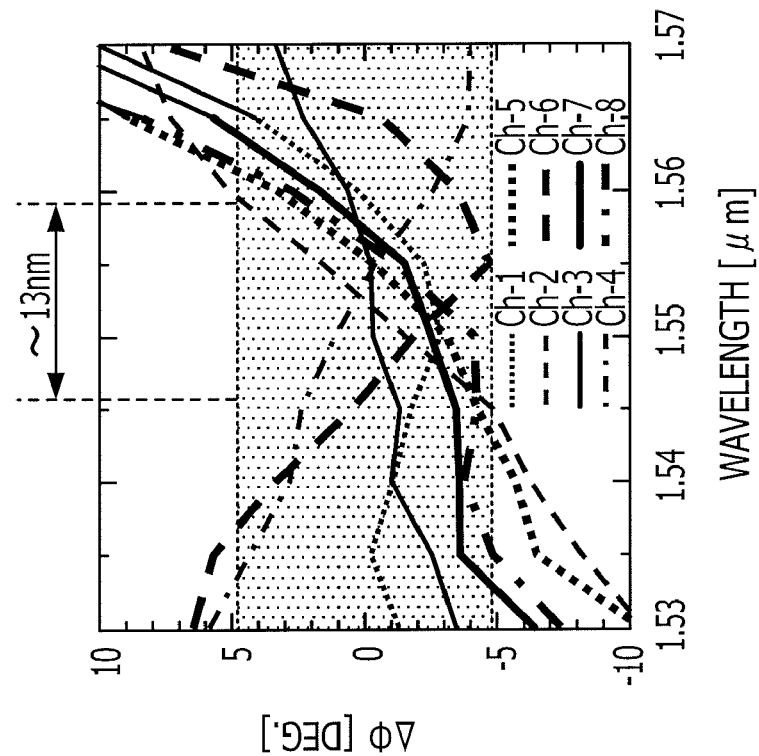
FIG. 13A is a diagram illustrating a wavelength dependence property of phase displacement amounts $\Delta\phi$ of light output from eight output channels (Ch-1, Ch-2, Ch-3, Ch-4, Ch-5, Ch-6, Ch-7, and Ch-8) in an example of a configuration of the 45-degree hybrid according to the first embodiment.
Figure 13B:
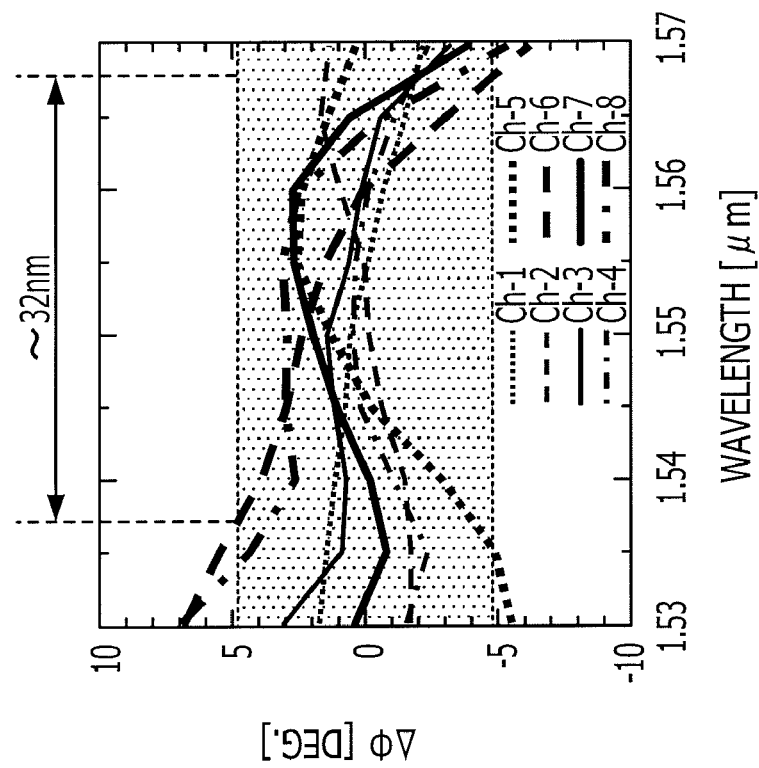
FIG. 13B is a diagram illustrating a wavelength dependence property of phase displacement amounts $\Delta\phi$ of light output from eight output channels (Ch-1, Ch-2, Ch-3, Ch-4, Ch-5, Ch-6, Ch-7, and Ch-8) in an example of a configuration of the 45-degree hybrid that uses an 8:8 MMI coupler.

Next, FIG. 13A illustrates a wavelength dependence property of phase displacement amounts $\Delta\phi$ in the present 45-degree hybrid 1. In addition, FIG. 13B illustrates a wavelength dependence property of phase displacement amounts $\Delta\phi$ in the 45-degree hybrid that uses an 8:8 MMI coupler (refer to FIG. 22). In addition, the individual parameters of the 45-degree hybrid are substantially the same as those in FIGS. 10A and 10B described above.

In addition, in FIGS. 13A and 13B, the difference (phase displacement amount) $\Delta\phi$ between an absolute phase of an output component output from each of the eight output channels (Ch-1 to Ch-8) and a reference phase is plotted. Here, the reference phase is a phase of an output component output from each of the channels in the phase relationship diagram illustrated in FIG. 1B. In addition, the phase displacement amount is an excessive phase displacement amount from the reference phase. Accordingly, the phase displacement amount is better where it is minimized. In order to demodulate an 8PSK modulation signal in an error-free state, it is desirable that no phase displacement occurs. Even if phase displacement occurs, it is necessary to minimize the phase displacement, and typically it is desirable to suppress the phase displacement amount $\Delta\phi$ so as to be ±5 degrees or less (preferably ±2.5 degrees or less).

As illustrated in FIGS. 13A and 13B, when it is intended to suppress the phase displacement amount to ±5 degrees or less, the allowable bandwidths in the 45-degree hybrid that uses an 8:8 MMI coupler and the present 45-degree hybrid 1 are 13 nm and 32 nm, respectively. That is, while the 45-degree hybrid that uses an 8:8 MMI coupler can only cover a half of the entire C band range, the present 45-degree hybrid 1 can cover almost the entire C band range.

In this way, compared to the 45-degree hybrid that uses an 8:8 MMI coupler, the present 45-degree hybrid 1 has a wide operating band with respect to the phase displacement as illustrated in FIG. 13A, and has a wide operating band with respect to excessive loss as illustrated in FIGS. 11A and 11B. That is, the present 45-degree hybrid 1 can reduce the wavelength dependence property of transmittance and phase displacement. In addition, while, in the 45-degree hybrid, a wavelength dependence property increases with increase in the minimum distances (gap) of the input/output waveguides, the present 45-degree hybrid 1 can obtain a superior amplitude characteristic and a superior displacement characteristic, compared to the 45-degree hybrid that uses an 8:8 MMI coupler (refer to FIG. 22), even if the minimum distances of the input/output waveguides are varied.

Therefore, the optical hybrid circuit 1 according to the present embodiment has an advantage in that excessive loss can be suppressed by preventing a region in which optical waveguides intersect with one another from occurring.

In particular, the present optical hybrid circuit 1 has an advantage that a 45-degree hybrid can be realized that has a low wavelength dependence property, a low phase displacement characteristic (a wide band characteristic property of an operating wavelength), and low insertion loss, and is suitable for compactness and monolithic integration.

While, in the description of the embodiment described above, a case in which the 2:8 MMI coupler 2 is used as the MMI coupler at the preceding stage is taken as an example, the MMI coupler at the preceding stage is not limited to this example. The MMI coupler at the preceding stage may be any MMI coupler which converts 8-phase shift modulation signal light into a pair of first optical signals that have an in-phase relationship with each other, a pair of second optical signals that have an in-phase relationship with each other, a pair of third optical signals that have an in-phase relationship with each other, and a pair of fourth optical signals that have an in-phase relationship with each other.

For example, in place of the 2:8 MMI coupler 2 included in the optical hybrid circuit in the embodiment described above, as illustrated in FIG. 14, an 8:8 MMI coupler 2A may be used that has eight channels on the input side, has eight channels on the output side; and hence, has the center symmetrical structure. For example, as the 8:8 MMI coupler 2A, an MMI coupler may be used that is an 8:8 MMI coupler based on GI wherein the centers of the two input channels are positioned in a region other than the positions of ⅓ and ⅔ of the MMI width within a range within which the center symmetric property of the MMI region is not lost and all modes are excited in response to the MMI width. In addition, if signal light and LO light are input to two channels (a pair of input channels), which are provided at symmetrical positions with respect to the center position in the widthwise direction, from among the eight channels on the input side of the 8:8 MMI coupler 2A, a 45-degree hybrid operation is obtained. Accordingly, it is not necessary for the optical waveguides to intersect with one another in the same way as the 45-degree hybrid that uses an 8:8 MMI coupler as illustrated in FIG. 22. In addition, in FIG. 14, the same symbol is assigned to a portion which is the same as that in the embodiment described above (refer to FIG. 1).

While, here, signal light and LO light are input to the second and the seventh channels from above from among the eight channels on the input side of the 8:8 MMI coupler 2A, the signal light and the LO light may be input to the first and the eighth channels, or the signal light and the LO light may be input to the third and the sixth channels. Accordingly, the 8:8 MMI coupler 2A can function as a 180-degree hybrid in the same way as the 2:8 MMI coupler 2 in the embodiment described above.

In addition, while in the description of the embodiment described above, a case in which 2:2 MMI couplers are used as the three optical couplers 3 to 5 at the succeeding state is taken as an example, the optical couplers 3 to 5 are not limited to those. The first optical coupler 3 may be any optical coupler only if the optical coupler converts the second optical signal into a pair of fifth optical signals that have a quadrature phase relationship with the first optical signal. In addition, the second optical coupler 4 may be any optical coupler only if the optical coupler converts the third optical signal into a pair of sixth optical signals that have a 45-degree phase relationship with the first optical signal. In addition, the third optical coupler 5 may be any optical coupler only if the optical coupler converts the fourth optical signal into a pair of seventh optical signals that have a 135-degree phase relationship with the first optical signal.

For example, in place of the first to third 2:2 MMI couplers 3 to 5 included in the optical hybrid circuit 1 in the embodiment described above, as illustrated in FIG. 15, directional couplers (for example, 2:2 directional couplers) 3A to 5A may be used. In addition, in FIG. 15, the same symbol is assigned to a portion which is the same as that in the embodiment described above (refer to FIG. 1). In addition, for example, in place of the first to third 2:2 MMI couplers 3 to 5 included in the optical hybrid circuit 1 in the embodiment described above, as illustrated in FIG. 16, two-mode interference couplers (for example, 2:2 two-mode interference couplers) 3B to 5B may be used. In addition, in FIG. 16, the same symbol is assigned to a section which is the same as that in the embodiment described above (refer to FIG. 1). In those cases, the same advantageous effect as that in the embodiment described above is obtained. In this regard, however, taking into account a fabrication tolerance and a fabrication yield, it may be desirable to use an MMI coupler. In addition, while, here, those couplers are described as modifications to the embodiment described above (refer to FIG. 1), the modifications may be applied to the modification in which an 8:8 MMI coupler is used as the MMI coupler at the preceding stage (refer to FIG. 14).

In addition, while in the description of the embodiment described above, a case in which the first optical coupler 3 converts the pair of second optical signals that have an in-phase relationship into the pair of fifth optical signals that have a quadrature phase relationship, the second optical coupler 4 converts the pair of third optical signals that have an in-phase relationship into the pair of sixth optical signals that have a 45-degree phase relationship; and the third optical coupler 5 converts the pair of fourth optical signals that have an in-phase relationship into the pair of seventh optical signals that have a 135-degree phase relationship is taken as an example, the present 45-degree hybrid 1 is not limited to this example.

The configuration of the present 45-degree hybrid 1 can be freely modified within a range within which the relationship illustrated in the following Table 3 is satisfied. That is, even if a devise structure is changed, the 45-degree hybrid characteristic can still be obtained.

TABLE 3

| Coupling Position of 2:2 Optical Coupler | Phase Shifter Region | Phase Matching Condition |
|---|---|---|
| Ch-1 and Ch-2 | $\theta_1 - \theta_2$ | $+\pi/8$ |
| Ch-3 and Ch-4 | $\theta_3 - \theta_4$ | $+3 * \pi/8$ |
| Ch-5 and Ch-6 | $\theta_5 - \theta_6$ | $+5 * \pi/8$ |
| Ch-7 and Ch-8 | $\theta_7 - \theta_8$ | $+7 * \pi/8$ |

As illustrated in FIG. 1A, in the present 45-degree hybrid 1, no 2:2 optical coupler is necessary for distinguishing an I component. Therefore, phase matching conditions for the coupling positions of the 2:2 optical couplers, as illustrated in Table 3, only relate to a Q component, an I+Q component, and an I−Q component.

In other words, in the present 45-degree hybrid 1, one pair of four pairs of output channels are set for distinguishing an I component, the parameter of each phase shifter 9 is properly set so that each of the three remaining pairs of output channels satisfies the matching condition illustrated in Table 3, and the 2:2 optical coupler 3; that has a branching ratio of 50:50 and the 2:2 optical couplers 4 and 5 that have branching ratios of 85:15 are coupled. Consequently, the Q component, the I+Q component, and the I−Q component can be individually distinguished independently of the positions of the 2:2 optical couplers 3 to 5; and hence, the present 45-degree hybrid 1 functions as a 45-degree hybrid.

Figure 17A:
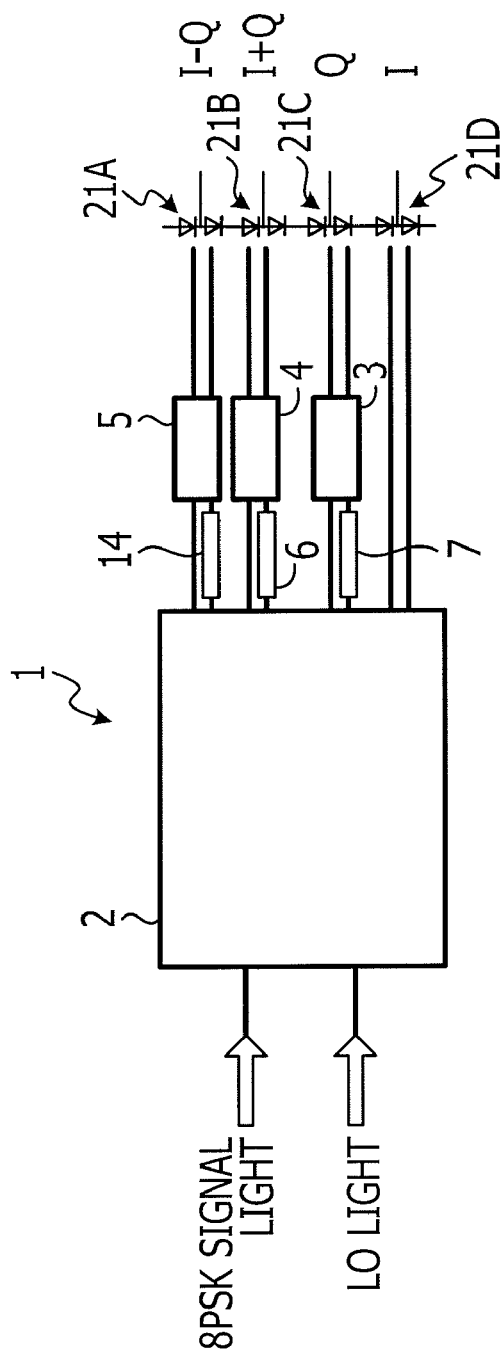
FIGS. 17A and 17B are pattern diagrams illustrating configurations of optical hybrid circuits according to other modifications to the first embodiment.

For example, as illustrated in FIG. 17A, the first optical coupler 3 may convert a pair of third optical signals that have an in-phase relationship into a pair of fifth optical signals that have a quadrature phase relationship [Q in FIG. 17A], the second optical coupler 4 may convert a pair of second optical signals that have an in-phase relationship into a pair of sixth optical signals that have a 45-degree phase relationship [I+Q in FIG. 17A]; and the third optical coupler 5 may convert a pair of first optical signals that have an in-phase relationship into the pair of seventh optical signals that have a 135-degree phase relationship [I−Q in FIG. 17A].

In this case, the first optical coupler 3 can be coupled to the pair of third output channels that are adjacent to each other on the output side of the MMI coupler 2 at the preceding stage. In addition, the second optical coupler 4 can be coupled to the pair of second output channels that are adjacent to each other on the output side of the MMI coupler 2 at the preceding stage. In addition, the third optical coupler 5 can be coupled to the pair of first output channels that are adjacent to each other on the output side of the MMI coupler 2 at the preceding stage.

Specifically, as illustrated in FIG. 17A, the first 2:2 optical coupler 3 (branching ratio of 50:50) is coupled to two channels (namely, a pair of third output channels that are adjacent to each other) positioned on the fifth and the sixth from the top of the output side of the 2:8 MMI coupler 2.

In addition, the phase controlling region 7 (second phase controlling region: phase shifter 9: second phase shifter) is provided in one or both of the pair of third output channels of the 2:8 MMI coupler 2 to which the first 2:2 MMI coupler 3 is coupled.

Here, as the phase shifter 9, the width-decreasing tapered waveguide type phase shifter 9A is used that is provided in the optical waveguide formed between the sixth output port of the 2:8 MMI coupler 2 and the second input port of the 2:2 MMI coupler 3. Accordingly, the phase of light input to the second input port of the 2:2 MMI coupler 3 is delayed by $5*\pi/8$ ($-5*\pi/8$) with respect to the phase of light input to the first input port of the 2:2 MMI coupler 3.

In addition, the second 2:2 optical coupler 4 (branching ratio of 85:15) is coupled to two channels (namely, a pair of second output channels that are adjacent to each other) positioned on the third and the fourth from the top of the output side of the 2:8 MMI coupler 2.

In addition, the phase controlling region 6 (first phase controlling region: phase shifter 9: first phase shifter) is provided in one or both of the pair of second output channels of the 2:8 MMI coupler 2 to which the second 2:2 MMI coupler 4 is coupled.

Here, as the phase shifter 9, the width-decreasing tapered waveguide type phase shifter 9A is used that is provided in the optical waveguide formed between the fourth output port of the 2:8 MMI coupler 2 and the second input port of the 2:2 MMI coupler 4. Accordingly, the phase of light input to the second input port of the 2:2 MMI coupler 4 is delayed by $3*\pi/8$ ($-3*\pi/8$) with respect to the phase of light input to the first input port of the 2:2 MMI coupler 4.

In addition, the third 2:2 optical coupler 5 (branching ratio of 85:15) is coupled to two channels (namely, a pair of first output channels that are adjacent to each other) positioned on the first and the second from the top of the output side of the 2:8 MMI coupler 2.

In addition, the phase controlling region 14 (fourth phase controlling region: phase shifter 9: fourth phase shifter) is provided in one or both of the pair of first output channels of the 2:8 MMI coupler 2 to which the third 2:2 MMI coupler 5 is coupled.

Here, as the phase shifter 9, the width-decreasing tapered waveguide type phase shifter 9A is used that is provided in the optical waveguide formed between the second output port of the 2:8 MMI coupler 2 and the second input port of the 2:2 MMI coupler 5. Accordingly, the phase of light input to the second input port of the 2:2 MMI coupler 5 is delayed by $\pi/8$ ($-\pi/8$) with respect to the phase of light input to the first input port of the 2:2 MMI coupler 5.

In addition, the phase controlling region 14 is a phase controlling region used for controlling the phase of light (a pair of first optical signals) output from one (or both) of the first and the second output channels of the 2:8 MMI coupler 2, and is called a fourth phase controlling region. Here, the phase shifter 9 (9A, 9B) is provided in the phase controlling region 14. The phase shifter 9 (9A, 9B) provided in the phase controlling region 14 is called a fourth phase shifter. The structure of the phase shifter 9 (9A, 9B) used in the phase controlling region 14 is substantially the same as those in the other phase controlling regions 6 to 8 [refer to FIGS. 5A and 5B].

Figure 17B:
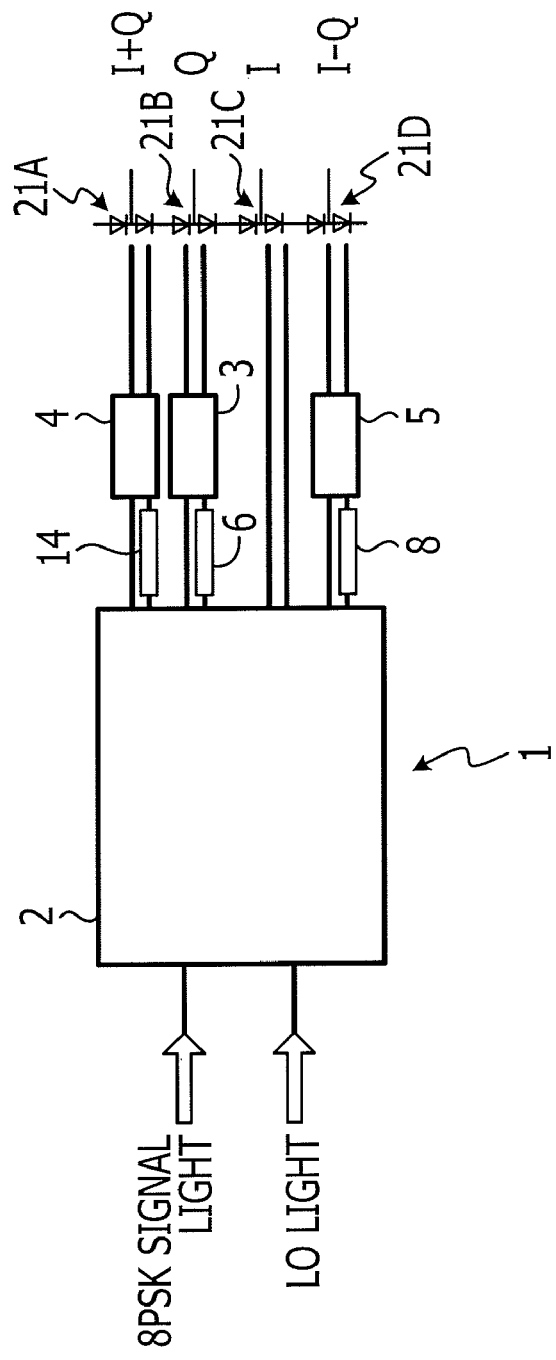

In addition, for example, as illustrated in FIG. 17B, the first optical coupler 3 may convert a pair of second optical signals that have an in-phase relationship into a pair of fifth optical signals that have a quadrature phase relationship [Q in FIG. 17B], the second optical coupler 4 may convert a pair of first optical signals that have an in-phase relationship into a pair of sixth optical signals that have a 45-degree phase relationship [I+Q in FIG. 17B], and the third optical coupler 5 may convert a pair of fourth optical signals that have an in-phase relationship into the pair of seventh optical signals that have a 135-degree phase relationship [I−Q in FIG. 17B].

In this case, the first optical coupler 3 can be coupled to the pair of second output channels that are adjacent to each other on the output side of the MMI coupler 2 at the preceding stage. In addition, the second optical coupler 4 can be coupled to the pair of first output channels that are adjacent to each other on the output side of the MMI coupler 2 at the preceding stage. In addition, the third optical coupler 5 can be coupled to the pair of fourth output channels that are adjacent to each other on the output side of the MMI coupler 2 at the preceding stage.

Specifically, as illustrated in FIG. 17B, the first 2:2 optical coupler 3 (branching ratio of 50:50) is coupled to two channels (namely, a pair of second output channels that are adjacent to each other) positioned on the third and the fourth from the top of the output side of the 2:8 MMI coupler 2.

In addition, the phase controlling region 6 (first phase controlling region: phase shifter 9: first phase shifter) is provided in one or both of the pair of second output channels of the 2:8 MMI coupler 2 to which the first 2:2 MMI coupler 3 is coupled.

Here, as the phase shifter 9, the width-decreasing tapered waveguide type phase shifter 9A is used that is provided in the optical waveguide formed between the fourth output port of the 2:8 MMI coupler 2 and the second input port of the 2:2 MMI coupler 3. Accordingly, the phase of light input to the second input port of the 2:2 MMI coupler 3 is delayed by $3*\pi/8$ ($-3*\pi/8$) with respect to the phase of light input to the first input port of the 2:2 MMI coupler 3.

In addition, the second 2:2 optical coupler 4 (branching ratio of 85:15) is coupled to two channels (namely, a pair of first output channels that are adjacent to each other) positioned on the first and the second from the top of the output side of the 2:8 MMI coupler 2.

In addition, the phase controlling region 14 (fourth phase controlling region: phase shifter 9: fourth phase shifter) is provided in one or both of the pair of first output channels of the 2:8 MMI coupler 2 to which the second 2:2 MMI coupler 4 is coupled.

Here, as the phase shifter 9, the width-decreasing tapered waveguide type phase shifter 9A is used that is provided in the optical waveguide formed between the second output port of the 2:8 MMI coupler 2 and the second input port of the 2:2 MMI coupler 4. Accordingly, the phase of light input to the second input port of the 2:2 MMI coupler 4 is delayed by $\pi/8$ ($-\pi/8$) with respect to the phase of light input to the first input port of the 2:2 MMI coupler 4.

In addition, the third 2:2 optical coupler 5 (branching ratio of 85:15) is coupled to two channels (namely, a pair of fourth output channels that are adjacent to each other) positioned on the seventh and the eight from the top of the output side of the 2:8 MMI coupler 2.

In addition, the phase controlling region 8 (third phase controlling region: phase shifter 9: third phase shifter) is provided in one or both of the pair of fourth output channels of the 2:8 MMI coupler 2 to which the third 2:2 MMI coupler 5 is coupled.

Here, as the phase shifter 9, the width-decreasing tapered waveguide type phase shifter 9A is used that is provided in the optical waveguide formed between the eighth output port of the 2:8 MMI coupler 2 and the second input port of the 2:2 MMI coupler 5. Accordingly, the phase of light input to the second input port of the 2:2 MMI coupler 5 is delayed by $7*\pi/8$ ($-7*\pi/8$) with respect to the phase of light input to the first input port of the 2:2 MMI coupler 5.

Where such a configuration as just described is adopted, while the embodiment and modifications described hereinabove differ in the structures thereof, in the positional relationship between the I component, the Q component, the I+Q component, and the I−Q component, the positions thereof are just permuted; and the device characteristic thereof is substantially the same as that in the embodiment described above.

In short, the present optical hybrid circuit 1 may include the first 2:2 optical coupler 3 that is coupled to one of the pair of first output channels, the pair of second output channels, the pair of third output channels, and the pair of fourth output channels and converts one of the first optical signal, the second optical signal, the third optical signal, and the fourth optical signal into the pair of fifth optical signals that have a quadrature phase relationship, the second 2:2 optical coupler 4 that is coupled to one pair of output channels, which is one of the pair of first output channels, the pair of second output channels, the pair of third output channels, and the pair of fourth output channels and other than the pair of output channels to which the first 2:2 optical coupler 3 is coupled, and converts an optical signal, which is one of the first optical signal, the second optical signal, the third optical signal, and the fourth optical signal and output from other pair of output channels than the pair of output channels to which the first 2:2 optical coupler 3 is coupled, into the pair of sixth optical signals that have a 45-degree phase relationship, and the third 2:2 optical coupler 5 that is coupled to one pair of output channels, which is one of the pair of first output channels, the pair of second output channels, the pair of third output channels, and the pair of fourth output channels and other than the pairs of output channels to which the first 2:2 optical coupler 3 and the second 2:2 optical coupler 4 are coupled, and converts an optical signal, which is one of the first optical signal, the second optical signal, the third optical signal, and the fourth optical signal and output from other pair of output channels than the pairs of output channels to which the first 2:2 optical coupler 3 and the second 2:2 optical coupler 4 are coupled, into the pair of seventh optical signals that have a 135-degree phase relationship.

In addition, the present optical hybrid circuit 1 may include the phase controlling regions 6 to 8, and 14 provided in one side output channels or both side output channels of at least two pairs of output channels from among three pairs of output channels to which the first 2:2 optical coupler 3, the second 2:2 optical coupler 4, and the third 2:2 optical coupler 5 are coupled, respectively. That is, in the embodiment and modifications described above, a case in which one of the phase controlling regions 6 to 8, and 14 is provided in one output channel or both output channels of each pair of three pairs of output channels to which the first 2:2 optical coupler 3, the second 2:2 optical coupler 4, and the third 2:2 optical coupler 5 are coupled is taken as an example, the configuration is not limited to this example. For example, by modifying the configuration of the 2:8 MMI coupler 2 (for example, being formed in a tapered shape), it is not necessary to provide phase controlling regions in all output channels. Therefore, the phase controlling region may be provided in one side output channels or both side output channels of at least two pairs of output channels from among three pairs of output channels to which the first 2:2 optical coupler 3, the second 2:2 optical coupler 4, and the third 2:2 optical coupler 5 are coupled, respectively.

In short, as phase controlling regions, at least two phase controlling regions from among the first phase controlling region 6 that is provided in one or both of the pair of second output channels and controls a phase so that the phase difference between the pair of second optical signals becomes $3*\pi/8$, the second phase controlling region 7 that is provided in one or both of the pair of third output channels and controls a phase so that the phase difference between the pair of third optical signals becomes $5*\pi/8$, the third phase controlling region 8 that is provided in one or both of the pair of fourth output channels and controls a phase so that the phase difference between the pair of fourth optical signals becomes $7*\pi/8$, and the fourth phase controlling region 14 that is provided in one or both of the pair of first output channels and controls a phase so that the phase difference between the pair of first optical signals becomes $\pi/8$ may be included.

In addition, while, in the embodiment described above, tapered phase shifters the waveguide widths of which linearly vary are provided in the phase controlling regions 6 to 8 and 14, the phase shifters are not limited to this example. For example, a tapered phase shifter the waveguide width of which exponentially varies, a tapered phase shifter the waveguide width of which varies in a sine wave function, a tapered phase shifter the waveguide width of which varies in an elliptical function, or the like may be provided. In any of these cases, the same advantageous effect is obtained. In addition, in the phase controlling region, for example, the constant waveguide width may be maintained, an electrode may be disposed, and a phase control may be performed that uses the injection of current or the application of voltage, or a heater electrode may be disposed, and a phase control may be performed that uses the application of heat. In any of these cases, the same advantageous effect is obtained.

Next, an optical receiver, an optical transceiver, and an optical receiving method according to a second embodiment will be described with reference to FIG. 18.

Figure 18:
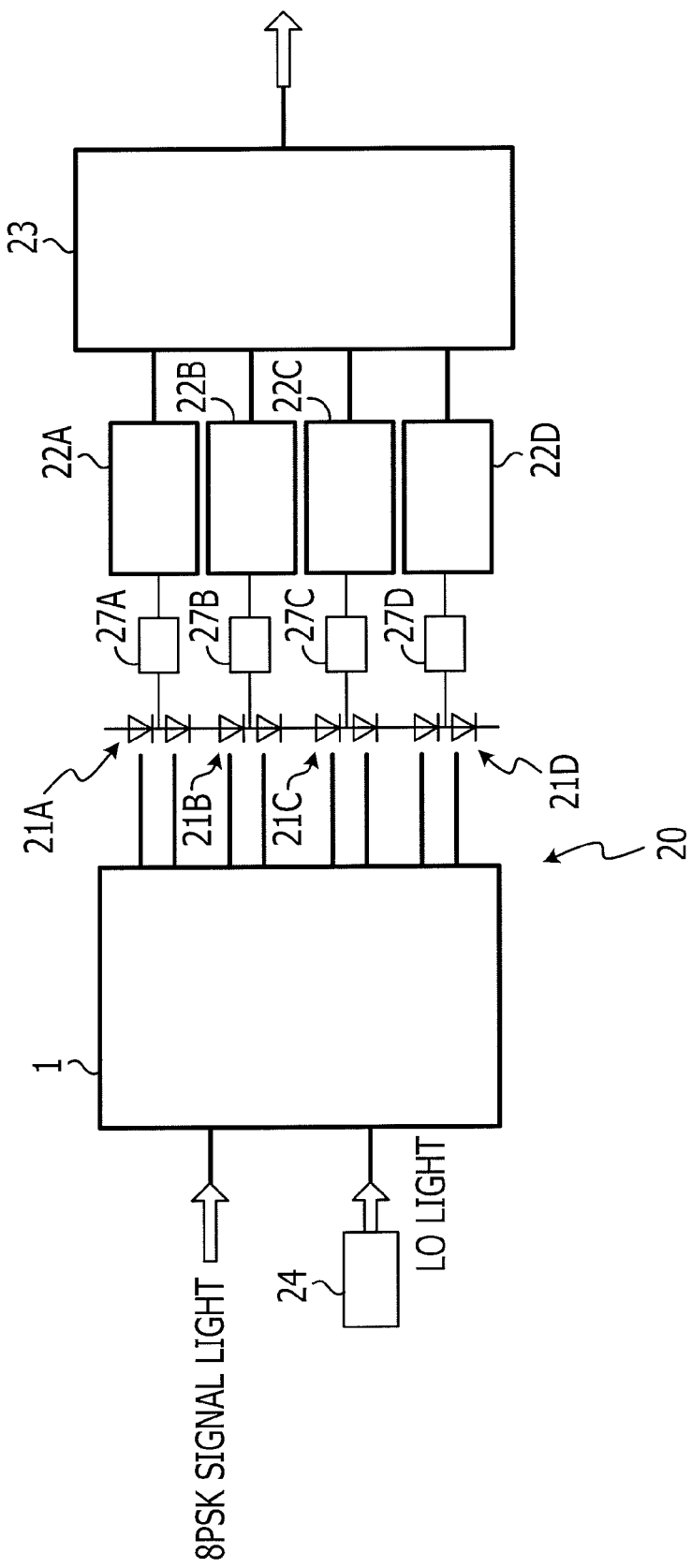
FIG. 18 is a pattern diagram illustrating a configuration of an optical receiver according to a second embodiment.

As illustrated in FIG. 18, the optical receiver according to the present embodiment is a coherent optical receiver 20 that includes the optical hybrid circuit 1 in any of the first embodiment and the modifications to the first embodiment [45-degree hybrid for a 8PSK signal: refer to FIGS. 1, 14 to 17]. The coherent optical receiver 20 converts an optical signal distinguished by the 45-degree hybrid 1 into an electrical signal and performs a digital signal processing.

To this end, as illustrated in FIG. 18, the present coherent optical receiver 20 includes the optical hybrid circuit 1 in the first embodiment described above, photodiodes (photoelectric conversion sections) 21A to 21D, trans-impedance amplifiers (TIA) 27A to 27D, AD conversion circuits (AD conversion sections) 22A to 22D, and a digital arithmetic circuit (digital arithmetic section) 23.

Here, the optical hybrid circuit 1 includes an MMI coupler 2 that converts a 8PSK signal light into a pair of first optical signals that have an in-phase relationship with each other, a pair of second optical signals that have an in-phase relationship with each other, a pair of third optical signals that have an in-phase relationship with each other, and a pair of fourth optical signals that have an in-phase relationship with each other, a first optical coupler 3 that converts the second optical signals into a pair of fifth optical signals that have a quadrature phase relationship, a second optical coupler 4 that converts the third optical signals into a pair of sixth optical signals that have a 45-degree phase relationship, and a third optical coupler 5 that converts the fourth optical signals into a pair of seventh optical signals that have a 135-degree phase relationship [refer to FIGS. 1 and 14 to 17].

Here, the MMI coupler 2 is a 2:8 MMI coupler (or 8:8 MMI coupler). In addition, the first to third optical couplers 3 to 5 are 2:2 MMI couplers. In addition, the optical hybrid circuit 1 includes an optical semiconductor device.

In the present embodiment, as illustrated in FIG. 18, 8PSK signal light is input to one of channels on the input side of the 2:8 MMI coupler 2 (or 8:8 MMI coupler 2A) in the optical hybrid circuit 1 and LO light is input to the other channel on the input side of the 2:8 MMI coupler 2 (or 8:8 MMI coupler 2A). In other words, the one channel on the input side of the 2:8 MMI coupler 2 (or 8:8 MMI coupler 2A) in the optical hybrid circuit 1 is a channel for inputting the 8PSK signal light. In addition, the other channel on the input side of the 2:8 MMI coupler 2 (or 8:8 MMI coupler 2A) in the optical hybrid circuit 1 is a channel for inputting the LO light.

Therefore, the coherent optical receiver 20 further includes a local oscillator light generation section (LO light source) 24 for inputting the LO light to the other channel on the input side of the 2:8 MMI coupler 2 (or 8:8 MMI coupler 2A) in the optical hybrid circuit 1.

In addition, if the 8PSK signal light (8PSK signal pulse) and the LO light temporally synchronized with the 8PSK signal light are input to the optical hybrid circuit 1, output forms that have different branching ratios from one another are obtained in response to the relative phase difference $\Delta\psi$ between the 8PSK signal light and the LO light. Therefore, the states of inputs to the individual photodiodes 21A to 21D are different from one another.

The photodiodes 21A to 21D are photodiodes for photoelectrically converting pairs of optical signals individually output from the multimode interference coupler 2 and the optical couplers 3 to 5 in the optical hybrid circuit 1 into analog electric signals (analog current signals).

Here, for photoelectric conversion and signal demodulation, the balanced photodiodes (BPDs) 21A to 21D are provided at the succeeding stage of the optical hybrid circuit 1.

Here, each of the BPDs 21A to 21D includes two photodiodes (PDs). In addition, when an optical signal is only input to one of the PDs in each of the BPDs 21A to 21D, current corresponding to "1" flows, and when an optical signal is only input to the other PD, current corresponding to "−1" flows. However, if an optical signal is simultaneously input to both of the PDs, no current flows. Therefore, if optical signals that have different output intensity ratios in response to the relative phase difference $\Delta\psi$ are input from the optical hybrid circuit 1 to the four BPDs 21A to 21D, electric signals of different patterns are output from the four BPDs 21A to 21D. That is, using the four BPDs 21A to 21D, phase information of the 8PSK signal light is distinguished and converted into electric signals that have individually different patterns.

Specifically, the first BPD 21A is coupled to the first and second channels on the output side of the optical hybrid circuit 1. In other words, the first BPD 21A is coupled to the first and second channels (a pair of first output channels that are adjacent to each other) from which a pair of first optical signals that have an in-phase relationship (I) with each other are output.

In addition, the second BPD 21B is coupled to the third and fourth channels on the output side of the optical hybrid circuit 1. In other words, the second BPD 21B is coupled to the third and fourth channels (a pair of second output channels that are adjacent to each other) from which a pair of second optical signals that have a quadrature relationship (Q) with the first optical signals are output.

In addition, the third BPD 21C is coupled to the fifth and sixth channels on the output side of the optical hybrid circuit 1. In other words, the second BPD 21C is coupled to the fifth and sixth channels (a pair of third output channels that are adjacent to each other) from which a pair of third optical signals that have a 45-degree relationship (I+Q) with the first optical signals are output.

In addition, the third BPD 21D is coupled to the seventh and eighth channels on the output side of the optical hybrid circuit 1. In other words, the second BPD 21D is coupled to the seventh and eighth channels (a pair of fourth output channels that are adjacent to each other) from which a pair of fourth optical signals that have a 135-degree relationship (I−Q) with the first optical signals are output.

The trans-impedance amplifiers 27A to 27D are provided between the photodiodes 21A to 21D and the AD conversion circuits 22A to 22D, respectively. More specifically, the trans-impedance amplifiers 27A to 27D are coupled to the photodiodes 21A to 21D, and to the AD conversion circuits 22A to 22D, respectively. In addition, the trans-impedance amplifiers 27A to 27D are adapted to convert the analog current signals output from the photodiodes 21A to 21D into analog voltage signals (analog electric signals).

The AD conversion circuits 22A to 22D are AD conversion circuits that convert the analog electric signals, output from the photodiodes 21A to 21DB and then subjected to the conversion at the trans-impedance amplifiers 27A to 27D, into digital electric signals. More specifically, the AD conversion circuits 22A to 22D are adapted to convert the analog electric signals output from the trans-impedance amplifiers 27A to 27D into digital electric signals.

The digital arithmetic circuit 23 is a digital arithmetic circuit (digital signal processing circuit) that uses the digital electric signals output from the AD conversion circuits 22A to 22D to execute an arithmetic processing operation for estimating information of reception signal light.

In addition, in the same way as in the first embodiment as described above, the optical hybrid circuit 1 may include the first 2:2 optical coupler 3 that is coupled to one of the pair of first output channels, the pair of second output channels, the pair of third output channels, and the pair of fourth output channels and converts one of the first optical signal, the second optical signal, the third optical signal, and the fourth optical signal into the pair of fifth optical signals that have a quadrature phase relationship, the second 2:2 optical coupler 4 that is coupled to one pair of output channels, which is one of the pair of first output channels, the pair of second output channels, the pair of third output channels, and the pair of fourth output channels and other than the pair of output channels to which the first 2:2 optical coupler 3 is coupled, and converts an optical signal, which is one of the first optical signal, the second optical signal, the third optical signal, and the fourth optical signal and output from other pair of output channels than the pair of output channels to which the first 2:2 optical coupler 3 is coupled, into the pair of sixth optical signals that have a 45-degree phase relationship, and the third 2:2 optical coupler 5 that is coupled to one pair of output channels, which is one of the pair of first output channels, the pair of second output channels, the pair of third output channels, and the pair of fourth output channels and other than the pairs of output channels to which the first 2:2 optical coupler 3 and the second 2:2 optical coupler 4 are coupled, and converts an optical signal, which is one of the first optical signal, the second optical signal, the third optical signal, and the fourth optical signal and output from other pair of output channels than the pairs of output channels to which the first 2:2 optical coupler 3 and the second 2:2 optical coupler 4 are coupled, into the pair of seventh optical signals that have a 135-degree phase relationship.

In addition, the present optical hybrid circuit 1 may include the phase controlling regions 6 to 8, and 14 provided in one side output channels or both side output channels of at least two pairs of output channels from among three pairs of output channels to which the first 2:2 optical coupler 3, the second 2:2 optical coupler 4, and the third 2:2 optical coupler 5 are coupled, respectively.

Accordingly, the photodiodes 21A to 21D can convert one of the first optical signal, the second optical signal, the third optical signal, and the fourth optical signal, output from the multimode interference coupler 2, the fifth optical signal output from the first 2:2 optical coupler 3, the sixth optical signal output from the second 2:2 optical coupler 4, and the seventh optical signal output from the third 2:2 optical coupler 5 into analog electric signals.

Since being configured in such a manner as described above, the present optical receiver 20 receives an optical signal in the following manner.

First, the multimode interference coupler (here the 2:8 MMI coupler 2) in the optical hybrid circuit 1 is used to convert 8PSK signal light into a pair of first optical signals that have an in-phase relationship with each other, a pair of second optical signals that have an in-phase relationship with each other, a pair of third optical signals that have an in-phase relationship with each other, and a pair of fourth optical signals that have an in-phase relationship with each other.

Next, the phase controlling regions 6 to 8 and 14 are used to control a phase difference between at least two pairs of optical signals from among the pair of first optical signals, the pair of second optical signals, the pair of third optical signals, and the pair of fourth optical signals.

Next, the first optical coupler 3 (here a 2:2 MMI coupler) is used to convert one of the pair of first optical signals, the pair of second optical signals, the pair of third optical signals, and the pair of fourth optical signal into the pair of fifth optical signals that have a quadrature phase relationship.

In addition, the second optical coupler 4 (here a 2:2 MMI coupler) is used to convert one pair of optical signals, which is one of the pair of first optical signals, the pair of second optical signals, the pair of third optical signals, and the pair of fourth optical signal and output from other pair of output channels than the pair of output channels to which the first 2:2 optical coupler 3 is coupled, into the pair of sixth optical signals that have a 45-degree phase relationship.

In addition, the third optical coupler 5 (here a 2:2 MMI coupler) is used to convert one pair of optical signals, which is one of the pair of first optical signals, the pair of second optical signals, the pair of third optical signals, and the pair of fourth optical signals and output from other pair of output channels than the pairs of output channels to which the first 2:2 optical coupler 3 and the second 2:2 optical coupler 4 are coupled, into the pair of seventh optical signals that have a 135-degree phase relationship.

In addition, one of the pair of first optical signals, the pair of second optical signals, the pair of third optical signals, and the pair of fourth optical signals, the pair of fifth optical signals, the pair of sixth optical signals, and the pair of seventh optical signals are received.

Since details of the optical hybrid circuit 1 are substantially the same as those in the first embodiment and the modifications to the first embodiment described above, description of the same will be omitted here.

Accordingly, the optical receiver according to the present embodiment has an advantage in that excessive loss can be suppressed by preventing the intersecting region of the optical waveguides from occurring.

In particular, the present optical receiver has an advantage in that a 45-degree hybrid can be realized, the 45-degree hybrid having a low wavelength dependence property, a low phase displacement characteristic, and low insertion loss, and being suitable for compactness and monolithic integration.

It is to be noted that, while, the embodiment and the modifications to the embodiment described above are described by taking the optical receiver as an example, the embodiment and the modifications are not limited to those examples. In addition, an optical transceiver may be configured that includes the configuration of the optical receiver in the embodiment described above.

In addition, while, in the embodiments and the modifications described above, the optical hybrid circuit 1 includes an optical semiconductor device that includes the MMI coupler 2 (2A) and the optical couplers 3 to 5 (3A to 5A, 3B to 5B), the optical hybrid circuit 1 is not limited to this example. For example, the optical semiconductor device that includes the MMI coupler 2 (2A) and the optical couplers 3 to 5 (3A to 5A, 3B to 5B) may additionally include photodiodes (here BPDs) 21A to 21D integrated therein. In short, the MMI coupler 2 (2A), the optical couplers 3 to 5 (3A to 5A, 3B to 5B), and the photodiodes 21A to 21D (here the BPDs) may be monolithically integrated.

Next, an optical hybrid circuit according to a third embodiment will be described with reference to FIG. 19.

The optical hybrid circuit according to the present embodiment is different from that in the first embodiment described above in that, while, in the optical hybrid circuit in the first embodiment, the 8PSK signal light and the LO light are temporally synchronized with each other and input, in the optical hybrid circuit according to the present embodiment, a differential 8-phase shift keying (D8PSK) signal is input.

In other words, the present optical hybrid circuit is a 45-degree hybrid circuit (also referred to as 45-degree hybrid, hereinafter) used for distinguishing the phase modulation information of the D8PSK signal in an optical transmission system.

Figure 19:
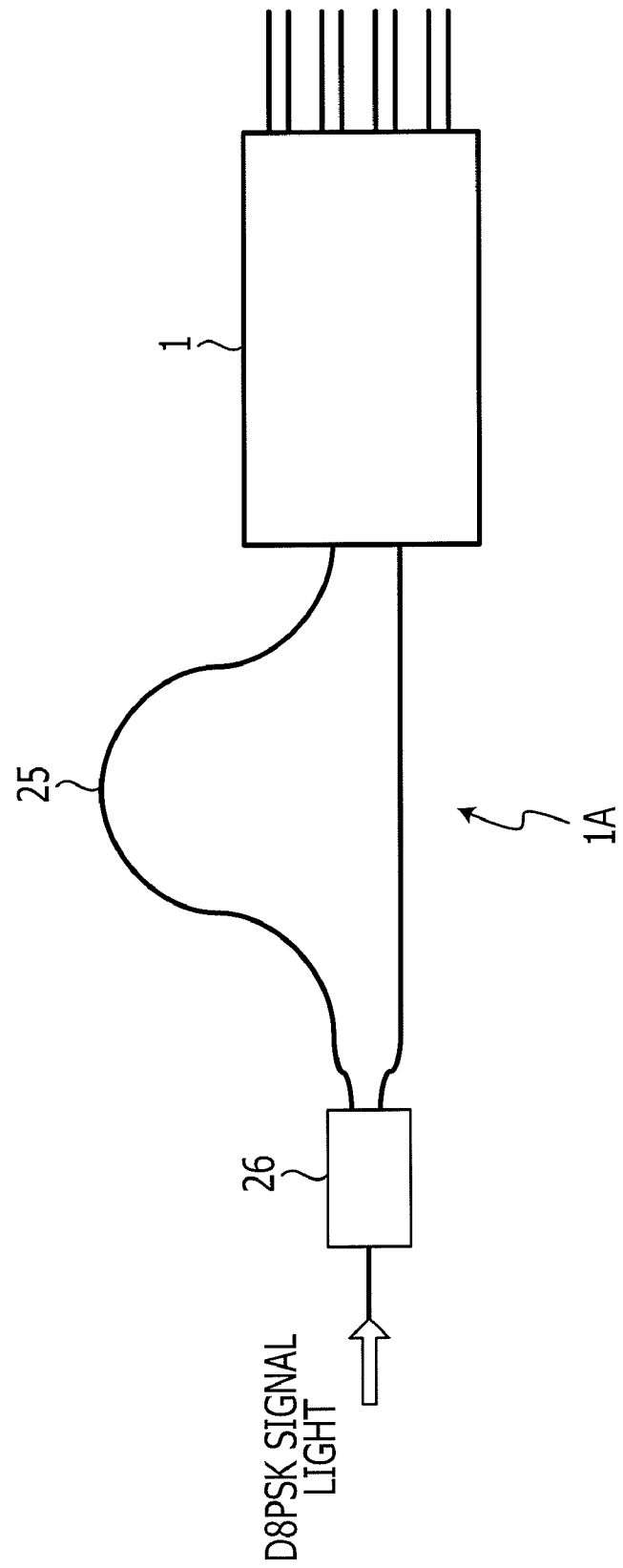
FIG. 19 is a pattern diagram illustrating a configuration of an optical hybrid circuit according to a third embodiment.

Accordingly, as illustrated in FIG. 19, the present optical hybrid circuit 1A includes, in addition to the configuration of the optical hybrid circuit 1 in the first embodiment described above (refer to FIG. 1), an optical delay circuit 25, and a 1:2 optical coupler 26 that includes one channel on the input side thereof and two channels on the output side thereof. In other words, the present optical hybrid circuit 1A is configured so that the 1:2 optical coupler 26 is coupled in a cascade coupling to the preceding stage (front end portion) of the 2:8 MMI coupler 2 included in the optical hybrid circuit 1 of the first embodiment described above through the optical delay circuit 25. In the same way as in the first embodiment described above, the optical hybrid circuit 1 includes an optical semiconductor device which includes the MMI coupler 2 and the optical couplers 3 to 5. In addition, in FIG. 19, the same symbol is assigned to a portion which is the same as that in the first embodiment described above [refer to FIG. 1A].

Here, the optical delay circuit 25 is coupled to one of the channels on the input side of the 2:8 MMI coupler 2 included in the optical hybrid circuit 1 of the first embodiment described above.

The 1:2 optical coupler 26 is coupled to the optical delay circuit 25 and the other channel on the input side of the 2:8 MMI coupler 2. Here, the 1:2 optical coupler 26 is a 1:2 MMI coupler.

Specifically, the length of one waveguide that couples one of the input channels of the 2:8 MMI coupler 2 and one of the output channels of the 1:2 optical coupler 26 to each other is set greater than the length of the other optical waveguide that couples the other input channel of the 2:8 MMI coupler 2 and the other output channel of the 1:2 optical coupler 26 to each other.

In other words, the two optical waveguides (arms) that couple the two input ports of the 2:8 MMI coupler 2 and the two output ports of the 1:2 MMI coupler 26 to each other are different in length (optical path length) from each other.

Here, the length of the one of the optical waveguides is made longer to provide an optical path length difference that corresponds to a delay of one bit of a D8PSK signal pulse. Accordingly, the optical delay circuit 25 corresponds to one of the optical waveguides that is coupled to one of the input channels of the 2:8 MMI coupler 2 included in the optical hybrid circuit 1 in the first embodiment described above.

In addition, the D8PSK signal light is input to the channel on the input side of the 1:2 MMI coupler 26. Therefore, the channel on the input side of the 1:2 MMI coupler 26 is an input channel for inputting the D8PSK signal light. The D8PSK signal light pulse is branched into two paths through the 1:2 MMI coupler 26, and one beam of the branched D8PSK signal light is delayed by one bit by the optical delay circuit 25. After that, the two beams of D8PSK signal light are input to the 2:8 MMI coupler 2 in temporal synchronization with each other. In this case, the relative phase difference between the two beams of D8PSK signal light individually input to the two input channels of the 2:8 MMI coupler 2 is any one of the eight kinds of the relative phase differences $\Delta\psi$ described in the first embodiment mentioned above. Therefore, output forms that have different branching ratios from one another are obtained by the circuit configuration that includes the 2:8 MMI coupler and the succeeding circuit elements similar to those in the first embodiment described above. Accordingly, the present optical hybrid circuit 1A also functions as a 45-degree hybrid in the same way as in the case of the first embodiment described above.

Since details of the other parts are the same as those in the first embodiment described above, description thereof will be omitted herein. Here, when the first embodiment described above is applied to the present embodiment, two beams of D8PSK signal light that have a relative phase difference $\Delta\psi$ therebetween may be applied in place of the 8PSK signal light and the LO light.

Accordingly, the optical hybrid circuit according to the present embodiment has an advantage in that excessive loss can be suppressed by preventing the intersecting region of the optical waveguides from occurring, in the same way as in the above-described first embodiment.

In particular, the optical hybrid circuit according to the present embodiment has an advantage in that a 45-degree hybrid can be realized, the 45-degree hybrid having a low wavelength dependence property, a low phase displacement characteristic, and low insertion loss, and being suitable for compactness and monolithic integration. Furthermore, since the optical hybrid circuit according to the embodiment is also superior in compatibility with 45-degree hybrids that are currently used in coherent optical receivers, coherent detection systems, or the like; and hence, is desirable for cost performance.

While, in the embodiment described above, a 1:2 MMI coupler is used as the 1:2 optical coupler 26 provided at the preceding stage to the 2:8 MMI coupler 2, the 1:2 optical coupler 26 is not limited to this example. For example, it is possible to use a Y branching coupler, a 2:2 MMI coupler, a 2:2 directional coupler, or the like in place of the 1:2 MMI coupler. Also in this case, a 45-degree hybrid operation can be obtained in the same way as in the case of the embodiment described above.

In addition, while, in the embodiment described above, the optical hybrid circuit 1A includes an optical semiconductor device that includes the MMI coupler 2 (2A) and the optical couplers 3 to 5 (3A to 5A, 3B to 5B) in the same way as in the first embodiment described above, the optical hybrid circuit 1A is not limited to this example. For example, the optical hybrid circuit 1A may include an optical semiconductor device that includes the MMI coupler 2 (2A), the optical couplers 3 to 5 (3A to 5A, 3B to 5B), the optical delay circuit 25, and the 1:2 optical coupler 26.

In addition, the modifications [refer to FIGS. 14 to 17] to the first embodiment described above can also be applied to the optical hybrid circuit according to the present embodiment.

Next, an optical receiver, an optical transceiver, and an optical receiving method according to a fourth embodiment will be described in reference to FIG. 20.

Figure 20:
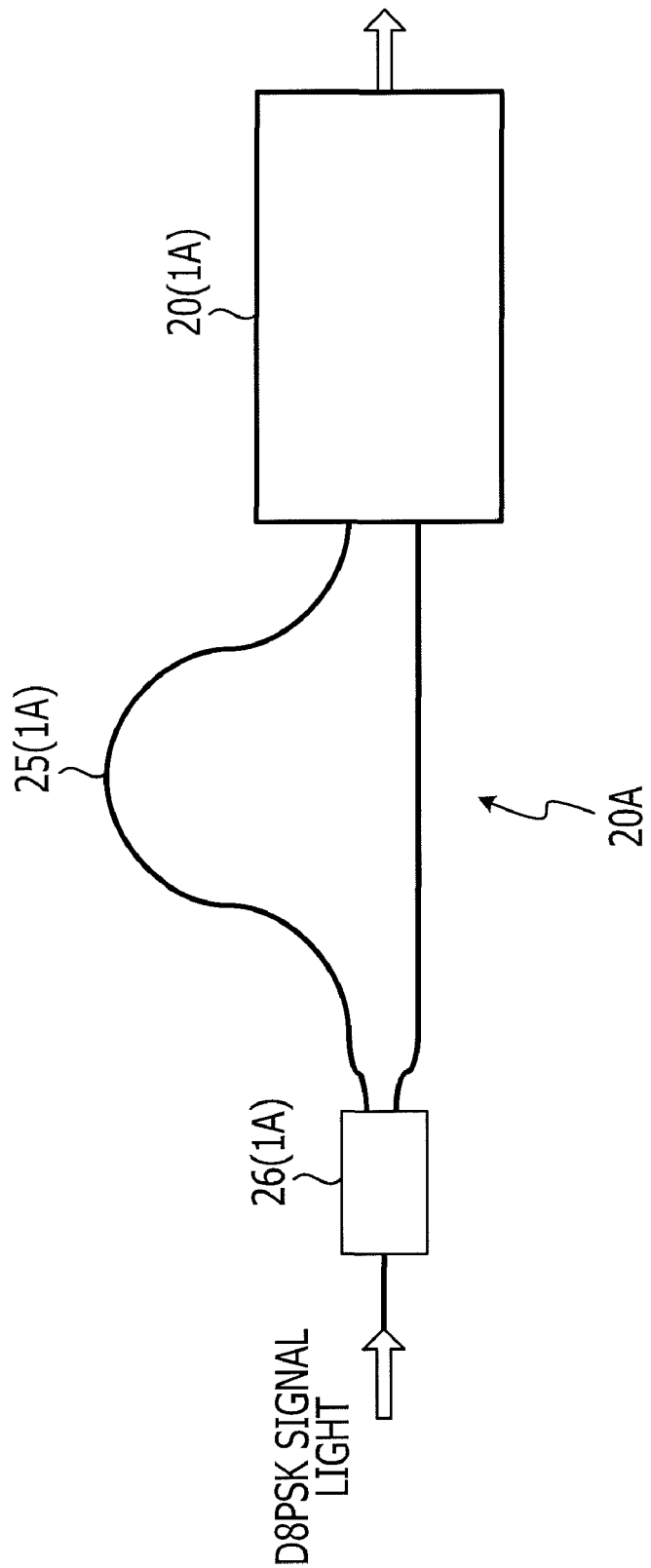
FIG. 20 is a pattern diagram illustrating a configuration of an optical receiver according to a fourth embodiment.

As illustrated in FIG. 20, the optical receiver according to the present embodiment is a coherent optical receiver 20A that includes, in addition to the configuration of the coherent optical receiver 20 in the second embodiment and the modifications to the second embodiment described above (refer to FIG. 18), an optical delay circuit 25, and a 1:2 optical coupler 26 that includes one channel on the input side thereof and two channels on the output side thereof.

The present coherent optical receiver 20A includes the optical hybrid circuit 1A (45-degree hybrid for a D8PSK signal; refer to FIG. 19) in the third embodiment and the modifications to the third embodiment described above. That is, the present coherent optical receiver 20A uses, in place of the 45-degree hybrid 1 included in the coherent optical receiver 20 in the second embodiment and the modifications to the second embodiment described above, the 45-degree hybrid 1A in the third embodiment and the modifications to the third embodiment and described above. The coherent optical receiver 20A converts an optical signal distinguished by the 45-degree hybrid 1A into an electrical signal and performs a digital signal processing.

Since details of the optical hybrid circuit 1A are substantially the same as those in the third embodiment and the modifications to the third embodiment described above (refer to FIG. 19), description of the same will be omitted here. In addition, since the configuration of the optical receiver 20 and an optical receiving method performed therein are substantially the same as those in the second embodiment and the modifications to the second embodiment described above (refer to FIG. 18), description of the same will be omitted here. However, in the present optical receiver 20A, there is no local oscillator light generation section. Here, when the second embodiment and the modifications to the second embodiment described above are applied to the present embodiment, two beams of D8PSK signal light that have a relative phase difference Δψ there between may be applied in place of the 8PSK signal light and the LO light. In addition, in FIG. 20, the same symbol is assigned to a portion which is the same as those in the second embodiment described above (refer to FIG. 18), the third embodiment (refer to FIG. 19), and the modifications described above.

Accordingly, the optical receiver according to the present embodiment has an advantage in that excessive loss can be suppressed by preventing the intersecting region of the optical waveguides from occurring.

In particular, the optical receiver according to the present embodiment has an advantage in that an optical receiver can be realized, an optical receiver having a 45-degree hybrid that has a low wavelength dependence property, a low phase displacement characteristic, and low insertion loss, and being suitable for compactness and monolithic integration.

While, the embodiment described above is described by taking the optical receiver as an example, the embodiment is not limited to this example. In addition, in the same way as in the second embodiment and the modifications to the second embodiment described above, an optical transceiver may be configured to one that includes the configuration of the optical receiver in the embodiment described above.

In addition, while, in the embodiment described above, the optical hybrid circuit 1A includes an optical semiconductor device that includes the MMI coupler 2 (2A) and the optical couplers 3 to 5 (3A to 5A, 3B to 5B) (refer to the second embodiment), the optical hybrid circuit 1A is not limited to this example. For example, the optical semiconductor device that includes the MMI coupler 2 (2A) and the optical couplers 3 to 5 (3A to 5A, 3B to 5B) may additionally include photodiodes (here BPDs) 21A to 21D integrated therein. In short, the MMI coupler 2 (2A), the optical couplers 3 to 5 (3A to 5A, 3B to 5B), and the photodiodes 21A to 21D (here the BPDs) may be monolithically integrated.

In addition, while, in the embodiment, the optical hybrid circuit 1A includes an optical semiconductor device that includes the MMI coupler 2 (2A), the optical couplers 3 to 5 (3A to 5A, 3B to 5B), the optical delay circuit 25, and the 1:2 optical coupler 26 (refer to the third embodiment), the optical hybrid circuit 1 is not limited to this example. For example, the optical semiconductor device that includes the MMI coupler 2 (2A), the optical couplers 3 to 5 (3A to 5A, 3B to 5B), the optical delay circuit 25, and the 1:2 optical coupler 26 may additionally include photodiodes (here BPDs) 21A to 21D integrated therein. In short, the MMI coupler 2 (2A), the optical couplers 3 to 5 (3A to 5A, 3B to 5B), the optical delay circuit 25, the 1:2 optical coupler 26, and the photodiodes 21A to 21D (here the BPDs) may be monolithically integrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. An optical hybrid circuit, comprising:
a multimode interference coupler;
a first 2:2 optical coupler;
a second 2:2 optical coupler;
a third 2:2 optical coupler; and
a phase controlling region,
  the multimode interference coupler
includes a pair of input channels provided at symmetrical positions with respect to a center position in a widthwise direction, a pair of first output channels that are adjacent to each other configured to output a pair of first optical signals that have an in-phase relationship with each other, a pair of second output channels that are adjacent to each other configured to output a pair of second optical signals that have an in-phase relationship with each other, a pair of third output channels that are adjacent to each other configured to output a pair of third optical signals that have an in-phase relationship with each other, and a pair of fourth output channels that are adjacent to each other configured to output a pair of fourth optical signals that have an in-phase relationship with each other, and
converts an 8-phase shift modulation signal light or a differential 8-phase shift modulation signal light into the pair of first optical signals that have an in-phase relationship with each other, the pair of second optical signals that have an in-phase relationship with each other, the pair of third optical signals that have an in-phase relationship with each other, and the pair of fourth optical signals that have an in-phase relationship with each other,
  the first 2:2 optical coupler
is coupled to one of the pair of first output channels, the pair of second output channels, the pair of third output channels, and the pair of fourth output channels,
includes two channels on an input side thereof and two channels on an output side thereof, and
converts one of the pair of first optical signals, the pair of second optical signals, the pair of third optical signals, and the pair of fourth optical signals into a pair of fifth optical signals that have a quadrature phase relationship,
  the second 2:2 optical coupler
is coupled to one pair of output channels, which is one of the pair of first output channels, the pair of second output channels, the pair of third output channels, and the pair of fourth output channels and other than the pair of output channels to which the first 2:2 optical coupler is coupled,
includes two channels on an input side thereof and two channels on an output side thereof, and
converts one pair of optical signals, which is the pair of first optical signals, the pair of second optical signals, the pair of third optical signals, and the pair of fourth optical signals and output from other pair of output channels than the pair of output channels to which the first 2:2 optical coupler is coupled, into a pair of sixth optical signals that have a 45-degree phase relationship,
  the third 2:2 MMI coupler
is coupled to one pair of output channels, which is one of the pair of first output channels, the pair of second output channels, the pair of third output channels, and the pair of fourth output channels and other than the pairs of output channels to which the first 2:2 optical coupler and the second 2:2 optical coupler are coupled,
includes two channels on an input side thereof and two channels on an output side thereof, and converts one pair of optical signals, which is one of the pair of first optical signals, the pair of second optical signals, the pair of third optical signals, and the pair of fourth optical signals and output from other pair of output channels than the pairs of output channels to which the first 2:2 optical coupler and the second 2:2 optical coupler are coupled, into a pair of seventh optical signals that have a 135-degree phase relationship, and the phase controlling region is provided in at least one of each pair of at least two pairs of output channels from among three pairs of output channels to which the first 2:2 optical coupler, the second 2:2 optical coupler, and the third 2:2 optical coupler are coupled, respectively.

2. The optical hybrid circuit according to claim 1, wherein the first 2:2 optical coupler has a branching ratio of 50:50, and the second 2:2 optical coupler and the third 2:2 optical coupler have branching ratios of 85:15.

3. The optical hybrid circuit according to claim 1, wherein the phase controlling region includes at least two phase controlling regions from among a first phase controlling region that is provided in at least one of the pair of second output channels and controls a phase so that a phase difference between the pair of second optical signals becomes $3*\pi/8$, a second phase controlling region that is provided in one or both of the pair of third output channels and controls a phase so that a phase difference between the pair of third optical signals becomes $5*\pi/8$, a third phase controlling region that is provided in at least one of the pair of fourth output channels and controls a phase so that a phase difference between the pair of fourth optical signals becomes $7*\pi/8$, and a fourth phase controlling region that is provided in at least one of the pair of first output channels and controls a phase so that a phase difference between the pair of first optical signals becomes $\pi/8$.

4. The optical hybrid circuit according to claim 1, wherein the multimode interference coupler is a 2:8 multimode interference coupler that includes two channels on an input side thereof and eight channels on an output side thereof.

5. The optical hybrid circuit according to claim 4, wherein the 2:8 multimode interference coupler is a 2:8 multimode interference coupler based on a paired interference.

6. The optical hybrid circuit according to claim 1, wherein the multimode interference coupler is an 8:8 multimode interference coupler that includes two channels on an input side thereof and eight channels on an output side thereof, and two channels, provided at symmetrical positions with respect to a center position in a widthwise direction, from among the eight channels on the input side thereof are input channels to which light is input.

7. The optical hybrid circuit according to claim 1, wherein each of the first 2:2 optical coupler, the second 2:2 optical coupler, and the third 2:2 optical coupler is one of a multimode interference coupler, a directional coupler, and a two-mode interference coupler.

8. The optical hybrid circuit according to claim 1, wherein one channel on an input side of the multimode interference coupler is an input channel to which an 8-phase shift modulation signal light is input, and the other channel on the input side of the multimode interference coupler is an input channel to which local oscillator light is input.

9. The optical hybrid circuit according to claim 1, further comprising:

an optical delay circuit configured to be coupled to one channel on an input side of the multimode interference coupler; and a 1:2 optical coupler configured to be coupled to the optical delay circuit and the other channel on the input side of the multimode interference coupler and include one channel on an input side thereof and two channels on an output side thereof, wherein the channel on the input side of the 1:2 optical coupler is an input channel to which a differential 8-phase shift modulation signal light is input.

10. The optical hybrid circuit according to claim 1, comprising:

an optical semiconductor device configured to include the multimode interference coupler, the first 2:2 optical coupler, the second 2:2 optical coupler, the third 2:2 optical coupler, and the phase controlling region and have a waveguide structure.

11. The optical hybrid circuit according to claim 10, wherein the phase controlling region includes a phase shifter the waveguide width of which varies in a tapered manner.

12. An optical receiver, comprising:
an optical hybrid circuit;
a photodiode;
an AD conversion circuit; and
a digital arithmetic circuit,
  the optical hybrid circuit includes:
a multimode interference coupler,
a first 2:2 optical coupler,
a second 2:2 optical coupler,
a third 2:2 optical coupler, and
a phase controlling region,
  the multimode interference coupler
includes a pair of input channels provided at symmetrical positions with respect to a center position in a widthwise direction, a pair of first output channels that are adjacent to each other configured to output a pair of first optical signals that have an in-phase relationship with each other, a pair of second output channels that are adjacent to each other configured to output a pair of second optical signals that have an in-phase relationship with each other, a pair of third output channels that are adjacent to each other configured to output a pair of third optical signals that have an in-phase relationship with each other, and a pair of fourth output channels that are adjacent to each other configured to output a pair of fourth optical signals that have an in-phase relationship with each other, and converts an 8-phase shift modulation signal light or a differential 8-phase shift modulation signal light into the pair of first optical signals that have an in-phase relationship with each other, the pair of second optical signals that have an in-phase relationship with each other, the pair of third optical signals that have an in-phase relationship with each other, and the pair of fourth optical signals that have an in-phase relationship with each other, the first 2:2 optical coupler
is coupled to one of the pair of first output channels, the pair of second output channels, the pair of third output channels, and the pair of fourth output channels,
includes two channels on an input side thereof and two channels on an output side thereof, and converts one of the pair of first optical signals, the pair of second optical signals, the pair of third optical signals, and the pair of fourth optical signals into a pair of fifth optical signals that have a quadrature phase relationship, the second 2:2 optical coupler is coupled to one pair of output channels, which is one of the pair of first output channels, the pair of second output channels, the pair of third output channels, and the pair of fourth output channels and other than the pair of output channels to which the first 2:2 optical coupler is coupled, includes two channels on an input side thereof and two channels on an output side thereof, and converts one pair of optical signals, which is one of the pair of first optical signals, the pair of second optical signals, the pair of third optical signals, or the pair of fourth optical signals and output from other pair of output channels than the pair of output channels to which the first 2:2 optical coupler is coupled, into a pair of sixth optical signals that have a 45-degree phase relationship, the third 2:2 MMI coupler is coupled to one pair of output channels, which is one of the pair of first output channels, the pair of second output channels, the pair of third output channels, and the pair of fourth output channels and other than the pairs of output channels to which the first 2:2 optical coupler and the second 2:2 optical coupler are coupled, includes two channels on an input side thereof and two channels on an output side thereof, and converts one pair of optical signals, which is one of the pair of first optical signals, the pair of second optical signals, the pair of third optical signals, and the pair of fourth optical signals and output from other pair of output channels than the pairs of output channels to which the first 2:2 optical coupler and the second 2:2 optical coupler are coupled, into a pair of seventh optical signals that have a 135-degree phase relationship, and the phase controlling region is provided in at least one of each pair of at least two pairs of output channels from among three pairs of output channels to which the first 2:2 optical coupler, the second 2:2 optical coupler, and the third 2:2 optical coupler are coupled, respectively, the photodiode converts one of the pair of first optical signals, the pair of second optical signals, the pair of third optical signals, and the pair of fourth optical signals, output from the multimode interference coupler, the pair of fifth optical signals output from the first 2:2 optical coupler, the pair of sixth optical signals output from the second 2:2 optical coupler, and the pair of seventh optical signals output from the third 2:2 optical coupler into analog electric signals, the AD conversion circuit converts analog electric signals output from the photodiode into digital electric signals, and the digital arithmetic circuit performs an arithmetic processing operation using the digital electric signals output from the AD conversion circuit.

13. The optical receiver according to claim 12, further comprising:
a trans-impedance amplifier configured to be coupled to the photodiode, wherein
the AD conversion circuit converts the analog electric signals, output from the photodiode and input through the trans-impedance amplifier, into digital electric signals.

14. The optical receiver according to claim 12, wherein:
one channel on an input side of the multimode interference coupler is an input channel to which an 8-phase shift modulation signal light is input,
the other channel on the input side of the multimode interference coupler is an input channel to which local oscillator light is input, and
a local oscillator light generation section, configured to input the local oscillator light to the other channel on the input side of the multimode interference coupler, is included.

15. The optical receiver according to claim 12, wherein
the optical hybrid circuit includes:
an optical delay circuit configured to be coupled to one channel on an input side of the multimode interference coupler, and
a 1:2 optical coupler configured to be coupled to the optical delay circuit and the other channel on the input side of the multimode interference coupler and include one channel on an input side thereof and two channels on an output side thereof, wherein
the channel on the input side of the 1:2 optical coupler is an input channel to which a differential 8-phase shift modulation signal light is input.

16. The optical receiver according to claim 12, wherein
the optical hybrid circuit includes an optical semiconductor device that includes the multimode interference coupler, the first 2:2 optical coupler, the second 2:2 optical coupler, the third 2:2 optical coupler, and the phase controlling region.

17. The optical receiver according to claim 15, wherein
the optical hybrid circuit includes an optical semiconductor device that includes the multimode interference coupler, the first 2:2 optical coupler, the second 2:2 optical coupler, the third 2:2 optical coupler, the phase controlling region, the optical delay circuit, and the 1:2 optical coupler.

18. The optical receiver according to claim 16, wherein
the photodiode is further integrated in the optical semiconductor device.

19. An optical receiving method, comprising:
converting an 8-phase shift modulation signal light or a differential 8-phase shift modulation signal light into a pair of first optical signals that have an in-phase relationship with each other, a pair of second optical signals that have an in-phase relationship with each other, a pair of third optical signals that have an in-phase relationship with each other, and a pair of fourth optical signals that have an in-phase relationship with each other, using a multimode interference coupler that includes a pair of input channel provided at symmetrical positions with respect to a center position in a widthwise direction, a pair of first output channels that are adjacent to each other configured to output the pair of first optical signals that have an in-phase relationship with each other, a pair of second output channels that are adjacent to each other configured to output the pair of second optical signals that have an in-phase relationship with each other, a pair of third output channels that are adjacent to each other configured to output the pair of third optical signals that have an in-phase relationship with each other, and a pair of fourth output channels that are adjacent to each other configured to output the pair of fourth optical signals that have an in-phase relationship with each other;

controlling a phase difference between at least two pairs of optical signals from among the pair of first optical signals, the pair of second optical signals, the pair of third optical signals, and the pair of fourth optical signals, using a phase controlling region provided in at least one of each pair of at least two pairs of output channels from among the pair of first output channels, the pair of second output channels, the pair of third output channels, and the pair of fourth output channels;

converting one of the pair of first optical signals, the pair of second optical signals, the pair of third optical signals, and the pair of fourth optical signals into a pair of fifth optical signals that have a quadrature phase relationship, using a first 2:2 optical coupler that is coupled to one of the pair of first output channels, the pair of second output channels, the pair of third output channels, and the pair of fourth output channels and includes two channels on an input side thereof and two channels on an output side thereof;

converting one pair of optical signals, which is one of the pair of first optical signals, the pair of second optical signals, the pair of third optical signals, and the pair of fourth optical signals and output from other pair of output channels than the pair of output channels to which the first 2:2 optical coupler is coupled, into a pair of sixth optical signals that have a 45-degree phase relationship, using a second 2:2 optical coupler that is coupled to one pair of output channels, which is one of the pair of first output channels, the pair of second output channels, the pair of third output channels, and the pair of fourth output channels and other than the pair of output channels to which the first 2:2 optical coupler is coupled, and includes two channels on an input side thereof and two channels on an output side thereof;

converting one pair of optical signals, which is one of the pair of first optical signals, the pair of second optical signals, the pair of third optical signals, and the pair of fourth optical signals and output from other pair of output channels than the pairs of output channels to which the first 2:2 optical coupler and the second 2:2 optical coupler are coupled, into a pair of seventh optical signals that have a 135-degree phase relationship, using a third 2:2 MMI coupler that is coupled to one pair of output channels, which is one of the pair of first output channels, the pair of second output channels, the pair of third output channels, and the pair of fourth output channels and other than the pairs of output channels to which the first 2:2 optical coupler and the second 2:2 optical coupler are coupled, and includes two channels on an input side thereof and two channels on an output side thereof; and receiving one of the pair of first optical signals, the pair of second optical signals, the pair of third optical signals, and the pair of fourth optical signals, the fifth optical signal, the sixth optical signal, and the seventh optical signal.

* * * * *